(12) United States Patent
Ohkubo et al.

(10) Patent No.: US 6,913,326 B1
(45) Date of Patent: Jul. 5, 2005

(54) APPARATUS FOR INCREASING BRAKE CYLINDER PRESSURE BY CONTROLLING PUMP MOTOR AND REDUCING THE PRESSURE BY CONTROLLING ELECTRIC ENERGY APPLIED TO CONTROL VALVE

(75) Inventors: Masayasu Ohkubo, Okazaki (JP); Kiyoharu Nakamura, Seto (JP); Akira Sakai, Toyota (JP); Shinichi Soejima, Susono (JP); Amane Shimura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/377,616

(22) Filed: Aug. 19, 1999

(30) Foreign Application Priority Data

Aug. 28, 1998 (JP) .......................................... 10-243036
Sep. 22, 1998 (JP) .......................................... 10-268640
Sep. 24, 1998 (JP) .......................................... 10-270172

(51) Int. Cl.⁷ ............................. B60T 13/18; B60T 8/40
(52) U.S. Cl. .................... 303/11; 303/116.7; 303/119.2
(58) Field of Search ......................... 303/10, 11, 116.1, 303/119.2, 191, 192

(56) References Cited

U.S. PATENT DOCUMENTS

| 4,477,125 A | 10/1984 | Belart et al. |
| 4,817,767 A | * 4/1989 | Seibert et al. ........... 303/116.1 |

(Continued)

FOREIGN PATENT DOCUMENTS

| DE | 4029793 A1 | 3/1992 |
| DE | 19535623 A1 | 4/1996 |
| DE | 197 51 088 A1 | 11/1997 |
| EP | 0 469 978 A2 | 2/1992 |
| EP | 0 753 411 A2 | 1/1997 |
| GB | 1 282 8000 A | 7/1972 |
| GB | 2 320 748 A | 7/1998 |
| JP | 5-330417 | 12/1993 |
| JP | 7-251729 | 10/1995 |
| JP | 8-150919 | 6/1996 |

(Continued)

OTHER PUBLICATIONS

Jonner et al. *Electrohydraulic Brake System—The First Approach to Brake–By–Wire Technology*, SAE 960991, pp. 105–112, 1996.

Seubert, W., "Pneumatik–ABS–eine hydraulische Pkw–Bremse Mit Pneumatischer Druckregelung", Olhydraulik und Pneumatik, Krausskopf Verlag Fur Wirtschaft GMBH, Mainz, DE, vol. 42, No. 9, Sep. 1998, pp. 590–595, XP00031875 ISSN 0341–2660.

*Primary Examiner*—Jack Lavinder
*Assistant Examiner*—Robert A. Siconolfi
(74) *Attorney, Agent, or Firm*—Oliff & Berridge, PLC

(57) ABSTRACT

Hydraulic pressure control apparatus for controlling a pressure of a brake cylinder pressure, including a pump device connected to the brake cylinder and including at least one set of a pump for delivering a pressurized fluid to the brake cylinder and a pump operating electric motor, a low-pressure source for storing the fluid discharged from the brake cylinder, a solenoid-operated pressure control valve disposed between the low-pressure source and the brake cylinder and operated with an electric energy applied thereto, for controlling the brake cylinder pressure depending upon the electric energy, and a controller including a pressure increase control device for increasing the brake cylinder pressure by controlling the electric motor, and a pressure reduction control device or reducing the brake cylinder pressure by controlling the electric energy applied to the control valve.

40 Claims, 35 Drawing Sheets

U.S. PATENT DOCUMENTS

| | | | |
|---|---|---|---|
| 4,834,469 A | * 5/1989 | Kohno et al. | 303/116.1 |
| 4,848,853 A | 7/1989 | Mizuno et al. | |
| 5,152,585 A | 10/1992 | Patient et al. | |
| 5,295,737 A | * 3/1994 | Epple et al. | 303/11 |
| 5,496,099 A | 3/1996 | Resch | |
| 5,568,962 A | 10/1996 | Enomoto et al. | |
| 5,588,718 A | 12/1996 | Winner et al. | |
| 5,727,852 A | 3/1998 | Pueschel et al. | |
| 5,762,406 A | 6/1998 | Yasui et al. | |
| 5,791,745 A | * 8/1998 | Sakakibara | 303/11 |
| 5,902,020 A | 5/1999 | Drott | |
| 5,927,829 A | 6/1999 | Saga et al. | |
| 5,927,827 A | 7/1999 | Reuter et al. | |
| 5,941,608 A | 8/1999 | Campau et al. | |
| 5,951,118 A | 9/1999 | Soejima | |
| 6,076,897 A | * 6/2000 | Binder et al. | 303/116.1 |
| 6,113,197 A | 9/2000 | Kuroki et al. | |
| 6,126,248 A | * 10/2000 | Kawahata et al. | 303/116.1 |
| 6,158,825 A | * 12/2000 | Schunck et al. | 303/11 |

FOREIGN PATENT DOCUMENTS

| | | |
|---|---|---|
| JP | 10-119748 | 5/1998 |
| WO | WO 93/00236 | 7/1993 |
| WO | WO 96/28325 | 9/1996 |
| WO | WO 96/28325 A | 9/1996 |
| WO | WO 97/02970 | 1/1997 |
| WO | WO 97/23372 A | 7/1997 |
| WO | WO 97/23372 | 7/1997 |
| WO | WO 98/26966 | 6/1998 |

* cited by examiner

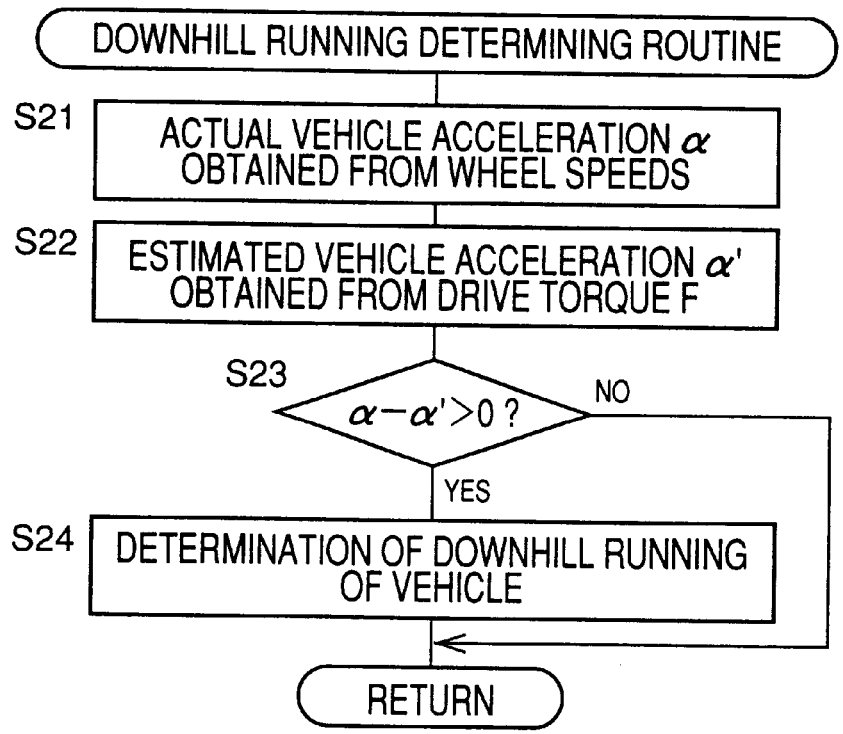

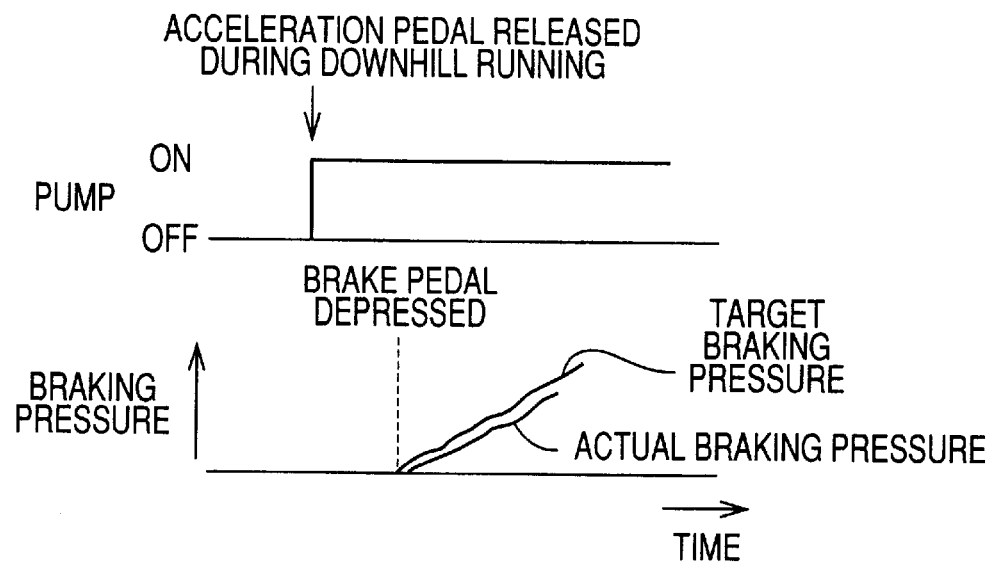

FIG. 12
COMMON PRESSURE CONTROL

| PERIODS | PRESSURE CONTROL | PRESSURE DIFFERENCE | PUMP DEVICE | PUMP CUT-OFF VALVES | PRESSURE REDUCTION CONTROL VALVES |
|---|---|---|---|---|---|
| a | INCREASE | $\Delta P > EPS$ | ON (CONTROLLED) | OPEN | CLOSED |
| b, d | HOLD | $|\Delta P| \leq EPS$ | OFF | OPEN | CLOSED |
| a | REDUCTION | $\Delta P < -EPS$ | OFF | OPEN | CONTROLLED |

FIG. 14
INDEPENDENT PRESSURE CONTROL

| TARGET PRESSURE CHANGE RATE | PRESSURE CONTROL | PRESSURE DIFFERENCE | PUMP DEVICE | PUMP CUT-OFF VALVE | PRESSURE REDUCTION CONTROL VALVE |
|---|---|---|---|---|---|
| $\Delta Pref < K$ | RAPID REDUCTION | | CONTROLLED BASED ON Prefmax | CLOSED | CONTROLLED |
| $\Delta Pref > K$ | INCREASE | $\Delta P > EPS$ | | OPEN | CONTROLLED |
| | HOLD | $|\Delta P| \leqq EPS$ | | CLOSED | CLOSED |
| | SLOW REDUCTION | $\Delta P < -EPS$ | | OPEN | CONTROLLED |

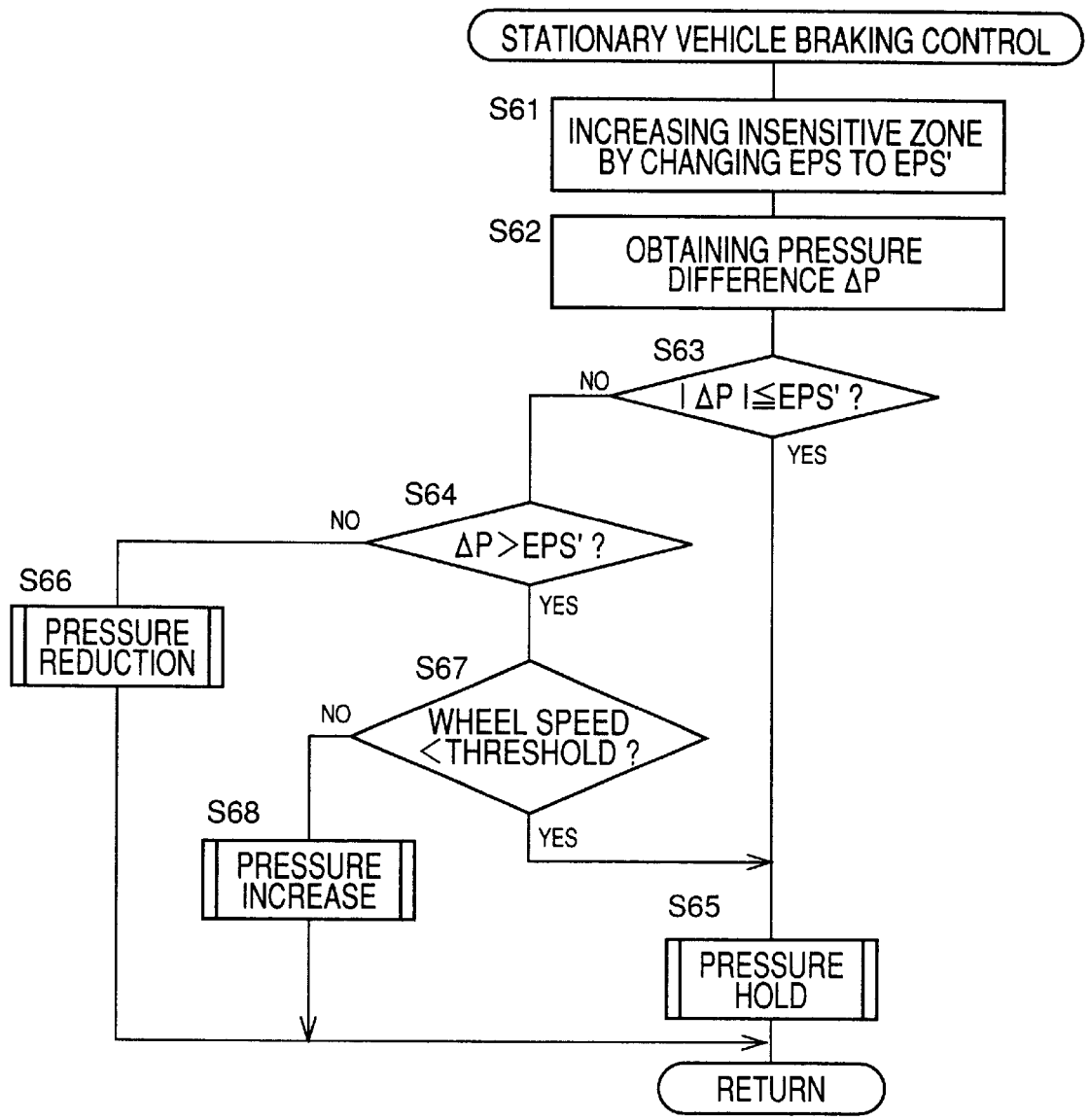

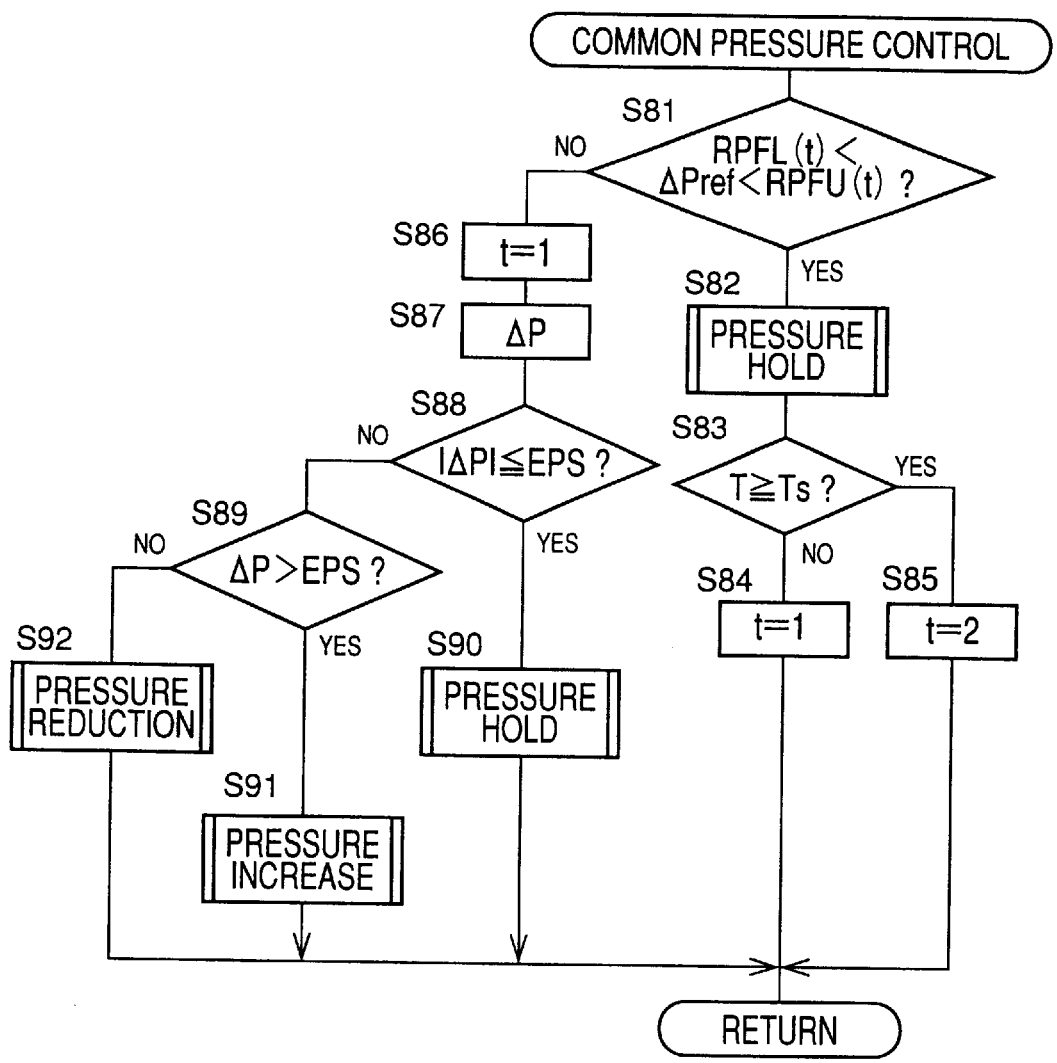

FIG. 17

| | ΔPref > RPS | \|ΔPref\| ≦ RPS | ΔPref < −RPS |
|---|---|---|---|
| ΔP > EPS | INCREASE | HOLD | HOLD |
| \|ΔP\| ≦ EPS | HOLD | HOLD | HOLD |
| ΔP < −EPS | HOLD | HOLD | REDUCTION |

PRESSURE INCREASE CONTROL VALVE 179
PRESSURE REDUCTION CONTROL VALVE 58

$F_k \gtrapprox F_s + F_p$

PRESSURE REDUCTION CONTROL VALVE 62

$F_s \gtrapprox F_k + F_p$

FIG. 24

| MODE | VALVE 179 | VALVE 58 | VALVE 62 |
|---|---|---|---|
| OFF | DEENERGIZED (CLOSED) | DEENERGIZED (CLOSED) | DEENERGIZED (CLOSED) |
| INCREASE | LINEAR CONTROL TO ZERO ΔP | DEENERGIZED (CLOSED) | ENERGIZED TO BE CLOSED ACCORDING TO Fs ≧ Fp + Fr |
| HOLD | DEENERGIZED (CLOSED) | DEENERGIZED (CLOSED) | HELD CLOSED ACCORDING TO Fs ≧ Fp + Fr |
| REDUCTION | DEENERGIZED (CLOSED) | LINEAR CONTROL TO ZERO ΔP | LINEAR CONTROL TO ZERO ΔP |
| SOFT SEATING AFTER INCREASE | SLOW DECREASE OF CURRENT | SAME AS IN INCREASE MODE | SAME AS IN INCREASE MODE |
| SOFT SEATING AFTER REDUCTION | SAME AS IN REDUCTION MODE | SAME AS IN REDUCTION MODE | SLOW INCREASE OF CURRENT |

FIG. 35

| i | | | | | | | |
|---|---|---|---|---|---|---|---|
| 1.5 | 1.4 | 1.3 | 1.2 | 1.1 | 1.1 | 1 | 1 |
| 1.4 | 1.3 | 1.2 | 1.1 | 1 | 1 | 0.9 | 0.9 |
| 1.3 | 1.2 | 1.1 | 1 | 0.9 | 0.9 | 0.8 | 0.7 |
| 1.2 | 1.1 | 1 | 0.9 | 0.8 | 0.7 | 0.6 | 0.6 |
| 1.1 | 1 | 0.9 | 0.8 | 0.7 | 0.6 | 0.5 | 0.5 |
| 1 | 0.9 | 0.8 | 0.7 | 0.6 | 0.6 | 0.5 | 0.5 |
| 1 | 0.9 | 0.8 | 0.7 | 0.6 | 0.5 | 0.5 | 0.4 |

P

APPARATUS FOR INCREASING BRAKE CYLINDER PRESSURE BY CONTROLLING PUMP MOTOR AND REDUCING THE PRESSURE BY CONTROLLING ELECTRIC ENERGY APPLIED TO CONTROL VALVE

BACKGROUND OF THE INVENTION

1. Field of the Invention

The present invention relates to a hydraulic pressure control apparatus for controlling a fluid pressure in a hydraulically operated brake cylinder.

2. Discussion of the Related Art

JP-A-10-322803 (published on Dec. 4, 1998, before the present invention was made) discloses such a hydraulic pressure control apparatus using an electrically operated hydraulic pressure source as a high-pressure source. This hydraulic pressure control apparatus includes (1) the above-indicated high-pressure source which includes a pump, an elcctrc motor or operating the pump, and an accumulator for storing a working fluid pressurized by the pump, for supplying the pressurized fluid to a brake cylinder, (2) a low-pressure source for storing the fluid discharged from the brake cylinder, (3) a solenoid-operated pressure increase control valve disposed between the high-pressure source and the brake cylinder, and electrically controlled for controlling the pressure of the fluid in the brake cylinder, to a level depending upon an electric energy applied thereto, (4) a solenoid-operated pressure reduction control valve disposed between the low-pressure-source and the brake cylinder, and electrically controlled for controlling the pressure of the fluid in the brake cylinder, to a level depending upon an electric energy applied thereto, and (5) a control device for controlling the pressure increase control valve and the pressure reduction control valve to regulate the pressure of the fluid in the brake cylinder, while controlling the electric motor to hold the pressure of the fluid in the accumulator at a predetermined level.

When the fluid pressure in the brake cylinder is increased under the control of this hydraulic pressure control apparatus, the electric energy to be applied to the solenoid-operated pressure increase control valve is controlled by the hydraulic pressure control apparatus, with the solenoid-operated pressure reduction control valve held in its closed state. The pressure of the fluid to be supplied from the accumulator to the brake cylinder through the pressure increase control valve is controlled according to the controlled electric energy applied to the pressure increase control valve. When the fluid pressure in the brake cylinder is reduced under the control of the hydraulic pressure control apparatus, the electric energy to be applied to the pressure reduction control valve is controlled by the apparatus with the pressure increase control valve held in its closed state. The pressure of the fluid in the brake cylinder is reduced to a level corresponding to the controlled electric energy. Thus, the pressure of the fluid in the brake cylinder is controlled by controlling the electric energies to be applied to the pressure increase control valve and the pressure reduction control valve.

The assignee of the present invention proposed a hydraulic pressure control apparatus as disclosed in Japanese Patent Application No. 10-102476 which has not been laid open at the time the present invention was made). The hydraulic pressure control apparatus disclosed in this Application includes a normally open, solenoid-operated shut-off valve which is disposed between the brake cylinder and a reservoir and which is placed in its open state when an electric energy is not applied thereto and in its closed state when the electric energy is applied thereto. In a conventional hydraulic pressure, a solenoid-operated shut-off valve disposed between the brake cylinder and the reservoir is a normally closed valve which is placed in its closed state when no electric energy is applied thereto, in order to prevent delayed initiation of a braking effect provided by the brake cylinder. After each braking operation of the brake cylinder by releasing of a brake operating member, for instance, this normally closed shut-off valve is held in the open state for a predetermined time which is estimated to be required for substantially zeroing the pressure of the fluid in the brake cylinder. Then, the electric energy is completely removed from the shut-off valve, so that the shut-off valve is returned to the original closed state. However, the brake cylinder may have a residual fluid pressure even after the expiration of the above-indicated predetermined time, that is, even after the pressurized fluid has been discharged for the predetermined time. This residual fluid pressure may cause a so-called "brake drag", namely, some degree of braking even after the braking operation in question. This brake drag can be avoided where the shut-off valve is a normally open valve which is returned to the open state by removal of an electric energy after each braking operation. On the other hand, however, the normally open shut-off valve must be quickly brought to the closed state when it is required to increase the fluid pressure in the brake cylinder. To this end, the normally open shut-off valve disclosed in the above-identified Patent Application is energized with a maximum electric energy by the pressure control apparatus, when the fluid pressure in the brake cylinder is increased. Accordingly, this normally open shut-off valve requires a comparatively large amount of consumption of the electric energy, and suffers from a relatively large operating noise, a relatively short life, and other problems.

SUMMARY OF THE INVENTION

It is an object of the present invention to provide a novel hydraulic pressure control apparatus which is different from the hydraulic pressure control apparatus described above, namely, provide a hydraulic pressure control apparatus capable of controlling the fluid pressure in the brake cylinder, without controlling the electric energies to be applied to the pressure increase control valve and the pressure reduction control valve.

The above object may be achieved according to any one of the following modes of the present invention, each of which is numbered like the appended claims and depends from the other mode or modes, where appropriate, so as to indicate possible combinations of elements or features in preferred forms of the invention.

(1) A hydraulic pressure control apparatus for controlling a pressure of a working fluid in a brake cylinder, said apparatus comprising: (a) a pump device connected to said brake cylinder and including at least one set of a pump for pressurizing the fluid and delivering the pressurized fluid to said brake cylinder and an electric motor for operating said pump; (b) a low-pressure source for storing the fluid discharged from said brake cylinder; (c) a solenoid-operated pressure control valve disposed between said low-pressure source and said brake cylinder and operated with an electric energy applied thereto, for controlling a pressure of the fluid in said brake cylinder depending upon an amount of said electric energy; and (d) a controller including pressure increase control means for increasing the pressure of the fluid in said brake cylinder by controlling said electric motor, and pressure reduction control means for reducing the pressure of the fluid in the brake cylinder by controlling the amount of said electric energy applied to said solenoid-operated pressure control valve.

In a most typical form of the hydraulic pressure control apparatus according to the above mode (1) of the present invention, a solenoid-operated pressure control valve is not provided between the pump device and the brake cylinder, and the pump for increasing the fluid pressure in the brake cylinder is connected directly to the brake cylinder. The brake cylinder is connected to the low-pressure source through the solenoid-operated pressure control valve. In the present hydraulic pressure control apparatus, the fluid pressure in the brake cylinder is increased by the pressurized fluid delivered thereto from the pump, and the increase in the fluid pressure in the brake cylinder can controlled by controlling the electric motor which is operated to drive the pump. Further, the fluid pressure in the brake cylinder is reduced with the fluid discharged from the brake cylinder to the low-pressure source, and the reduction in the brake cylinder pressure can be controlled by controlling the electric energy applied to the solenoid-operated pressure control valve. Thus, the fluid pressure in the brake cylinder is controlled by the present hydraulic pressure control apparatus, by controlling the electric motor for operating the pump and by controlling the electric energy applied to the solenoid-operated pressure control valve. In this respect, the present hydraulic pressure control apparatus is different from the hydraulic pressure control apparatus as disclosed in JP-A-10-322803, wherein the electric energies applied to both of the solenoid-operated pressure increase control valve and pressure reduction control valve are controlled to control the fluid pressure in the brake cylinder.

While the solenoid-operated pressure control valve is capable of controlling the fluid pressure in the brake cylinder according to the amount of electric energy applied thereto, the pressure control valve may be adapted to reduce the brake cylinder pressure with either an increase or a decrease in the electric energy applied thereto. Preferably, the pump device is connected to a single brake cylinder, or connected a plurality of brake cylinders so that the control device controls the fluid pressures in all of brake cylinders in the same manner.

Where the pump device is connected to a plurality of brake cylinders, a flow restrictor or a pump cut-off valve is preferably provided between the pump device and each of the brake cylinders, in order to permit the fluid pressures in the individual brake cylinders to be controlled independently of each other, as described below. The pump cut-off valve has an open state for connecting the brake cylinder to the pump device, and a closed state for disconnecting the brake cylinder from the pump device.

(2) A hydraulic pressure control apparatus according to the above mode (1), wherein the pressure reduction control means includes means for turning off the electric motor when the pressure of the fluid in the brake cylinder is reduced.

By turning off the electric motor, the pressurized fluid is not delivered from the pump to the brake cylinder. This arrangement assures more rapid reduction of the fluid pressure in the brake cylinder, than an arrangement wherein the electric motor is held on during the pressure reduction. The controller may further includes pressure hold control means for holding the pressure of the fluid in the brake cylinder by turning off the electric motor and placing the solenoid-operated pressure control valve in a closed state for inhibiting a discharge flow of the fluid from the brake cylinder toward the low-pressure source. By placing the solenoid-operated pressure control valve in the closed state with the electric motor held off, the fluid flows into and from the brake cylinder are both inhibited, so that the fluid pressure in the brake cylinder can be held constant with improved stability.

(3) A hydraulic pressure control apparatus according to the above mode (1) or (2), wherein the controller activates one of the pressure increase control means and the pressure reduction control means, depending upon at least one of a pressure difference between an actual value and a target value of the fluid pressure in the brake cylinder and a rate of change of the target value.

Where the pressure increase control means or the pressure reduction control means is activated depending upon the pressure difference, the controller may be adapted to activate the pressure control means when the pressure difference $\Delta P$ ($=P_{ref}-P^*$) between the target value $P_{ref}$ and the actual value $P^*$ of the brake cylinder pressure is larger than a predetermined threshold EPS, namely, when $\Delta P > EPS$, and activate the pressure reduction control means when the pressure difference $\Delta P$ is not larger than the threshold EPS, namely, when $\Delta P \leq EPS$.

Where the controller includes the pressure hold means indicated above, the controller activates the pressure increase control means when the pressure difference $\Delta P$ is larger than a predetermined positive threshold value EPS1, namely, when $\Delta P > EPS1$, activates the pressure reduction control means when the pressure difference $\Delta P$ is smaller than a predetermined negative threshold value $-EPS2$, namely, when $\Delta P < -EPS2$, and activates the pressure hold means when the pressure difference $\Delta P$ is in a range between the negative and positive threshold values $-EPS2$ and EPS1, namely, when $-EPS2 \leq \cdot EPS1$.

Where one of the pressure increase control means, pressure hold control means and pressure reduction control means is activated depending upon the rate of change $\Delta P_{ref}$ of the target brake cylinder pressure as well as the pressure difference $\Delta P$, the controller may be adapted to activate the pressure hold control means rather than the pressure increase control means when the pressure difference $\Delta P$ is larger than the positive threshold value EPS1 while the rate of change $\Delta P_{ref}$ is not higher than a predetermined positive threshold value RPS1, namely, when $\Delta P > EPS1$, and $\Delta P_{ref} \leq RPS1$, and also activate the pressure hold means rather than the pressure reduction means when the pressure difference $\Delta P$ is smaller than the negative threshold value $-EPS2$ while the rate of change $\Delta P_{ref}$ is not lower than a predetermined negative threshold value $-RPS2$, namely, when $\Delta P < -EPS2$, and $\Delta P_{ref} \geq -RPS2$.

The absolute value of the positive threshold EPS1 and the absolute value of the negative threshold $-EPS2$ may be equal to each other, and the absolute value of the positive threshold RPS1 and the absolute value of the negative threshold $-RPS2$ may be equal to each other.

(4) A hydraulic pressure control apparatus according to any one of the above modes (1)–(3), wherein the controller includes a motor control device for controlling the electric motor to produce a larger output torque when a rate of increase of a target value of the fluid pressure in the brake cylinder is higher than a predetermined threshold, than when the rate of increase is not higher than the predetermined threshold.

By increasing the output torque of the electric motor of the pump device, the flow rate or pressure of the pressurized fluid delivered from the pump can be increased. Accordingly, the rate of increase of the fluid pressure in the brake cylinder can be increased, with a result of reducing or eliminating a delay in the operation to increase the brake cylinder pressure. The rate of increase of the target value of the brake cylinder pressure exceeds the predetermined threshold when a normal operation to activate the brake cylinder is initiated (with an operation of a brake operating member) or when an emergency operation to activate the brake cylinder is initiated in such an event, the motor control device is activated to control the electric motor to produce the larger output torque.

The threshold of the increase rate of the target brake cylinder pressure may be an increase rate of the fluid pressure in the brake cylinder when the electric motor produces the largest output torque during a normal operation thereof, or an increase rate of the fluid pressure in the brake cylinder when the nominal voltage of a battery used for the hydraulic pressure control apparatus is applied to the electric motor.

When the increase rate of the target value of the brake cylinder pressure is higher than the threshold, the voltage applied to the electric motor is made higher than a voltage normally applied to the electric motor, or higher than the nominal voltage of the battery. Alternatively, an electric current applied to the electric motor may be made larger than an electric current normally applied to the motor. In such a case, the output torque of the electric motor may not be controlled. However, the control of the output torque is not essential, provided the fluid pressure in the brake cylinder can be increased at a sufficiently highs rate. As is apparent from the above explanation, the motor control device permits a rapid increase of the brake cylinder pressure, an increase in the output torque of the electric motor, and an increase in the delivery rate or pressure of the pump.

The motor control device adapted to increase the output torque of the electric motor when the increase rate of the target value of the brake cylinder pressure is higher than the threshold is capable of increasing the delivery rate or pressure of the pap device, permitting an increased rate of increase of the fluid pressure in the brake cylinder, without increasing the capacity of the electric motor, and therefore without increasing the cost of manufacture of the pump device. To increase the brake cylinder pressure at a rate higher than the threshold, by increasing the delivery rate or pressure of the pump device with a normal control of the electric motor, it is necessary to use an electric motor having a larger capacity, which is inevitably expensive. The present arrangement to increases the output torque of the electric motor when the increase rate of the target brake cylinder pressure is higher than the threshold does not require an increase in the capacity and cost of manufacture of the electric motor.

The feature according to the above mode (4) is available independently of the feature provided in any one of the above modes (1), (2) and (3). That is, the feature according to the above mode (4) is available in a hydraulic pressure control apparatus which is adapted to increase the brake cylinder pressure by controlling the electric energy applied to a solenoid-operated pressure increase control valve and at the same time controlling the electric motor of the pump device, a hydraulic control apparatus which is adapted to increase and reduce the brake cylinder pressure by controlling a solenoid-operated pressure increase control shut-off valve and a solenoid-operated pressure reduction control shut-off valve, respectively, or a hydraulic pressure control apparatus which is adapted to increase and reduce the brake cylinder pressure by controlling electric motors of a pressure increasing pump and a pressure reducing pump of the pump device, respectively.

(5) A hydraulic pressure control apparatus according to the above mode, further comprising a battery for supplying power to said electric motor, and wherein the motor control device comprises a voltage increasing device for applying to the electric motor a voltage higher than a nominal voltage of the battery when the rate of increase of the target value of the fluid pressure in the brake cylinder is higher than the predetermined threshold.

The voltage increasing device may include a driver circuit incorporating a coil, a capacitor and a switching element such as a transistor, or alternatively a DC-DC converter or a booster converter.

(6) A hydraulic pressure control apparatus according to any one of the above modes (1), (2) and (3), wherein the controller includes a motor start control device for applying a higher voltage to the electric motor when the electric motor is turned on, and holding the higher voltage applied to the electric motor while a predetermined condition is satisfied, the higher voltage being higher than a voltage to be applied to the electric motor after the predetermined condition is satisfied.

Since the higher voltage is applied to the electric motor when the electric motor is turned on, the electric motor can be brought to a desired operating state (with desired operating speed and output torque) in a short time. Accordingly, the delivery rate and pressure of the pump device can be rapidly increased to the desired values. An electric motor cannot be brought to a desired operating state due to an inertia if the stationary electric motor is activated by application of a normal voltage. In the present arrangement according to the above mode (6), the electric motor is activated by application of the relatively high voltage, in order to rapidly increase the delivery rate and pressure of the pump device, making it possible to reduce a delay in the operation to increase the brake cylinder pressure. The higher voltage is held applied to the electric motor until the predetermined condition is satisfied, for instance, until a predetermined time has passed after starting of the electric motor, or until the brake cylinder pressure has been increased to a predetermined level.

The feature according to the above mode (6) is available independently of the feature according to any one of the above modes (1)–(3).

(7) A hydraulic pressure control apparatus according to any one of the above modes (1)–(6), wherein the controller includes pressure hold control means for turning off the electric motor and placing the solenoid-operated pressure control valve in a state for inhibiting a discharge flow of the fluid from the brake cylinder, when a rate of change of a target value of the fluid pressure in the brake cylinder is held within a predetermined range.

In the hydraulic pressure control apparatus according to the above mode (7), the fluid pressure in the brake cylinder is not changed with a change in the rate of change of the target value of the brake cylinder pressure, but is held constant, while the rate of change is held within the predetermined range. For instance, the predetermined range is a range in which the target value of the brake cylinder pressure changes due to a small variation of the operating amount (operating force or stroke) of the brake operating member which is not recognized by the operator of the brake operating member. In this range within which the operator does not intend to change the braking force produced by the brake cylinder, it is desirable to inhibit an operation of the pump device, which would merely results in a waste of an electric energy and generation of a operating noise of the pump device. Where the brake cylinder is used to brake a wheel of an automotive vehicle, the rate of change of the target value of the brake cylinder pressure may change during running of the vehicle without a change in the operating amount of the brake operating member. In this case, a change in the fluid pressure in the brake cylinder results in a change in the deceleration value of the vehicle, which would be unexpected to the vehicle operator. The present arrangement prevents this problem. Further, the present arrangement eliminates a need for the vehicle operator to make efforts in maintaining the operating amount of the brake operating member constant, leading to easier manipulation of the brake operating member.

(8) A hydraulic pressure control apparatus according to the above mode (7), wherein the controller includes pressure holding condition relaxing means for changing the predetermined range such that the predetermined range is wider when the pressure hold control means is in operation for a relatively long time than when tile pressure hold control means is in operation for a relatively short time.

When the pressure hold control means is in operation for a relatively long time, the operator generally desires to maintain the braking force generated by the brake cylinder. In this case, therefore, it is desirable to restrict a change in the fluid pressure in the brake cylinder. Since this arrangement results in an increase in the time during which the electric motor is held off, the electric energy consumption by the pump device is accordingly reduced. The predetermined range indicated above may be increased either in steps or continuously with an increase in the time of operation of the pressure hold control means.

(9) A hydraulic pressure control apparatus according to any one of the above modes (1)–(8), wherein the controller includes pressure hold control means for turning off the electric motor and placing the solenoid-operated pressure control valve in a state for inhibiting a discharge flow of the fluid from the brake cylinder, when a predetermined condition is satisfied, and pressure holding condition relaxing means for changing the predetermined condition such that the predetermined condition is more relaxed when the pressure hold control means is in operation for a relatively long time than when the pressure hold control means is In operation for a relatively short time.

Where the predetermined condition is satisfied when the pressure difference $\Delta P$ between the target value and the actual value of the fluid pressure in the brake cylinder is held within a predetermined range (EPS1$\geq\Delta P\geq$-EPS2, the predetermined condition can be relaxed by increasing the upper limit EPS1 of the predetermined range and/or reducing tie lower limit -EPS2 of the predetermined range. The predetermined condition may be satisfied when the pressure difference $\Delta P$ is held within a first predetermined range while the rate of change of the target value of the fluid pressure in the brake cylinder is held within a second predetermined range. The predetermined condition may be satisfied when the rate of change of the target value of the fluid pressure in the brake cylinder is held within a predetermined range. In these cases, too, the predetermined condition can be changed by changing at least one of the upper and lower limits of the predetermined range (each of the first and second predetermined ranges), as indicated above.

The feature according to the above mode (9) is available independently of the feature of any one of the above modes (1)–(6).

(10) A hydraulic pressure control apparatus according to claim 1, wherein the brake cylinder is activated to brake a wheel of an automotive vehicle, and the controller includes pressure hold control means for turning off the electric motor and placing the solenoid-operated pressure control valve in a state for inhibiting a discharge flow of the fluid from the brake cylinder, when a predetermined condition is satisfied, and pressure holding condition relaxing means for changing the predetermined condition such that the predetermined condition is more relaxed when the automotive vehicle is stationary than when the automotive vehicle is running.

While the vehicle is stationary, the need of increasing or reducing the fluid pressure in the brake cylinder with a change in the operating amount of the brake operating member is not so high. It is sufficient to hold the brake cylinder pressure constant while the vehicle is stationary. In the apparatus according to the above mode (10), the predetermined condition for holding the brake cylinder pressure is relaxed while the vehicle is stationary, so that the operator does not have to make efforts in maintaining the operating amount of the brake operating member constant. Further, the relaxation of the predetermined condition results in an increase in the opportunity of operation of the pressure hold control means, leading to reduction of the electric energy consumption. The relaxation of the predetermination condition as described above with respect to the above mode (9) applies to this mode (10).

The feature according to the mode (10) is available independently of the feature according to any one of the above modes (1)–(9)

(11) A hydraulic pressure control apparatus according to any one of the above modes (1)–(10), wherein the brake cylinder is activated to brake a wheel of an automotive vehicle, and the controller includes: pressure increasing means for increasing the fluid pressure in the brake cylinder by controlling the electric motor of the pump device while a predetermined pressure increasing condition is satisfied; compulsory pressure holding means for holding the fluid pressure in the brake cylinder by holding the electric motor off and placing the solenoid-operated pressure control valve in a state for inhibiting a discharge flow of the fluid from the brake cylinder, after a rotating speed of the wheel has been once substantially zeroed, even while the predetermined pressure increasing condition is satisfied; and disabling means for disabling the compulsory pressure holding means to operate, when the rotating speed of the wheel has exceeded a predetermined threshold and when an amount of operation of a brake operating member has been increased while the compulsory pressure holding means is operating.

While the automotive vehicle is stationary, the need of increasing the fluid pressure in the brake cylinder with a change in the operating amount of the brake operating member is not so high. It is sufficient to hold the brake cylinder pressure constant while the vehicle is stationary. In the apparatus according to the above mode (10), the compulsory pressure holding means is provided for holding the brake cylinder pressure after the rotating speed of the wheel has been substantially zeroed, even while the predetermined pressure increasing condition is satisfied. However, the braking force generated by the brake cylinder must be increased with an increase in the operating amount of the brake operating member, if the vehicle begins to be moved for some reason or other, for instance, due to a collision of another vehicle with the back of the vehicle in question during stopping at a traffic signal, or due to stopping of the vehicle on an uphill or downhill road surface, without releasing of the brake operating member. To this end, the disabling means is provided for disabling the compulsory pressure holding means, when the rotating speed of the wheel has exceeded the predetermined threshold and when the amount of operation of the brake operating member has been increased while the compulsory pressure holding means is operating.

The feature according to the above mode (11) is available independently of the feature according to any one of the above modes (1)–(10).

(12) A hydraulic pressure control apparatus according to any one of the above modes (1)–(11), wherein the controller includes pressure increase commanding means for commanding an increase in the fluid pressure in the brake cylinder when a predetermined pressure increase condition is satisfied, and motor pre-starting means for turning on the electric motor when the predetermined pressure increase condition is expected to be satisfied in the near future.

A delay in the operation to increase the fluid pressure in the brake cylinder can be reduced if the electric motor of the pump device is started or turned on before generation of a command to increase the brake cylinder pressure, when the predetermined pressure increase condition is expected to be satisfied in the near future. The motor pre-starting means may include detecting means for detecting a sign indicating a high possibility that the pressure increase condition will be satisfied in the near future. Where the predetermined pressure increase condition is satisfied when the brake operating member is operated, the sign may be a releasing operation of an accelerator pedal of the vehicle. Where the pressure increase condition is satisfied when a predetermined traction control condition to initiate a traction control of the vehicle drive wheels is satisfied, the sign may be a pre-traction control condition of the vehicle which is to be satisfied slightly before the traction control condition is satisfied.

The feature according to the above mode (12) is available independently of the feature according to any one of the above modes (1)–(11).

(13) A hydraulic pressure control apparatus according to the above mode (12), wherein the controller includes motor stopping means for turning off the electric motor when a predetermined time has passed, without satisfaction of the predetermined pressure increase condition, after the electric motor is turned on by the motor pre-starting means.

If the predetermined pressure increase condition is not satisfied within the predetermined time after a sign indicating a high possibility that the pressure increase condition will be satisfied in the near future is detected, namely, after the electric motor is turned on by the motor pre-starting means, it means that the preliminary starting of the electric motor before the pressure increase condition is satisfied is likely to be unnecessary. In such a case, therefore, it is desirable to turn off the electric motor.

However, the motor stopping means may be adapted to turn off the electric motor when the sign indicating a high possibility that the pressure increase condition will be satisfied in the near future has become absent. For instance, where the electric motor is turned on when the pre-traction control condition is satisfied, the electric motor may be turned off when the pre-traction control condition has become absent.

(14) A hydraulic pressure control apparatus according to the above mode (12) or (13), wherein the brake cylinder is activated to brake a wheel of an automotive vehicle, the apparatus further comprising a downhill running detector for detecting that the automotive vehicle is running downhill, if an actual acceleration value of the vehicle is higher than an estimated acceleration value of the vehicle which is obtained on the basis of a vehicle drive torque produced by a drive power source for driving the vehicle, and wherein the motor pre-starting means including means for turning on the electric motor when at least one sign indicating a high possibility that the predetermined pressure increase condition will be satisfied in the near future is detected, the at least one sign including detection by the downhill running detector that the automotive vehicle is running downhill.

The brake operating member is usually likely to be operated during downhill running of the automotive vehicle. Detection of a downhill running of the vehicle may be a sign indicating a high possibility that the predetermined pressure increase condition will be satisfied in the near future. A delay in the operation to increase the brake cylinder pressure is reduced by turning on the electric motor when the downhill running is detected.

The downhill running detector may include an actual acceleration obtaining device and an estimated acceleration obtaining device. The actual acceleration obtaining device may include (1) an acceleration sensor for detecting the actual acceleration value of the vehicle, or (2) wheel speed sensors for detecting the rotating speeds of the vehicle wheels, and acceleration calculating means for calculating the actual acceleration value of the vehicle on the basis of the rotating speeds of the wheels detected by the wheel speed sensors. In the latter case, the acceleration calculating means obtains an estimated running speed of the vehicle on the basis of the detected speeds of the wheels, and obtains the acceleration value of the vehicle as a rate of change of the estimated running speed of the vehicle. The estimated acceleration obtaining device may be adapted to estimate the acceleration value of the vehicle on the basis of the drive torque of the vehicle drive power source. As described below with respect to the first preferred embodiment of the invention, the estimated acceleration value of the vehicle may be obtained as (F−F')/M, wherein "F" represents a drive torque produced by the drive power source, "F'" represents a road load, and "M" represents a weight M of the vehicle. The drive power source includes at least one of an internal combustion engine and an electric motor, and the drive torque F is the total torque of the engine and/or the electric motor. When the vehicle is running on a flat road surface, the actual acceleration value and the estimated acceleration value of the vehicle are substantially equal to each other. When the vehicle is running uphill, the actual acceleration value is smaller than the estimated acceleration value. When the vehicle is running downhill, the actual acceleration value is larger than the estimated acceleration value. Based on this fact, a downhill running of the vehicle can be detected.

(15) A hydraulic pressure control apparatus according to the above mode (14), wherein the above-indicated at least one sign further including at least one of (a) detection of releasing of an accelerator member provided for accelerating the automotive vehicle, and (b) detection that a gradient of a downhill road surface on which the vehicle is running is higher than a predetermined threshold.

Where the above-indicated at least one sign further includes the detection of releasing of the accelerator member, the motor pre-starting means turns on the electric motor of the pump device when the accelerator member is released during a downhill running of the vehicle. The releasing of the accelerator member reflects a desire of the vehicle operator to decelerate the vehicle, and indicates a high possibility of a subsequent operation of the brake operating member.

Where the above-indicated at least one sign further includes the detection that the gradient of the downhill road surface is higher than the predetermined threshold, the motor pre-starting means turns on the electric rotor of the pump device when the gradient of the downhill road surface on which the vehicle is running is detected to be higher than the threshold. When the downhill road surface has a relatively high gradient, the operator is likely to operate the brake operating member. The downhill road surface gradient higher than the threshold may be detected on the basis of a difference between the actual and estimated acceleration values of the vehicle described above.

(16) A hydraulic pressure control apparatus according to any one of the above modes (1)–(15), wherein a plurality of brake cylinders are connected through respective branch passages to the pump device such that the plurality of brake cylinders are parallel with each other, and the solenoid-operated pressure control valve is provided in each of a plurality of pressure reducing passages respectively connecting the branch passages to the low-pressure source, the apparatus further comprising a flow restrictor device provided in a portion of each of the branch passages which is located between the pump device and a point of connection thereof to a corresponding one of the pressure reducing passages.

In the hydraulic pressure control apparatus according to the above mode (16), the fluid pressures in the plurality of brake cylinders can be controlled to different levels. When the solenoid-operated pressure control valve corresponding to one of the brake cylinders is placed in a state for permitting a discharge flow of the fluid from that one brake cylinder, the fluid pressure in a portion of the branch passage between the flow restrictor device and the pump device is higher than that is a portion of the branch passage between the flow restrictor device and the brake cylinder (pressure control valve). However, the branch passages corresponding to the pressure control valves which are not placed in the state for permitting the discharge flow of the fluid from the corresponding brake cylinders do not have such a fluid pressure difference across the flow restrictor device. Thus, the fluid pressures in the brake cylinders corresponding to the pressure control valves which are not placed in the above-indicated state are substantially equal to the delivery pressure of the pump device, while the fluid pressure in the brake cylinder corresponding to the pressure control valve which is placed in the above-indicated state is lower than the delivery pressure of the pump device. The brake cylinder pressure difference with respect to the delivery pressure of the pump device is determined by the electric energy applied to the solenoid-operated pressure control valve. To control the fluid pressure in the individual brake cylinders independently of each other, the delivery pressure of the pump device is controlled to be equal to the highest one of the desired or target brake cylinder pressures, and the electric energies to be applied to the individual pressure control valves are controlled so as to establish the desired fluid pressures in the individual brake cylinders.

(17) A hydraulic pressure control apparatus according to the above mode, wherein the controller includes a motor control device for controlling the electric motor on the basis of a highest one of target values of the fluid pressures in the plurality of brake cylinders.

For instance, the electric motor of the pump device is controlled to be equal to the highest one of the target values of the brake cylinder pressures, and the solenoid-operated pressure control valves are controlled so as to establish the tar get fluid pressures in the respective brake cylinders. The electric motor may be controlled to be higher than the highest target pressure by a suitable amount. In this case, the pressure control valve for the brake cylinder whose target pressure is the highest should also be controlled. However, this arrangement assures higher accuracy of control of the brake cylinder pressures.

(18) A hydraulic pressure control apparatus according to any one of the above modes (1)–(17), wherein a plurality of brake cylinders are connected through respective branch passages to the pump device such that the plurality of brake cylinders are parallel with each other, and the solenoid-operated pressure control valve is provided in each of a plurality of pressure reducing passages respectively connecting the branch passages to the low-pressure source, the apparatus further comprising a pump cut-off valve provided in a portion of each of the branch passages which is located between the plump device and a point of connection thereof to a corresponding one of the pressure reducing passages, the pump cut-off valve having a flow permitting state for permitting a flow of the pressurized fluid delivered from the pump into a corresponding one of the brake cylinders, and a flow inhibiting state for inhibiting the flow of the pressurized fluid into the corresponding one of the brake cylinders, the controller including pump cut-off valve control means for placing the pump cut-off valve in the flow inhibiting state when a rate of reduction of a target value of the fluid pressure in each of at least one of the plurality of brake cylinders is higher than a predetermined pressure reduction threshold while a rate of change of the target value of the fluid pressure in each of the other of the brake cylinders is on the side of increasing the fluid pressure as compared with the predetermined pressure reduction threshold.

In the hydraulic pressure control apparatus according to the above mode (18), the pump cut-off valve placed in the flow permitting state functions as the flow restrictor device described above with respect to the above mode (16). When the pump cut-off valve is placed in the flow permitting state, the fluid pressure in the corresponding brake cylinder can be reduced by controlling the electric energy applied to the corresponding solenoid-operated pressure control valve. Thus, the fluid pressures in the individual brake cylinders can be controlled independently of each other.

When the rate of reduction of the target value of the fluid pressure in one of the brake cylinders is higher than the predetermined pressure reduction threshold, the corresponding pump cut-off valve is brought to the flow inhibiting state, and the electric energy applied to the corresponding solenoid-operated pressure control valve is controlled to reduce the fluid pressure in the brake cylinder in question. Although the fluid pressure in the brake cylinder can be reduced even when the corresponding pump cut-off valve is placed in the flow permitting state, it is difficult to reduce the fluid pressure in the brake cylinder at a sufficiently high rate, that is, without a delay. In view of this drawback, the pump cut-off valve is placed in the flow inhibiting state to inhibit the flow of the fluid from the pup device into the brake cylinder, for facilitating the reduction of the fluid pressure in the brake cylinder, thereby reducing a delay in the reduction of the brake cylinder pressure. Since the pump cut-off valve is not required to control the brake cylinder pressure, it may be a solenoid-operated shut-off valve.

Where the fluid pressure in at least one of the brake cylinders is to be held constant, it is desirable to disconnect the at least one brake cylinder from both the pump device and the low-pressure source. To hold the brake cylinder pressure constant, it is desirable to inhibit the flows of the fluid into and from the brake cylinder. To this end, the pump cut-off valve and the solenoid-operated pressure control valves are both placed in the flow inhibiting state.

(19) A hydraulic pressure control apparatus according to any one of the above modes (1)–(18), wherein the pump device includes a low-pressure pump and a high-pressure pump having a higher delivery pressure and a lower delivery flow rate than the low-pressure pump.

The use of the low-pressure pump and the high-pressure pump permits the overall delivery flow rate and pressure of the pump device to be controlled over relatively wide ranges, with comparatively small weights and sizes of those two pumps.

(20) A hydraulic pressure control apparatus according to the above mode (1), wherein the solenoid-operated pressure control valve includes a solenoid-operated seating valve having a valve seat, a valve member movable to be seated on and unseated from the valve seat, and an electromagnetic force generating device for generating an electromagnetic drive force corresponding to the electric energy applied thereto, such that the electromagnetic drive force acts on the valve member in a first direction for moving the valve member to be seated on the valve seat, the seating valve being constructed such that a pressure difference force based on a difference between the fluid fluid pressures in the low-pressure source and the brake cylinder acts on the valve member in a second direction opposite to the second direction, and wherein the controller further includes electric energy control means for controlling the electric energy to be applied to the electromagnetic force generating device, depending upon the fluid pressure in the brake cylinder, when the valve member of the seating valve is held seated on the valve seat.

(21) A hydraulic pressure control apparatus according to the above mode (1), wherein the solenoid-operated pressure control valve includes a solenoid-operated seating valve having a valve seat, a valve member movable to be seated on and unseated from the valve seat, and an electromagnetic force generating device for generating an electromagnetic drive force corresponding to the electric energy applied thereto, such that the electromagnetic drive force acts on the valve member in a first direction for moving the valve member to be seated on the valve seat, the seating valve being constructed such that a pressure difference force based on a difference between the fluid fluid pressures in the low-pressure source and the brake cylinder acts on the valve member in a second direction opposite to the second direction, and wherein the controller further includes slowly energy increasing means for slowly increasing the electric energy to be applied to said electromagnetic force generating device, when the valve member of the seating valve is seated on the valve seat.

The present invention also provides:

(22) A hydraulic pressure control apparatus for controlling a pressure of a working fluid in a brake cylinder, the apparatus comprising: pressure hold control means for holding the pressure of the fluid in the brake cylinder when a predetermined pressure holding condition is satisfied; and pressure holding condition relaxing means for go relaxing the predetermined pressure holding condition when it is estimated that an operator of the hydraulic pressure control apparatus desires to continue to hold the pressure of the fluid in the brake cylinder.

The pressure holding condition relaxing means may include estimating means for estimating that the operator of the apparatus desires to continue to hold the brake cylinder pressure. It is estimated that the operator of the apparatus desires to continue to hold the brake cylinder pressure, when the vehicle is stationary or when the rate of change of the target value of the brake cylinder pressure is relatively low. In this case, the pressure holding condition is relaxed as described above with respect to the above modes (7) through (11).

The present hydraulic pressure control apparatus may be adapted to increase the brake cylinder pressure by controlling the electric motor of a pump device and reduce the brake cylinder pressure by controlling the electric energy applied to a solenoid-operated pressure reduction control valve, as described above with respect to the above mode (1). The apparatus may be further adapted to increase the brake cylinder pressure by controlling the electric energy applied to a solenoid-operated pressure increase control valve and at the same time controlling the pump device. The apparatus may be adapted to increase the brake cylinder pressure by controlling a pressure increasing pump of the pump device and reduce the brake cylinder pressure by controlling a pressure reducing pump of the pump device. The apparatus may include a solenoid-operated pressure increase control shut-off valve and a solenoid-operated pressure reduction control shut-off valve.

(23) A hydraulic pressure control apparatus for controlling a pressure of a working fluid in a brake cylinder, the apparatus comprising: a low-pressure source for storing the fluid discharged from the brake cylinder; a solenoid-operated pressure control valve disposed between the low-pressure source and the brake cylinder; and a controller for controlling an electric energy applied to the solenoid-operated pressure control valve, and wherein the solenoid-operated pressure control valve includes a solenoid-operated seating valve having a valve seat, a valve member movable to be seated on and unseated from the valve seat, and an electromagnetic force generating device for generating an electromagnetic drive force corresponding to the electric energy applied thereto, such that the electromagnetic drive force acts on the valve member in a first direction for moving the valve member to be seated an the valve seat, the seating valve being constructed such that a pressure difference force based on a difference between the fluid fluid pressures in the low-pressure source and the brake cylinder acts on the valve member in a second direction opposite to the second direction, and wherein the controller includes electric energy control means for controlling the electric energy to be applied to the electromagnetic force generating device, depending upon the fluid pressure in he brake cylinder, when the valve member of the seating valve is held seated on the valve seat.

The solenoid-operated pressure control valve in the hydraulic pressure control apparatus according the above mode (23) is a normally open valve which is placed in the open state when no electric energy is applied thereto. When the electromagnetic drive force generated by application of an electric energy to the pressure control valve is larger than the pressure difference force, the pressure control valve is brought to the closed state with its valve member being seated on its valve seat. The pressure difference force is generated by the pressure difference between the fluid pressure in the low-pressure source such as a reservoir and the fluid pressure in the brake cylinder. Since the fluid pressure in the low-pressure source can be considered to be approximately equal to the atmospheric pressure, the pressure difference force corresponds to the brake cylinder pressure. To hold the valve member seated on the valve seat, the application of the maximum electric energy to the pressure control valve is not essential. That is, the valve member can be held seated on the valve seat, as long as the electromagnetic drive force generated by application of the electric energy is larger than the pressure difference force. Thus, the pressure control valve may be held in the closed state by controlling the electric energy depending upon the brake cylinder pressure. In this arrangement, the required amount of consumption of the electric energy by the pressure control valve is smaller than in the arrangement wherein the maximum electric energy is applied to the pressure control valve for holding it in the closed state.

The electric energy applied to the solenoid-operated pressure control valve may be changed with a change in the brake cylinder pressure, or may be kept constant at a predetermined value, for instance, at the value upon initiation of an anti-lock braking pressure control operation of controlling the fluid pressure in the brake cylinder for braking a wheel of an automotive vehicle in an anti-lock fashion. Even when the electric energy is kept constant at a suitable value determined by the wheel brake cylinder pressure at a given point of time during a control of the brake cylinder pressure, the required amount of electric energy can be made smaller than when the maximum electric energy is kept applied to the pressure control valve. Where the electric energy is controlled to change with a change in the brake cylinder pressure, the electric energy may be continuously changed or in steps.

The solenoid-operated pressure control valve may include a biasing device for biasing the valve member in the above-indicated second direction for moving the valve member away from the valve seat. To hold the pressure control valve in the closed state in this case, the electromagnetic drive force is required to be larger than a sum of the pressure difference force and a biasing force of the biasing device. However, the biasing force can be ignored, since it is used for merely holding the valve member away from the valve seat and can therefore be considerably small.

(24) A hydraulic pressure control apparatus according to the above mode (23), wherein the electric energy control means controls the electric energy to be applied to the electromagnetic force generating device such that the electromagnetic drive force is larger than the pressure difference force.

When the electromagnetic drive force is larger than the pressure difference force, the valve member can be held seated on the valve seat with high stability.

(25) A hydraulic pressure control apparatus according to the above mode (23) or (24), wherein the electric energy control means controls the electric energy to be applied to the electromagnetic force generating device such that the electromagnetic drive force is larger than the pressure difference force by at least a predetermined margin value.

When the electromagnetic drive force Fs larger than the pressure difference force Fp by at least the predetermined margin value Fr (where Fs>Fp+Fr), the valve member can be held seated on the valve seat with high stability, while assuring significantly reduction of the required amount of consumption of the electric energy. For instance, the margin value Fr may be determined on the basis of the maximum velocity of increase in the fluid pressure and a force required for forcing the valve member onto the valve seat, for example, as described below in detail. The margin value Fr may be either constant or variable. For instance, the margin value Fr may be a variable which is changed in proportion to the pressure difference force Fp. This arrangement is reasonable since the absolute values of detection errors and control errors of the pressure difference force and electromagnetic drive force increase as the pressure difference force and the electromagnetic drive force increase.

(26) A hydraulic pressure control apparatus according to the above mode (25), wherein the margin value is determined by at least a maximum velocity of increase in the fluid pressure at the solenoid-operated pressure control device.

When the fluid pressure presently controlled by the solenoid-operated pressure control valve is Pn, the fluid pressure Pn+1 a given time $\Delta T$ after the present time will not exceed a sum of the fluid pressure Pn and a maximum pressure increase amount $\Delta P = \alpha \cdot \Delta T$ (an amount by which the fluid pressure is expected to be increased at the maximum pressure increasing velocity $\alpha$). Namely, $Pn+1 \leq Pn+\alpha \cdot \Delta T$. Therefore, the valve member of the electromagnetic force generating device can be held seated on the valve seat by controlling or changing the electric energy to be applied to the electromagnetic force generating device with a cycle time equal to $\Delta T$ such that the electromagnetic drive force Fs is equal to or larger than the pressure difference force $Fp(Pn+\alpha \cdot \Delta T)$ corresponding to the fluid pressure (Pn+$\alpha \cdot \Delta T$). In this case, the margin value Fr is equal to or larger than the pressure difference force $Fp(\Delta P)$ corresponding to the maximum pressure increase amount $\Delta P = \alpha \cdot \Delta T$.

The maximum pressure increasing velocity $\alpha$ is determined by the maximum fluid pressure of a hydraulic pressure source, a flow resistance of the fluid through a fluid passage connecting the hydraulic pressure source and the brake cylinder, and a maximum cross sectional area of flow of the fluid through a solenoid-operated pressure increase control valve if provided in the fluid passage. The fluid flow resistance and the maximum cross sectional area of flow of the fluid through the pressure increase control valve are determined by the structural characteristics of the fluid passage and the pressure increase control valve. Where the hydraulic pressure source includes a pump, the maximum fluid pressure of the hydraulic pressure source is a maximum delivery pressure of the pump. Thus, the maximum pressure increasing velocity $\alpha$ of the solenoid-operated pressure control valve can be calculated based on the above-indicated factors. Further, the temperature of the working fluid may be taken into account in determining the maximum pressure increasing velocity. As the temperature of the fluid rises, the viscosity of the fluid is lowered, and the pressure increasing velocity is increased. The maximum pressure increasing velocity may be obtained by experimentation. Where the hydraulic pressure source includes a master cylinder operated by a brake operating member to generate a pressurized fluid whose pressure corresponds to an operating force acting on the brake operating member, on the other hand, the maximum pressure increasing velocity of the solenoid-operated pressure control valve is proportional to the velocity of increase in the fluid pressure in the master cylinder when the brake operating member is operated at an expected highest speed.

As described above, the maximum pressure increasing velocity can be the maximum velocity at which the fluid pressure can be increased in a braking system including the present hydraulic pressure control apparatus. However, the maximum pressure increasing velocity can be the maximum velocity at which the fluid pressure can be increased at the present moment of control or in the present control cycle, and which can be obtained, for instance, by the cross sectional area of fluid flow through the pressure increase control valve and the fluid pressure in the hydraulic pressure source at the present moment of control.

The maximum pressure increase amount $\Delta P$ determined by the maximum pressure increasing velocity $\alpha$ of the pressure control valve may vary with the control cycle time. If the maximum pressure increase amount $\Delta P$ is excessively large, the advantage of reducing the required amount of consumption of the electric energy is reduced. If the amount ΔP is excessively small, the valve member cannot be held seated on the valve seat with high stability. In view of this, the upper limit of the maximum pressure increase amount ΔP is desirably about 2%, 1% or 0.5% of the fluid pressure in the hydraulic pressure source, and the lower limit is desirably about 0.1%, 0.2% or 0.3% of the fluid pressure in the hydraulic pressure source.

(27) A hydraulic pressure control apparatus according to the above mode (25) or (26), wherein the margin value is determined by at least a force required for forcing the valve member onto the valve seat.

The valve member of the electromagnetic force generating device is seated on the valve member when the electromagnetic drive force is just equal to the pressure difference force. In this state, it is theoretically true that the working fluid does not flow through the solenoid-operated pressure control valve. Actually, however, a minute local gap is generally present between the valve member and the valve seat due to a dimensional or configurational error of the contact surfaces of the valve member and the valve seat. As a result, the pressure control valve generally suffers from some amount of leakage of the working fluid therefrom. The amount of such a minute gap may be reduced, and the amount of the fluid leakage may be reduced, by causing elastic deformation of the valve member and the valve seat by forcing the valve member onto the valve seat. Accordingly, the amount of the fluid leakage can be reduced to within a practically tolerable range in which the accuracy of control of the fluid pressure in the brake cylinder is satisfactory, if the electromagnetic drive force Fs is larger than the pressure difference force Fp by a margin value which is equal to a force Fa required to cause elastic deformation of the valve member and the valve seat which is sufficient to reduce the fluid leakage amount to within the tolerable range. The required force Fa is determined depending upon the roundness values and other dimensional and configurational accuracies, surface smoothness (roughness), modulus of elasticity of the materials, and other factors of the valve member and the valve seat. Relationships between the operating stroke S and the fluid leak amount ε and electromagnetic drive force Fs (force Fa) can be obtained by calculation or by experimentation, as shown in the graph of FIG. 25. According to these known relationships, it is possible to obtain the force Fa=Fs*−Fso required to force the valve member onto the valve seat for reducing the fluid leak amount to a tolerable value ε*. The tolerable value ε* may be a predetermined constant, or a variable which varies with the target value of the fluid pressure in the brake cylinder. This force Fa is an example of the force required for forcing the valve member onto the valve seat.

(28) A hydraulic pressure control apparatus according to any one of the above modes (25)–(27), wherein the margin value is determined by at least an amount of leak of the working fluid through a gap between contact surfaces of the valve member and the valve seat.

As described above, the amount of leak of the working fluid through the gap between the contact surfaces of the valve member and the valve seat is reduced as the force for forcing the valve member onto the valve seat is increased. In controlling the fluid pressure in the brake cylinder, it is desirable to minimize the amount of leak of the fluid. However, the fluid leak amount need not be zeroed, provided the fluid leak amount is reduced to a tolerable value. As this tolerable value is increased, the force required for forcing the valve member onto the valve seat is reduced, and the required amount of consumption of the electric energy is accordingly reduced.

(29) A hydraulic pressure control apparatus according to the above mode (23) or (24), wherein the electric energy control means includes means for controlling the electric energy to be applied to the electromagnetic force generating device, such that the electromagnetic drive force is larger than the pressure difference force by a margin value which is determined by at least one of a maximum velocity of increase in the fluid pressure at the solenoid-operated pressure control valve and a force required for forcing the valve member onto the valve seat.

In the apparatus according to the above mode (29), the electric energy to be applied to the electromagnetic force generating device of the solenoid-operated seating valve is controlled so that the electromagnetic drive force generated is larger than the pressure difference force by the predetermined margin value.

(30) A hydraulic pressure control apparatus according to any one of the above modes (23)–(29), wherein the electric energy control controls the electric energy to be applied to the electromagnetic forge generating device, further depending upon a temperature of the working fluid flowing through the solenoid-operated seating valve.

In the hydraulic pressure control apparatus according to the above mode (30) wherein the temperature of the working fluid flowing through the solenoid-operated seating valve is taken into account in controlling the electric energy to be applied to the electromagnetic force generating device, the accuracy of control of the fluid pressure in the brake cylinder is less likely to be influenced by a change in the fluid temperature, than in an apparatus wherein the fluid temperature is not taken into account. As described in detail with respect to the presently preferred embodiments of this invention, the electric energy in the form of an electric current i is determined according to an equation (8) (which will be described), on the basis of a density ρ, a compression coefficient (volume change coefficient) β and a flow rate coefficient C of the fluid, a pressure difference ΔP across the seating valve, and a rate of change dP/dt of the target value of the fluid pressure in the brake cylinder. The pressure difference ΔP is a difference between the fluid pressure in the brake cylinder and the fluid pressure in the low-pressure source (reservoir). Since the fluid pressure in the reservoir is almost equal to the atmospheric pressure, the pressure difference ΔP can be considered to be substantially equal to tile fluid pressure in the brake cylinder. The density ρ and compression coefficient β of the working fluid are determined by the temperature of the fluid. Therefore, the electric current i determined according to the equation (8) reflects the temperature of the fluid.

(31) A hydraulic pressure control apparatus for controlling a pressure of a working fluid in a brake cylinder, the apparatus comprising: a low-pressure source for storing the fluid discharged from the brake cylinder; a solenoid-operated pressure control valve disposed between the low-pressure source and the brake cylinder; and a controller for controlling an electric energy applied to the solenoid-operated pressure control valve, and wherein the solenoid-operated pressure control valve includes a solenoid-operated seating valve having a valve seat, a valve member movable to be seated on and unseated from the valve seat, and an electromagnetic force generating device for generating an electromagnetic drive force corresponding to the electric energy applied thereto, such that the electromagnetic drive force acts on the valve member in a first direction for moving the valve member to be seated on the valve seat, the seating valve being constructed such that a pressure difference force based on a difference between the fluid fluid pressures in the low-pressure source and the brake cylinder acts on the valve member in a second direction opposite to the second direction, and and wherein the controller further includes slowly energy increasing means for slowly increasing the electric energy to be applied to said electromagnetic force generating device, when the valve member of the seating valve is seated on the valve seat.

When the valve member is required to be seated onto the valve seat, the electric energy to be applied to the electromagnetic force generating device may be relatively rapidly increased so that the electromagnetic drive force is rapidly increased to a value sufficient for seating the valve member on the valve seat with high stability. In the hydraulic pressure control apparatus according to the above mode (28), the electric energy is slowly increased so that the velocity at which the valve member is seated onto the valve seat is made low enough to reduce an impact and a noise of seating of the valve member against the valve seat. The present arrangement has a further advantage of increasing the durability of the seating valve of the solenoid-operated pressure control valve. Further, the required amount of consumption of the electric energy by the pressure control valve is reduced. The slowly energy increasing means which provides the advantages indicated above may be considered to be means for reducing the velocity of seating of the valve member onto the valve seat, means for reducing the noise of seating of the valve member onto the valve seat, means for reducing the impact of seating of the valve member against the valve seat, and means for assuring slow or soft seating of the valve member onto the valve seat.

In the solenoid-operated pressure control valve included in the present hydraulic pressure control apparatus, the pressure difference force acts on the valve member in the direction for moving the valve member away from the valve seat, while the electromagnetic drive force generated by the electromagnetic force generating device acts on the valve member in the direction for moving the valve member toward the valve seat. To cause the valve member to be seated on the valve seat, the electromagnetic drive force must be larger than the pressure difference force. However, an excessively large amount of the electromagnetic drive force causes problems such as an excessively high velocity of seating of the valve member onto the valve seat. These problems may be solved by controlling the electric energy so that the electromagnetic drive force is only slightly larger than the pressure difference force. However, the control of the electric energy to accurately control the electromagnetic drive force as described above is difficult. If the electromagnetic drive force is smaller than the pressure difference force, the valve member cannot be seated on the valve seat. According to the above mode (28), the electric energy is slowly increased to slowly increase the electromagnetic drive force. This arrangement permits a higher degree of stability of seating of the valve onto the valve seat, while avoiding an excessively high velocity of seating of the valve member on the valve seat. Where the pressure difference force is zero, too, the slow increase of the electromagnetic drive force is effective to avoid the excessively high seating velocity of the valve member.

The slowly energy increasing means provided in the above mode (28) is activated when the valve member which is spaced apart from the valve member is required to be seated onto the valve seat. When it is required to activate the brake cylinder for providing a braking effect while the fluid pressure in the brake cylinder is not being controlled, (that is, while the solenoid-pressure pressure reduction control valve is in the open state, for instance) this pressure reduction control valve must be controlled to control the fluid pressure in the brake cylinder. For example, the slowly energy increasing means is activated when the brake cylinder pressure is increased while the brake cylinder pressure is not being controlled, that is, while the brake cylinder is not in operation, or when the brake cylinder pressure is increased after termination of reduction of the brake cylinder pressure, or when the brake cylinder pressure is held constant after termination of reduction of the brake cylinder pressure. The slowly energy increasing means may be considered to include means for slowing increasing the electric energy when the brake cylinder is activated to initiate a braking operation, means for slowing increasing the electric energy immediately after initiation of an operation to increase the brake cylinder pressure, and means for slowing increasing the electric energy immediately after termination of an operation to reduce the brake cylinder pressure.

The slowly energy increasing means may be adapted to slowly increase the electric energy in a predetermined fixed pattern, or in a pattern which varies depending upon the fluid pressure in the brake cylinder, for instance, in a pattern described below with respect to the following mode (32) or (33) of this invention. The rate of increase of the electric energy by the slowly energy increasing means may be held constant throughout the operation of this means, or may be changed as needed. The pattern in which the electric energy is slowly increased immediately after initiation of an operation to increase the brake cylinder pressure may be identical with or different from the pattern in which the electric energy is slowly increased immediately after termination of an operation to reduce the brake cylinder pressure. In the latter case, the rate or increase of the electric energy is desirably made higher when the electric energy is slowly increased immediately after initiation of the operation to increase the brake cylinder pressure.

(32) A hydraulic pressure control apparatus according to the above mode (31), wherein the slowly energy increasing means increases the electric energy to be applied to the electromagnetic force generating device, at a rate corresponding to a maximum velocity of increase in the fluid pressure in the brake cylinder.

The maximum velocity of increase of the fluid pressure in the brake cylinder is strictly a maximum velocity of increase of the fluid pressure at the solenoid-operated pressure control valve. By increasing the electric energy at a rate corresponding to the maximum velocity of increase of the fluid pressure in the brake cylinder, the valve member can be slowly seated onto the valve seat while avoiding a delay in the operation to increase the brake cylinder pressure. The electric energy may be increased at a rate corresponding to a sum of the maximum pressure increase velocity and a suitable margin value.

(33) A hydraulic pressure control apparatus according to the above mode (31) or (32), wherein the slowly energy increasing means increases the electric energy to be applied to said electromagnetic force generating device, on the basis of the fluid pressure in said brake cylinder and a deceleration coefficient.

The deceleration coefficient $\gamma$ a coefficient for reducing the velocity of seating of the valve member onto the valve seat. For instance, the deceleration coefficient $\gamma$ may be a coefficient such as $(1-\frac{1}{2}^r)$, which increases from "0" to "1"

as the time passes. As described below with respect to the presently preferred embodiments of the invention, the electric energy applied to the electromagnetic force generating device is controlled so that the generated electromagnetic drive force Fs is equal to Fs' which is a product of the electromagnetic drive force generated in the apparatus according to any one of the above modes (23)–(31) and the deceleration coefficient γ or a reciprocal (1/γ) of this deceleration coefficient γ. Namely, Fs'=Fs·(1−½$^r$), or Fs'=Fs/(1−½$^r$). Alternatively, the electric energy is controlled so that the generated electromagnetic drive force Fs is equal to Fs' which is a product of the pressure difference force Fp(Pref) corresponding to the target brake cylinder pressure Pref and the deceleration coefficient γ or a reciprocal (1/γ) of this deceleration coefficient γ. Namely, Fs'=Fp(Pref)·(1−½$^r$), or Fs'=Fp(Pref)/(1−½$^r$). Where the generated electromagnetic drive force Fs' is equal to the product of the value Fs and the reciprocal (1/γ) of the deceleration coefficient γ, the force Fs' is relatively large with respect to the force Fs or pressure difference force Fp(Pref) immediately after initiation of the control of the electric energy, the force Fs' approaches the force Fs or Fp(Pref) as the time passes. The time t may be expressed by the following equation:

$$=T_0+\Delta Tn,$$

In the above equation, "$T_0$", "$\Delta T$" and "n" respectively represent the control initiating time, the control cycle time and the number of control cycles.

(34) A hydraulic pressure control apparatus according to any one of the above modes (31)–(33), further comprising pressure increasing means for increasing the fluid pressure in the brake cylinder when a predetermined condition for effecting an increase in the fluid pressure in the brake cylinder is satisfied, and wherein the slowly energy increasing means includes preliminary energy applying means for applying the electric energy to the electromagnetic force generating device before the condition is satisfied, upon detection of a sign indicative of a high possibility that said condition will be satisfied.

The slow increase of the electric energy applied to the electromagnetic force generating device may be initiated when the predetermined condition for effecting an increase in the brake cylinder pressure is satisfied. In this case, however, there is a risk that some amount of the working fluid is discharged from the brake cylinder to the low-pressure source through the solenoid-operated pressure control valve (seating valve) which has not been fully closed. Accordingly, the increase in the brake cylinder pressure may be delayed. According to the above mode (34) of this invention, the application of the slowly increased electric energy to the electromagnetic force generating device of the pressure control valve is initiated before the above-indicated condition is satisfied, more precisely, when a sign indicative of a high possibility that the condition will be satisfied is detected. This arrangement reduces or eliminates the delayed increase of the brake cylinder pressure, improving a response of the pressure control valve to a command for initiating the increase of the brake cylinder pressure. Further, the present arrangement permits a slower increase of the electric energy than when the application of the electric energy is initiated when the predetermined condition is satisfied. Accordingly, the velocity at which the valve member is seated onto the valve seat can be lowered, so that the operating noise of the pressure control valve is reduced, and the durability of the valve is improved.

The sign indicative of a high possibility that the predetermined condition for effecting an increase in the brake cylinder pressure is satisfied in the near future is detected by a suitable detecting means. Where the predetermined condition is an operation of a brake operating member, this detecting means may be adapted to detect releasing of the brake operating member. Where the predetermined condition is satisfied when a predetermined condition for initiating a traction control or vehicle stability brake control is satisfied, the detecting means may be adapted to detect a predetermined condition which is satisfied before the condition for initiating the traction control or vehicle stability brake control is satisfied. The detecting means may be adapted to detect a sign indicative of a high possibility that the pressure control mode will be changed from the pressure reduction mode to the pressure hold or increase mode during a normal braking pressure control, an anti-lock braking pressure control, a traction control or a vehicle stability brake control. Means for effecting the normal braking pressure control may be adapted to control the fluid pressure in the brake cylinder so that a braking effect provided by the brake cylinder corresponds to an amount of operation of the brake operating member. Where the hydraulic pressure control apparatus is used for an automotive vehicle, the brake cylinder pressure may be controlled so that the deceleration of the vehicle obtained by activation of the brake cylinder meets the vehicle operator's intention as represented by the operating amount of the brake operating member.

The preliminary energy applying means need not be adapted to complete the seating of the valve member onto the valve seat before the predetermined condition for effecting the brake cylinder pressure increase is satisfied. In other words, the preliminary energy applying means may be adapted to cause at least a movement of the valve member toward the valve seat, so that the valve member can be seated onto the valve seat at a relatively low velocity in a short time aster the predetermined condition is satisfied. In this case, too, the delay in the increase of the brake cylinder pressure can be reduced. Where the application of the electric energy to the electromagnetic force generating device is initiated while the brake cylinder pressure is almost equal to the atmospheric pressure, the pressure difference force is zero, so that the valve member can be moved and seated on the valve seat by a relatively small electromagnetic drive force, even when a biasing force acts on the valve member in the direction opposite to the direction in which the electromagnetic drive force acts on the valve member.

It will be understood from the above explanation that the preliminary energy applying means functions as means for reducing a delayed increase of the brake cylinder pressure.

(35) A hydraulic pressure control apparatus according to the above mode (34), wherein the electric energy control means includes energy application terminating means for termination the application of the electric energy to the electromagnetic force generating device by the preliminary energy applying means when a predetermined time has passed after initiation of the application without satisfaction of the predetermined condition.

Where the application of the electric energy is initiated while the brake cylinder is not activated, it is desirable to terminate the application of the electric energy when the predetermined time has passed without satisfaction of the predetermined condition, that is, without initiation of an operation to increase the brake cylinder pressure. Continued application of the electric energy for a long time results in the solenoid-operated pressure control valve (e.g., pressure reduction control valve) being held in its closed state for the long time. Although the continued closure of the pressure control valve per se does not cause a problem, the continued application of the electric energy to the electromagnetic force generating device causes a rise of the temperature of the components of the pressure control valve and the temperature of the working fluid, resulting in an increase in the fluid pressure in the brake cylinder and a risk of causing a brake drag, and further resulting in unnecessary consumption of the electric energy. In this respect, it is desirable to terminate the application of the electric energy for a long time without an initiation of an operation to increase the brake cylinder pressure. The energy application terminating means meets this desire. The predetermined time indicated above may be considered a time during which the electric energy is applied to the electromagnetic force generating device by the preliminary energy applying means.

(36) A hydraulic pressure control apparatus according to the above mode (34) or (35), wherein the pressure increasing means includes a hydraulic pressure source, and a solenoid-operated pressure increase control valve disposed between the hydraulic pressure source and the brake cylinder, and wherein the controller further includes means for controlling an electric energy to be applied to the solenoid-operated pressure increase control valve, to increase the fluid pressure in the brake cylinder.

(37) A hydraulic pressure control apparatus according to any one of the above modes (31), (32) and (33), wherein the slowly energy increasing means Includes means for initiating the application of the electric energy to the electromagnetic force generating device when a predetermined condition for terminating an operation to reduce the fluid pressure in the brake cylinder.

By initiating the application of the electric energy to the electromagnetic force generating device when the predetermined condition for terminating an operation to reduce the brake cylinder pressure is satisfied, it is possible to reduce a delay in a subsequent operation to increase the brake cylinder pressure. The predetermined condition for terminating an operation to reduce the brake cylinder pressure may be satisfied during a normal braking pressure control operation, an anti-lock braking pressure control operation, a traction control operation or a vehicle stability brake control operation, or when a vehicle accelerating member is released. Where the pressure control valve is a normally open pressure reduction control valve, this control valve is normally placed in a state for reducing the fluid pressure in the brake cylinder. Therefore, the predetermined condition for terminating an operation to reduce the brake cylinder pressure may be a condition in which it is no longer necessary to hold the pressure control valve in the open state, namely, a condition in which there is a high possibility that the pressure control valve will be switched to the closed state in the near future.

The present invention further provides:

(38) A hydraulic control apparatus for controlling a pressure of a working fluid in a brake cylinder, the apparatus comprising: a reservoir for storing the fluid; a solenoid-operated pressure control valve disposed between the brake cylinder and the reservoir and having an open state for connecting the brake cylinder and the reservoir to each other and a closed state for disconnecting the brake cylinder and the reservoir from each other; and a controller for controlling an electric energy to be applied to the solenoid-operated pressure control valve, and wherein the pressure control valve is placed in the open state while the electric energy is not applied thereto, and is held in the closed state while a valve closing force including an electromagnetic drive force generated depending upon an amount of the electric energy applied to the pressure control valve is larger than a valve opening force including a pressure difference force based on a difference between the fluid pressures in the brake cylinder and the reservoir, the controller including energy control means for controlling the electric energy to be applied to the pressure control valve, depending upon the fluid pressure in the brake cylinder, when the pressure control valve is held in the closed state.

(39) A hydraulic pressure control apparatus according to the above mode (38), wherein the energy control means controls the electric energy to be applied to the pressure control valve such that the valve closing force is larger than the valve opening force by at least a predetermined margin value.

(40) A hydraulic pressure control apparatus according to any one of the above modes (20)–(39), further comprising: a hydraulic pressure source including at least one pump for pressurizing the fluid and delivering the pressurized fluid to the brake cylinder; and a solenoid-operated pressure increase control valve including (i) a valve seat, (ii) a valve member movable to be seated on and unseated from the valve seat, (iii) a biasing device for biasing the valve member in a first direction for moving the valve member to be seated on the valve seat, and (iv) an electromagnetic force generating device for generating an electromagnetic drive force corresponding to the electric energy applied thereto, such that the electromagnetic drive force acts on the valve member in a second direction opposite to the first direction, the pressure increase control valve being constructed such that a pressure difference force based on a difference between the fluid pressures in the hydraulic pressure source and the brake cylinder acts on the valve member in the second direction, the energy control means also controlling an electric energy to be applied to the solenoid-operated pressure increase control valve.

(41) A hydraulic pressure control apparatus according to the above mode (40), wherein the energy control means includes means for controlling the electric energy to be applied to the pressure increase control valve such that the fluid pressure in the brake cylinder corresponds to a force acting on a brake operating member which is operated by an operator to activate the brake cylinder.

In the apparatus according to the above mode (41), the fluid pressurized by the pump of the hydraulic pressure source is supplied to the brake cylinder, so that the brake cylinder is activated. The brake cylinder pressure is desirably controlled so as to be proportional to the force of operation of the brake operating member by the operator, as if the fluid pressurized by a master cylinder depending upon the operating force of the brake operating member were applied to the brake cylinder.

BRIEF DESCRIPTION OF THE DRAWINGS

The above and optional objects, features, advantages and technical and industrial significance of this invention will be further clarified by reading the following detailed description of presently preferred embodiments of the invention, when considered in connection with the accompanying drawings, in which:

FIG. 7 is a flow chart illustrating a downhill running determining routine executed in step S2 of the flow chart of FIG. 4;

FIG. 8 is a view showing an example of preliminary control of a pump motor of the motor device by the hydraulic pressure control apparatus;

FIG. 12 is a view showing the common pressure control of FIG. 11;

FIG. 14 is a view showing the independent pressure control of FIG. 13;

FIG. 15 is a flow chart illustrating a stationary vehicle braking control routine executed in step S13 of the flow chart of FIG. 4;

FIG. 16 is a flow chart illustrating a common pressure control routine executed in place of the routine of FIG. 10, according to a program stored in ROM of a hydraulic pressure control apparatus according to another embodiment of the present invention;

FIG. 17 is a view showing a common pressure control in place of that of FIG. 12, which is executed according to a program stored in ROM of a hydraulic pressure control apparatus according to a further embodiment of invention;

FIG. 24 is a view showing an example of control modes established by the linear valve devices of the hydraulic pressure control apparatus of FIG. 20;

FIG. 35 is a view showing a data map representing a compensation coefficient for controlling the electric current applied to the pressure reduction control valve, according to a yet further embodiment of the invention, which is stored in ROM of the hydraulic pressure control apparatus.

DETAILED DESCRIPTION OF THE PREFERRED EMBODIMENTS

Figure 1:
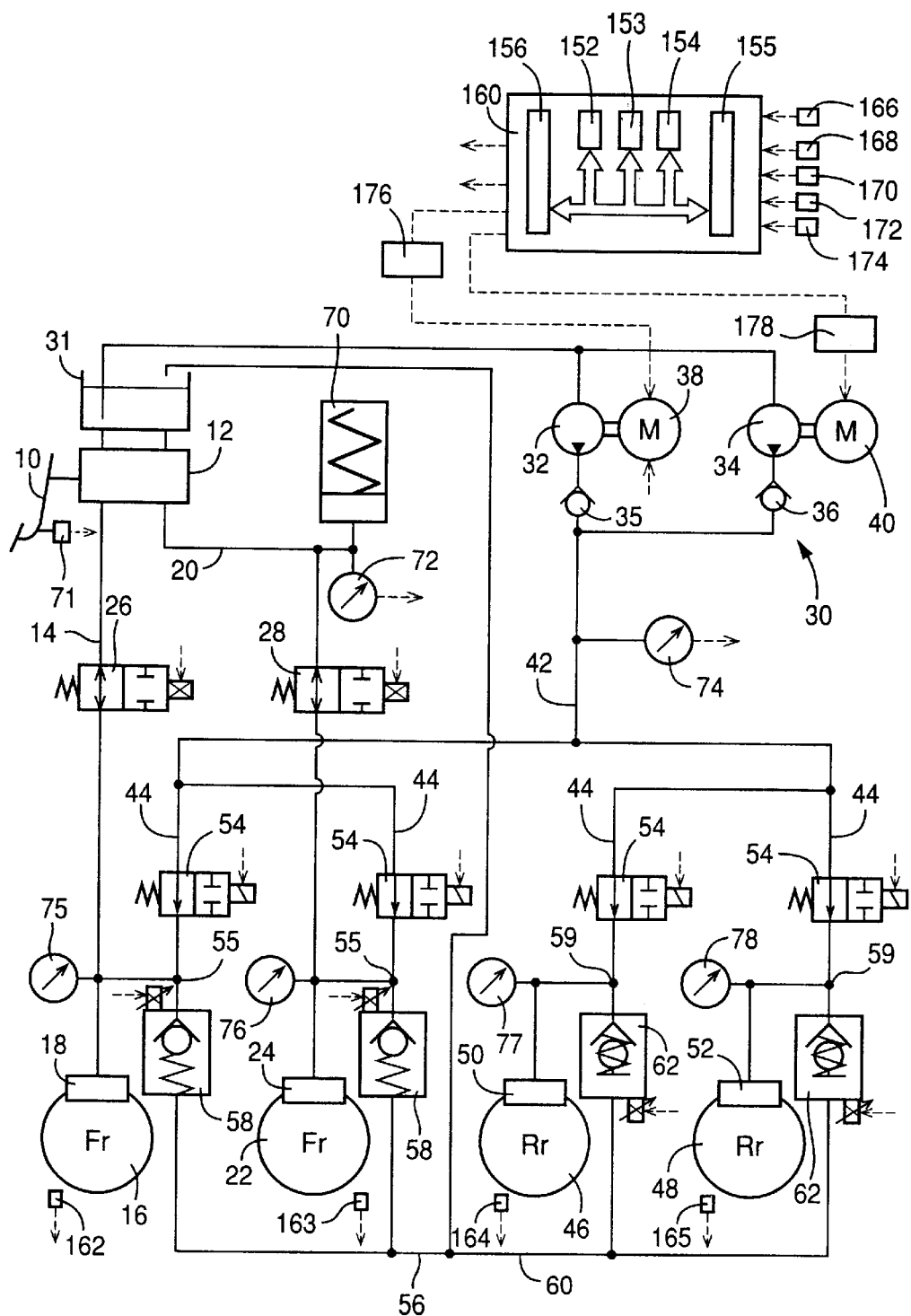
FIG. 1 is a schematic view illustrating a braking system including a hydraulic pressure control apparatus according to one embodiment of this invention.

Referring first to FIG. 1, there is shown a hydraulically operated braking system for an automotive vehicle, which includes a brake operating member in the form of a brake pedal 10, and a master cylinder 12. The master cylinder 12 is of a tandem type having two pressurizing chambers, one of which is connected through a fluid passage 14 to a brake cylinder 18 for a front left wheel 16 of the vehicle, and the other of which is connected through a fluid passage 20 to a brake cylinder 24 for a front right wheel 22 of the vehicle. Thus, the two front wheel brake cylinders 18, 24 are connected to the respective two pressurizing chambers of the master cylinder 12.

Solenoid-operated master cylinder cut-off valves 26, 28 are connected to the respective two fluid passages 14, 20. Each of these master cylinder cut-off valves 26, 28 is switchable between a closed state and an open state by energization and de-energization of its solenoid coil. When the pressure of a working fluid in the corresponding wheel brake cylinder 18, 24 is controlled, the master cylinder cut-off valve 26, 28 is held in its closed state with an electric current being applied to the solenoid coil. When the fluid pressure is not controlled, the master cylinder cut-off valve 26, 28 is held in its open state without an electric current being applied to the solenoid coil. Thus, each cut-off valve 26, 28 is a normally open valve, which is brought to the open state in the event of occurrence of any electrical abnormality.

The present braking system further includes a pump device 30, which includes a low-pressure source in the form of a master reservoir 31, two pumps 32, 34, and two check valves 35, 36. As shown in FIG. 1, the two pumps 32, 34 are disposed in parallel connection with each other. The pump 32 is a high-pressure small-capacity gear pump (hereinafter referred to as "high-pressure pump" where appropriate), while the pump 34 is a low-pressure large-capacity gear pump (hereinafter referred to as "low-pressure pump" where appropriate). The high-pressure pump 32 has a relatively higher maximum delivery pressure and a relatively small maximum delivery amount per unit time, while the low-pressure pump 34 has a relatively lower maximum delivery pressure and a relatively larger maximum delivery amount per unit time. The high-pressure pump 32 is operated by a high-pressure pump motor 38, while the low-pressure pump 34 is operated by a low-pressure pump motor 40.

The check valve 35 is provided to prevent the delivery pressure of the low-pressure pump 34 from acting on the high-pressure pump 32, while the check valve 36 is provided to prevent the delivery pressure of the high-pressure pump 34 from acting on the low-pressure pump 34. Further, a pressure relief valve (not shown) is connected in parallel with each of the high-pressure and low-pressure pumps 32, 34, for limiting the delivery pressure of the pump 32, 34 to the predetermined maximum level. The pressure and flow rate of the working fluid delivered from each pump 32, 34 (delivery pressure and rate of the pump 32, 34) can be adjusted by controlling the corresponding pump motor 38, 40.

Both of the high-pressure and low-pressure pumps 32, 34 need not be gear pumps. That is, at least one of these pumps 32, 34 may be a plunger pump. If a solenoid-operated shut-off valve is provided in place of the check valve 36, the fluid pressure in the wheel brake cylinders 18, 24 may be controlled by operating the low-pressure pump 34 in the reverse direction.

A pump passage 42 is connected to the delivery side of the pump device 30. The pump passage 42 is split into four branch passages 44 which are respectively connected at their ends to the above-indicated brake cylinders 18, 24 for the front wheels 16, 22, and brake cylinders 50, 52 for rear left and right wheels 46, 48. Thus, the four wheel brake cylinders 18, 24, 50, 52 are connected to the pump device 30 such that the wheel brake cylinders 18, 24, 50, 52 are connected in parallel with each other.

To each of the branch passages 44 of the pump passage 42, there is connected a solenoid-operated pump cut-off valve 54 having an open state for connection of the corresponding wheel brake cylinder to the pump device 30 and a closed state for disconnection of the wheel brake cylinder from the pump device 30. Each pump cut-off valve 54 is a normally open valve which is held in the open state without an electric current being applied to its solenoid coil A pressure reducing passage 56 is connected at one end thereof to each of the branch passages 44 for the front wheels 16, 22, at a point 55 between the pump cut-off valve 54 and the wheel brake cylinder 18, 24, and at the other end to the master reservoir 31. To this pressure reducing passage 56, there is connected a pressure reduction control valve 58 for each front wheel brake cylinder 18, 22. Similarly, a pressure reducing passage 60 is connected at one end thereof to each of the branch passages 44 for the rear wheels 46, 48, at a point 59 between the pump cut-off valve 54 and the wheel brake cylinder 50, 52, and at the other end to the master reservoir 31. To this pressure reducing passage 60, there is connected a pressure reduction control valve 62 for each rear wheel brake cylinder 50, 52. The pressure reduction control valves 58, 62 will be described.

In the present braking system, the four branch passages 44 of the pump passage 42 are provided with the respective pump cut-off valves 54, as described above, so that the fluid pressures in the wheel brake cylinders 18, 24, 50, 52 can be controlled independently of each other. When the pump cut-off valves 54 are placed in the open state, they also function as flow restrictors, so that a pressure difference may be present across each pump cut-off valve 54. Since the solenoid-operated pressure reduction control valve 58, 62 is located on one of the opposite sides of the corresponding pump cut-off valve 54 which is nearer to the wheel brake cylinder 18, 24, 50, 52, the fluid pressures in the wheel brake cylinders 18, 24, 50, 52 can be controlled independently of each other. That is, by controlling the pressure reduction control valve 58, 62, the fluid pressure in the portion of the branch passage 44 on one of the opposite sides of the pump cut-off valve 54 which is nearer to the wheel brake cylinder 18, 24, 50, 52 can be controlled to be higher or lower than that in the portion of the branch passage 44 which is nearer to the pump device 30. The fluid pressures in the portions of the branch passages 44 which are nearer to the wheel brake cylinder 18, 24, 50, 52 can be controlled independently of each other by controlling the solenoid-operated pressure reduction control valves 58, 62.

The front wheel brake cylinders 18, 24 are connected to both of the master cylinder 12 and the pump device 30, while the rear wheel brake cylinders 50, 52 are connected to the pump device 30 but are not connected to the master cylinder 12. In view of this arrangement, the solenoid-operated pressure reduction control valves 58 for the front wheel brake cylinders 18, 24 that can be operated by the master cylinder 12 are adapted to be normally closed, while the solenoid-operated pressure reduction control valves 62 for the rear wheel brake cylinders 50, 52 which are always operated by the pump device 30 are adapted to be normally open. Accordingly, the rear wheel brake cylinders 50, 52 do not suffer from so-called "brake drag" or a residual braking pressure, while the front wheel brake cylinders 18, 24 can be actuated by the master cylinder 12 even in the event of an electrical trouble, namely, even in the event of a failure of the pump device 30 and an electrical abnormality of the pressure reduction control valves 58.

To the fluid passage 33 indicated above, there is connected a stroke simulator 70 which functions to prevent an extremely short operating stroke of the brake pedal 10 when the wheel brake cylinders 18, 24, 50, 52 are disconnected from the master cylinder 12 by closing of the master cut-off valves 26, 28 and are connected to the pump device 30. The stroke simulator 70 may be connected to the fluid passage 14, or may connected directly to at least one of the pressurizing chambers of the master cylinder 12. Two or three stroke simulators 70 may be connected to the appropriate ones of the fluid passages 14, 20 and the pressurizing chambers.

The braking system includes a stroke sensor 71 for detecting the operating stroke of the brake pedal 10, a master cylinder pressure sensor 72 for detecting the fluid pressure in the master cylinder 12, a pump pressure sensor 74 for detecting the delivery pressure of the pump device 30, and wheel brake cylinder pressure sensors 75–78 for detecting the fluid pressures in the wheel brake cylinders 18, 24, 50, 52. Both of the stroke sensor 71 and the master cylinder pressure sensor 72 are not essential. Only one of these two sensors 71, 72 may be provided.

Figure 2:
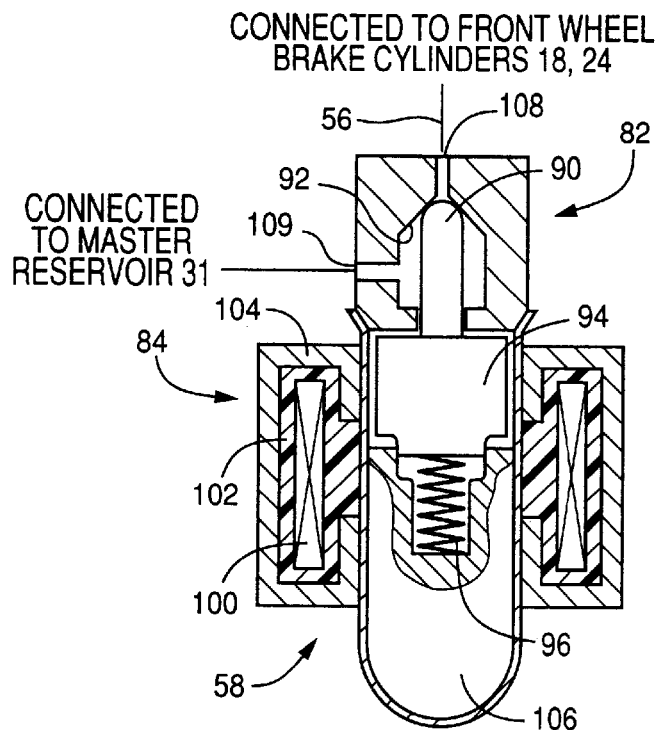
FIG. 2 is an elevational view in cross section schematically showing a solenoid-operated pressure reduction control valve included in the braking system of FIG. 1.

As shown in FIG. 2, each of the solenoid-operated pressure reduction control valves 58 for the front wheel brake cylinders 18, 24 includes a seating valve 82 and an electromagnetic force generating device 84. The seating valve 82 includes a valve member 90, a valve seat 92, an electromagnetically movable member 94 movable with the valve member 90, and an elastic member in the form of a spring 96 which serves as a biasing device for biasing the electromagnetically movable member 94 in a direction for moving the valve member 90 to be seated on the valve seat 92. The electromagnetic force generating device 84 includes a coil 100, a holder member 102 made of a resin for holding the coil 100, a first magnetic path forming body 104 and a second magnetic path forming body 106. By energizing the coil 100, there is produced a magnetic field. A substantive portion of the magnetic flux in the magnetic field passes through the first magnetic path forming body 104, the electromagnetically movable member 94, and an air gap between the movable member 94 and the second magnetic path forming body 106.

A magnetic force which acts between the electromagnetically movable member 94 and the second magnetic path forming body 106 can be changed by controlling the electric current to be applied to the coil 100. This magnetic force increases with an increase in the amount of electric current to be applied to the coil 100. Since the electric current amount and the magnetic force generated has a known relationship, the force for biasing the electromagnetically movable member 94 can be changed by continuously changing the electric current to be applied to the coil 100, according to the known relationship. This force (which will be referred to as "electromagnetic drive force Fs") acts on the electromagnetically movable member 94 in the direction away from the valve member 90, that is, in the direction for moving the valve member 90 away from the valve seat 92. This direction in which the electromagnetic drive force Fs acts on the movable member 94 is opposite to a direction in which a biasing force Fk of the spring 96 acts on the movable member 94.

As indicated above, the electromagnetic drive force Fs and the biasing force Fk of the spring 96 act on the valve member 90 through the electromagnetically movable member 94 in the pressure reduction control valve 58. In addition, a force Fp based on a difference between fluid pressures in an input port 108 and an output port 108 of the seating valve 82 acts on the valve member 90 in the direction for moving the valve member 90 away from the valve seat 92, that is, in the direction in which the electromagnetic drive force Fs acts on the valve member 90. When a sum of the electromagnetic drive force Fs and the force Fp (hereinafter referred to as "pressure difference force") is larger than the biasing force Fk of the spring 96 (where Fs+Fp>Fk), the pressure reduction control valve 58 (seating valve 82) is held in the open state with the valve member 90 being spaced apart from the valve seat 92. When the sum of the electromagnetic drive force Fs and the pressure difference force Fp is smaller than the biasing force Fk (where Fs+Fp<Fk), the pressure reduction control valve 58 is held in the closed state with the valve member 90 seated on the valve seat 92. Since the biasing force Fk of the spring 96 is determined to be larger than the pressure difference force Fp corresponding to the maximum delivery pressure of the pump device 30, the pressure reduction control valve 58 is held in the closed state when the electromagnetic drive force Fs is zero. That is, the pressure reduction control valve 58 is a normally closed valve, as indicated above.

In the present braking system, the electric current to be applied to the coil 100 of the pressure reduction control valve 58 is continuously controlled to regulate the fluid pressure in the corresponding front wheel brake cylinder 18, 24. The difference between the fluid pressures in the input and output ports 108, 109 of the pressure reduction control valve 58 corresponds to a difference between the fluid pressure in the wheel brake cylinder 18, 24 and the fluid pressure in the master reservoir 31. Since the fluid pressure in the master reservoir 31 can be considered to be equal to the atmospheric pressure, the pressure difference force Fp corresponds to the fluid pressure in the wheel brake cylinder 18, 24. The sum of the pressure difference force Fp and the electromagnetic drive force Fs can be controlled by controlling the electromagnetic drive force Fs. Therefore, the fluid pressure in the wheel brake cylinder 18, 24 can be controlled by controlling the electromagnetic drive force FS. The fluid pressure in the wheel brake cylinder 18, 24 can be reduced by increasing the electromagnetic drive force Fs. Described more precisely, the electric current to be applied to the coil 100 is controlled so that the actual fluid pressure in the wheel brake cylinder 18, 24 changes toward a determined target value.

Figure 3:
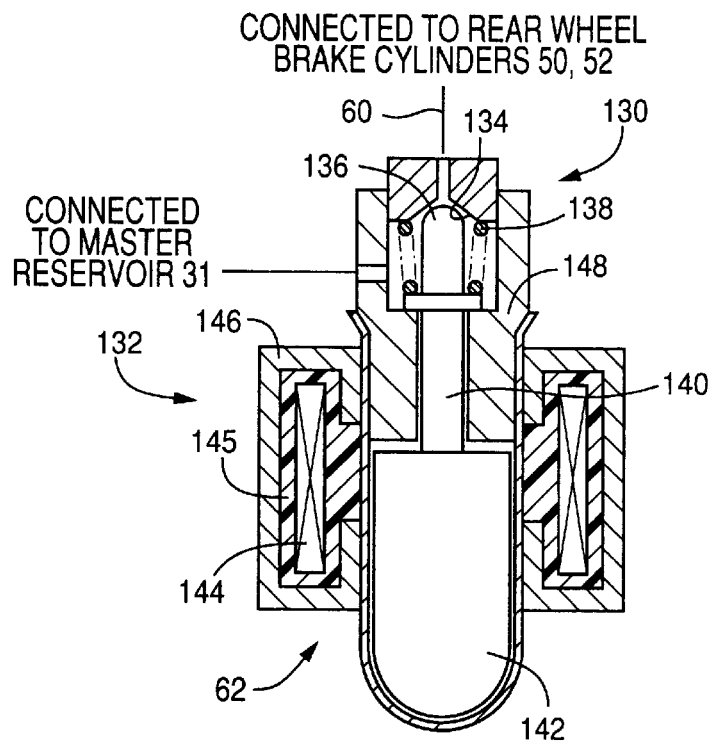
FIG. 3 is an elevational view in cross section schematically showing another solenoid-operated pressure reduction control valve included in the braking system of FIG. 1.

As shown in FIG. 3, each of the solenoid-operated pressure reduction control valves 62 for the rear wheel brake cylinders 50, 52 includes a seating valve 130 and an electromagnetic force generating device 132, line the pressure reduction control valves 58. The seating valve 130 includes a valve seat 134, a valve member 136 movable to be seated on and unseated from the valve seat 134, an elastic member in the form of a spring 138 serving as a biasing device for biasing the valve member 136 in a direction away from the valve seat 134, a drive member 140 for moving the valve member 136, and an electrically movable member 142. The drive member 140, valve member 136 and electromagnetically movable member 142 are movable as a unit.

The electromagnetic force generating device 132 includes a coil 144, a holder member 145 for holding the coil 144, a first magnetic path forming body 146, and a second magnetic path forming body 148 fixed to the housing of the control valve 62. When the coil 144 is energized, a magnetic field is produced with a magnetic flux passing through the first magnetic path forming body 146, the electromagnetically movable member 142, and an air gap between the movable member 142 and the second magnetic path forming body 148. As a result, an electromagnetic drive force Fs acts on the electromagnetically movable member 142 in a direction for moving the movable member 142 toward the second magnetic path forming body 148, so that the movable member 142 is moved to move the valve member 136 toward the valve seat 134. When the electromagnetic drive force Fs is zeroed, the valve member 136 is moved away from the valve seat 134 by a biasing force Fk of the spring 138.

The pressure reduction control valve 62 is held in its open state when the electromagnetic drive force Fs is smaller than a sum of the pressure difference force Fp and the biasing force Fk (where Fs<Fp+Fk). Since the biasing force Fk is very small, it can be ignored. When the electromagnetic drive force Fs is zero, the control valve 62 is held in the open state. That is, the control valve 62 is a normally open valve. When the electromagnetic drive force Fs is larger than the sum of the pressure difference force Fp and the biasing force Fk (where Fs>Fp+Fk), the control valve 62 is held in the closed state. The fluid pressure in the wheel brake cylinder 50, 52 can be reduced by reducing the electromagnetic drive force Fs. In the present embodiment, the electric current to be applied to the coil 144 is controlled so that the actual fluid pressure in the wheel brake cylinder 50, 52 changes toward a determined target value.

The braking system includes a control device 160 constituted principally by a computer incorporating a processing unit (PU) 152, a random-access memory (RAM) 153, a read-only memory (ROM) 154, an input portion 155 and an output portion 156. The input portion 155 is adapted to receive output signals of the above-indicated stroke sensor 71, master cylinder pressure sensor 72, pump pressure sensor 74 and wheel brake cylinder pressure sensors 75–78, and other sensors and switches such as wheel speed sensors 162–165 for detecting the rotating speeds of the wheels 16, 22, 46, 48, a brake switch 166 for detecting an operation of the brake pedal 10, a throttle opening sensor 168 for detecting an amount of operation of an accelerator pedal (not shown), a steering angle sensor 170 for detecting an operating angle of a steering wheel, and a yaw rate sensor 172 for detecting a yaw rate of the vehicle. The throttle opening sensor 168 may serve as a device for detecting an operation of the accelerator pedal. The input portion 155 is also connected to a power unit control device 174 which is provided for controlling a power unit of the vehicle including a drive power source and a transmission.

Figure 5:
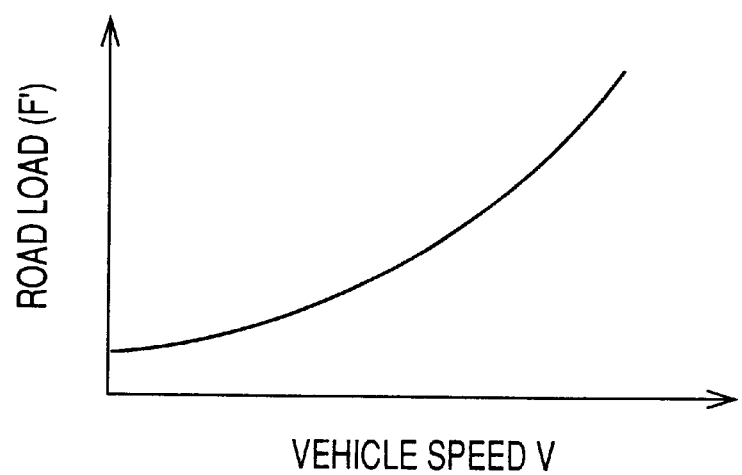
FIG. 5 is a graph indicating a relationship between a vehicle speed and a road load, which relationship is represented by a data table stored in the ROM of the hydraulic pressure control apparatus.
Figure 6:
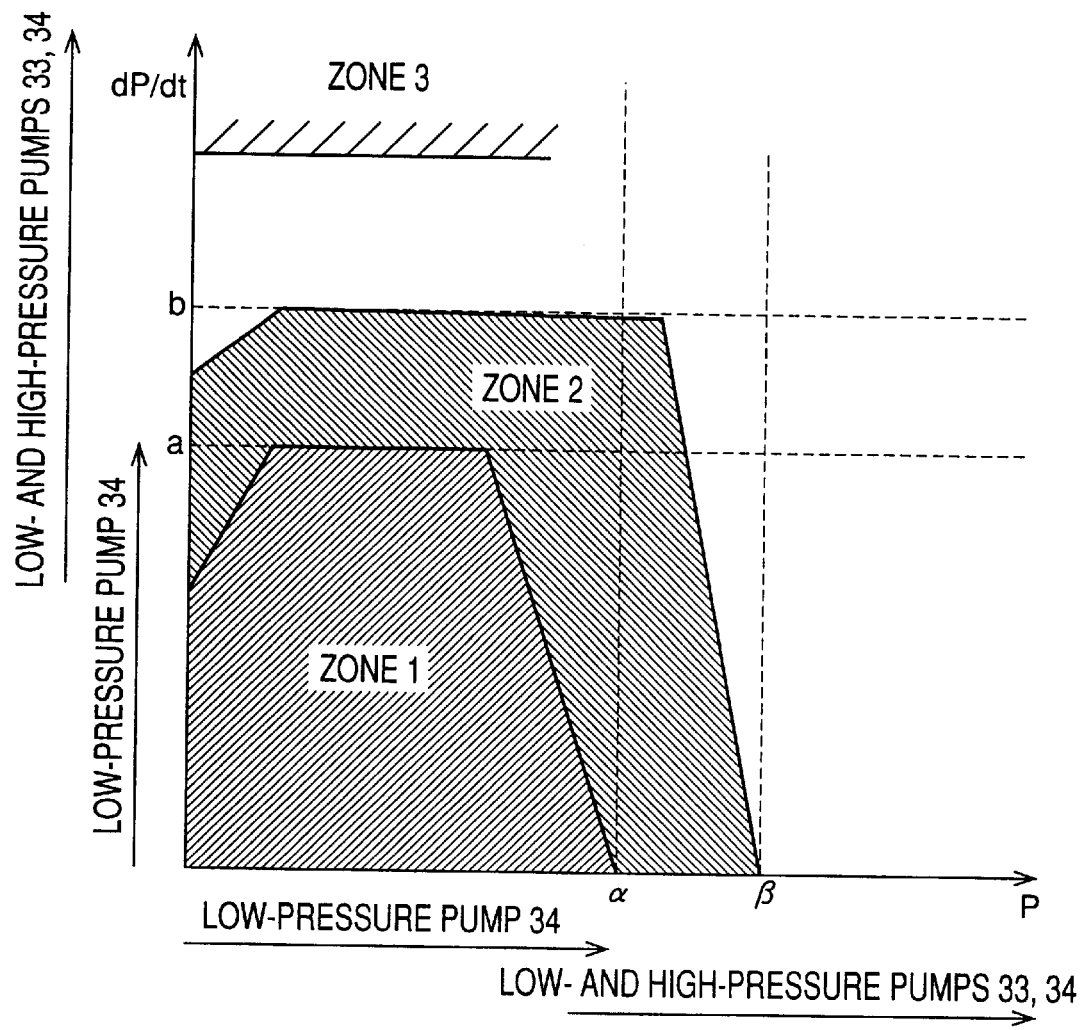
FIG. 6 is a view schematically indicating different control zones for a pump device controlled by the hydraulic pressure control apparatus.

The output portion 156 is connected to driver circuits (not shown) for the solenoid coils of the solenoid operated valves 26, 28, 54, 58, 62, and driver circuits 176, 178 for the high-pressure pump motor 38 and low-pressure pump motor 40. The ROM 154 stores various control programs including a program for executing a brake control routine illustrated in the flow chart of FIG. 4, a program for executing a normal braking pressure control routine, a program for executing an emergency braking control routine, a program for executing an anti-lock braking pressure control routine, a program for executing a vehicle stability control routine, and a program for executing a pump motor control routine. The ROM 154 further stores various data tables or maps as shown in FIGS. 5 and 6, which are used for controlling the braking system.

The control device 160 obtains a force acting on the brake pedal 10, on the basis of the output signals of the stroke sensor 71 and the master cylinder pressure sensor 72. In an initial portion of an operation of the brake pedal 10, an increase in the fluid pressure in the master cylinder 12 is more or less delayed due to a phenomenon of so-called "fast fill". In view of this tendency, the force acting on the brake pedal 10 is obtained on the basis of the output signal of the stroke sensor 71 while the fluid pressure in the master cylinder 12 is relatively low, that is, before the master cylinder pressure has been raised to a predetermined threshold. After the master cylinder pressure has exceeded the threshold, the force acting on the brake pedal 10 is obtained on the basis of the output signal of the master cylinder pressure sensor 71. If one of the stroke sensor 71 and the master cylinder pressure sensor 72 is defective, the force acting on the brake pedal 10 is obtained on the output signal of the other sensor 71, 72

The control device 160 further obtains a slipping state of each wheel 16, 22, 46, 48 being braked, on the basis of the rotating speed of the wheel detected by the corresponding wheel speed sensor 162, 163, 164, 165, and an estimated vehicle running speed obtained based on the detected wheel speeds. The control device 160 effects the anti-lock braking pressure control on the basis of the obtained slipping state of each wheel during brake application. The control device 160 further obtains an actual acceleration value of the vehicle, based on an amount of increase of the estimated vehicle running speed per unit time. In the present braking system, the wheel speed sensors 162–165 also serve as a sensor for obtaining the vehicle acceleration. The control device 160 effects the vehicle stability control by applying a positive brake to an appropriate one of the wheels 16, 22, 46, 48 so as to improve the running stability of the vehicle, on the basis of the output signals of the steering angle sensor 170 and the yaw rate sensor 172.

The control device 160 receives from the power unit control device 174 information indicative of a drive torque being applied to the vehicle. The drive power source of the vehicle includes an internal combustion engine and/or an electric motor. The vehicle is driven by a total torque generated by at least one of the engine and the electric motor. Each of the driver circuits 176, 178 includes a normal voltage control circuit for controlling a voltage to be applied to the corresponding high-pressure or low-pressure pump motor 38, 40, and a maximum voltage application circuit for applying the maximum voltage to the pump motor 38, 40. Normally, the voltage controlled by the normal voltage control circuit is applied to the pump motor 38, 40. When a required rate of increase of the fluid pressure in the wheel brake cylinders 18, 24, 50, 52 is higher than a predetermined upper limit, the maximum voltage which is higher than the nominal voltage of a battery used in the braking system is applied to the pump motor 38, 40 through the maximum voltage application circuit. The maximum voltage application circuit of the driver circuits 176, 178 may be a circuit including a coil, a capacitor and a switching element such as a transistor. Alternatively, the maximum voltage application circuit may include a DC-DC converter, or a boosting converter.

An operation of the present braking system constructed as described above will be described.

When the brake pedal 10 is depressed, a normal braking pressure control routine is executed. This normal braking pressure control routine is formulated to first determine a target value of the fluid pressure in the wheel brake cylinders 18, 24, 50, 52 (hereinafter referred to as "target wheel brake cylinder pressure"), depending upon a depression force acting on the brake pedal 10. The routine is further formulated to control the pump device 30 and the pressure reduction control valves 58, 62, so as to reduce a difference between the target wheel brake cylinder pressure and an actual value of the fluid pressure in the wheel brake cylinders 18, 24, 50, 52 (hereinafter referred to as "actual wheel brake cylinder pressure"). In the present embodiment, the voltages applied to the high-pressure and low-pressure pump motors 38, 40 of the pump device 30 and the electric currents applied to the coils 100, 144 of the pressure reduction control valves 58, 60 are controlled while the master cylinder cut-off valves 26, 28 are held in the closed state and while the pump cut-off valves 54 are held in the open state, so that the fluid pressures in all of the wheel brake cylinders 18, 24, 50, 52 are controlled in the same manner. This control will be referred to as "common pressure control" of the wheel brake cylinders.

When the amount of slipping of a certain wheel 16, 22, 46, 48 being braked has become excessively large with respect to the friction coefficient of the road surface, the control device 160 initiates the anti-lock braking pressure control routine, wherein a target value of the fluid pressure in the corresponding wheel brake cylinder 18, 24, 50, 52 is determined so as to hold the amount of slipping of the excessively slipping wheel within an optimum range. The anti-lock braking pressure control routine is formulated to control the pump device 30 and the corresponding pressure reduction control valve 58, 60 and pump cut-off valve 54, while the master cylinder cut-off valves 26, 28 are held in the open state. When the wheel brake cylinder pressure in question is rapidly reduced or held at the present level, the corresponding pump cut-off valve 54 is held in the closed state. When the wheel brake cylinder pressure is slowly reduced, or increased, the corresponding pump cut-off valve 54 is held in the open state.

When the amount of spinning or drift-out motion of the vehicle during turning has exceeded a predetermined threshold SVs or SVd, the control device 160 initiates the vehicle stability control routine. The amount of spinning or drift-out motion of the vehicle is obtained on the basis of the output signals of the steering angle sensor 170 and the yaw rate sensor 172. The vehicle stability control routine is formulated to first obtain the target fluid pressure in each wheel brake cylinder, so that the appropriate wheel or wheels is/are braked so as to give the turning vehicle a yaw moment which is effective to reduce the amount of spinning or drift-out motion. The pump device 30, the pressure reduction control valves 58, 62 and the pump cut-off valves 54 are controlled so as to establish the target wheel brake cylinder pressures.

When the operating speed of the brake pedal 10 is higher than a predetermined threshold, the emergency braking control routine is initiated. The target wheel brake cylinder pressure is obtained depending upon the operating speed of the brake pedal 10, and the fluid pressures in all of the wheel brake cylinders 18, 24, 50, 52 are controlled to the same target value.

When an operation to reduce the wheel brake cylinder pressure is terminated, the master cylinder cut-off valves 26, 28 are returned to the open state, and the coils 100, 144 of the pressure reduction control valves 58, 62 are de-energized. The fluid is returned from the wheel brake cylinders 18, 24 to the master reservoir 31 through the master cylinder cut-off valves 26, 28 and master cylinder 12, while the fluid is returned from the wheel brake cylinders 50, 52 to the master reservoir 31 through the pressure reduction control valves 62.

In the event of occurrence of an electrical abnormality, the solenoid coils of the master cylinder cut-off valves 26, 28 and the coils 100, 144 of the pressure reduction control valves 58, 62 are de-energized, so that the master cylinder cut-off valves 26, 28 are returned to the open state, and the pressure reduction control valves 58 are returned to the closed state while the pressure reduction control valves 62 are returned to the open state. With the pressure reduction control valves 58 placed in the closed state, the wheel brake cylinders 18, 24 can be actuated by the pressurized fluid delivered from the master cylinder 12. Although the pump cut-off valves 54 are placed in the open state, the check valves 35, 36 prevent flows of the fluid from the master cylinder 12 (wheel brake cylinders 18, 24) into the master reservoir 31 through the pump device 30. Thus, the vehicle can be braked by the front wheel brake cylinders 18, 22 actuated by the master cylinder 12, even in the event of occurrence of an electrical abnormality in the braking system.

The pump device 30 is controlled according to the pump motor control routine. In the present embodiment, the delivery pressure and rate of the low-pressure pump 34 are controlled in zone 1 indicated in FIG. 6, by controlling the low-pressure pump motor 40. With the high-pressure pump motor 38 as well as the low-pressure pump motor 40 being controlled, the delivery pressures and rates of the high-pressure and low-pressure pumps 32, 34 are controlled in zone 2. The control of the pump device 30 in zone 3 may be achieved by applying the maximum voltage to at least one of the high-pressure and low-pressure pump motors 38, 40. In this case, the delivery pressure and rate of the pump device 30 are maximized, but are difficult to be controlled.

When the common pressure control is effected according to the normal braking pressure control routine or emergency braking control routine, for example, at least one of the high-pressure and low-pressure pump motors 38, 40 is controlled according to the control data map indicated in FIG. 6, so that the delivery pressure of the pump device 30 as detected by the pump pressure sensor 74 changes toward a determined target value. When the force acting on the brake pedal 10 is relatively small, the low-pressure pump motor 40 is operated and controlled. When the force acting on the brake pedal 10 has increased to a predetermined threshold, the high-pressure pump motor 38 is also operated and controlled.

When an "independent pressure control" is effected according to the anti-lock braking pressure control routine or vehicle stability control routine, the delivery pressure of the pump device 30 is controlled so as to be equal to a highest one of the target fluid pressures of the wheel brake cylinders 18, 24, 50, 52. This control of the delivery pressure of the pump device 30 permits the fluid pressure in any wheel brake cylinder 18, 24, 50, 52 to be controlled to the target value.

When the required rate of increase of the wheel brake cylinder pressure is higher than a predetermined threshold, the maximum voltage higher than the nominal voltage of the battery used in the braking system is applied to the high-pressure and low-pressure pump motors 38, 40, to maximize the delivery of each pump 32, 34, for maximizing the actual rate of increase of the wheel brake cylinder pressure. The required rate of increase of the wheel brake cylinder pressure is represented by a difference obtained by subtracting the target wheel brake cylinder pressure determined in the last control cycle from the target wheel brake cylinder pressure determined in the present control cycle.

Figure 4:
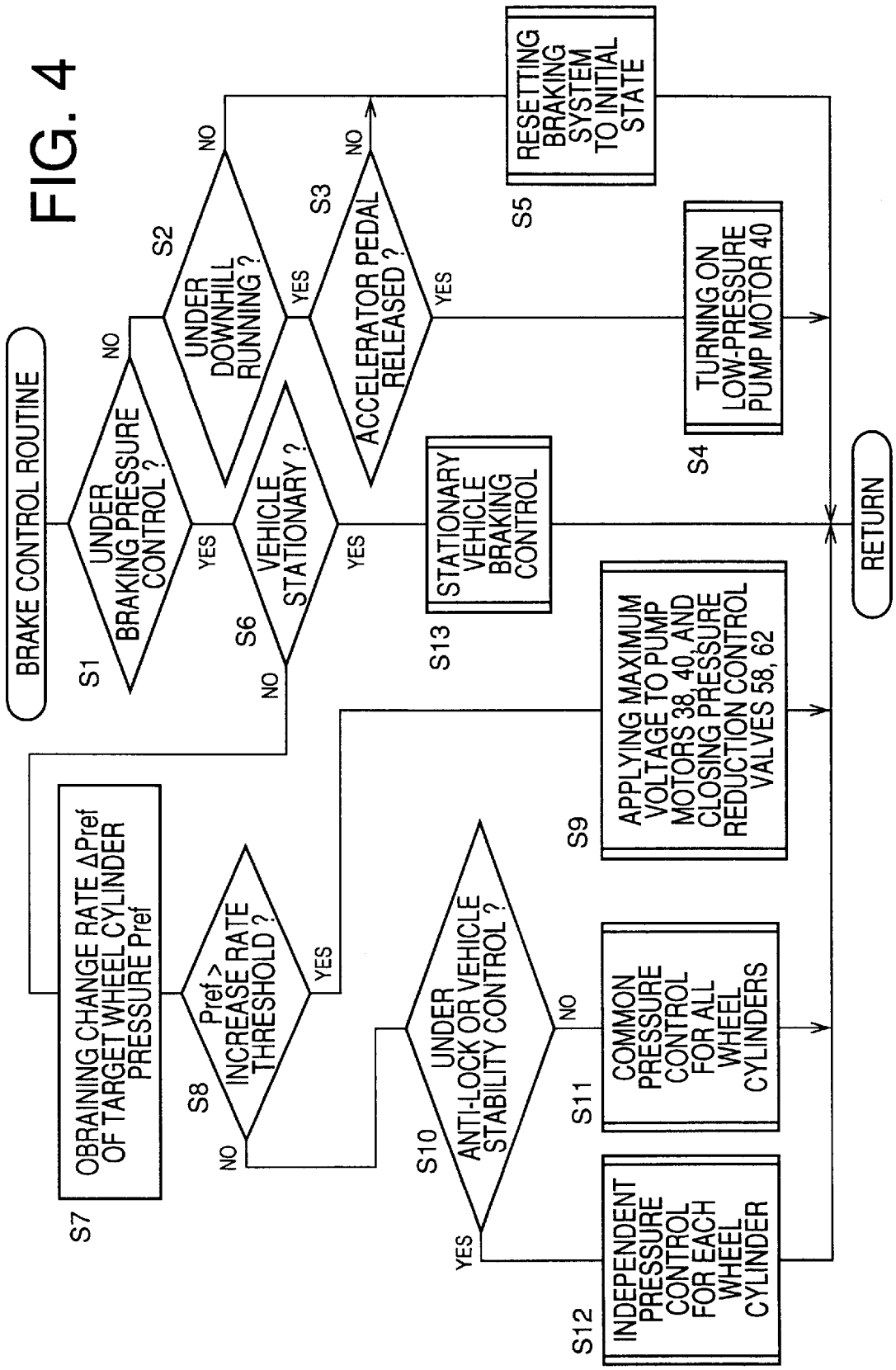
FIG. 4 is a flow chart illustrating a brake control routine executed according to a program stored in ROM of the hydraulic pressure control apparatus.

The pump device 30, the pump cut-off valves 54 and the pressure reduction control valves 58, 62 are controlled according to the brake control routine illustrated in the flow chart of FIG. 4.

The brake control routine is initiated with step S1 to determine whether the fluid pressure in any one of the wheel brake cylinders 18, 24, 50, 52 is in the process of being controlled. This determination is effected by determining whether the target fluid pressure of any wheel brake cylinder is higher than the atmospheric pressure. Since the target fluid pressure of each wheel brake cylinder is determined in the above-described various control routines such as the normal braking pressure control routine, it is possible to determine that the fluid pressure In any wheel brake cylinder is being controlled, If the target fluid pressure of any wheel brake cylinder is higher than the atmospheric pressure.

If a negative decision (NO) is obtained in step S1, that is, if the fluid pressure in any wheel brake cylinder is not being controlled, the control flow goes to steps S2 and S3 to determine whether an increase of the fluid pressure in the wheel brake cylinders will be required in the near future. Since the fluid pressure in the wheel brake cylinders is required to be increased if the brake pedal 10 is depressed, steps S2 and S3 are provided to determine whether the vehicle is in a condition in which the brake pedal 10 is expected to be depressed. That is, the brake pedal 10 is expected to be depressed if the accelerator pedal is placed in its non-operated or fully released position while the vehicle is running downhill. In this case, the low-pressure pump motor 40 is started to be ready for activating the wheel brake cylinders 18, 24, 50, 52 as soon as the brake pedal 10 is actually depressed. This arrangement is effective to avoid a delayed braking effect.

Namely, step S2 is provided to determine whether the vehicle is running downhill, and step S3 is provided to determine whether the accelerator pedal is in the fully released position. If an affirmative decision (YES) is obtained in both of these steps S2 and S3, the control flow goes to step S4 in which the low-pressure pump motor 40 is turned on. If a negative decision (NO) is obtained in step S2 or S3, the control flow goes to step S5 to reset the braking system to the initial state, that is, reset the master cylinder cut-off valves 26, 28 to the open state, reset the pump cut-off valves 54 to the open state, de-energize the coils 100, 144 of the pressure reduction control valves 58, 62, turn off the pump device 30, and reset the various control parameters to the initial values. This resetting operation in step S5 is similar to that implemented when the braking system is initialized.

The low-pressure pump motor 40 is held in the operated state as long as the vehicle is running downhill with the accelerator pedal being released. When the road surface is determined not to be a downhill road surface, or when the accelerator pedal is depressed again, the control flow goes to step S5 in which the low-pressure pump motor 40 is turned off.

The determination step S2 is implemented according to a routine illustrated in the flow chart of FIG. 7. This routine is initiated with step S21 to obtain an estimated running speed of the vehicle on the basis of the output signals of the wheel speed sensors 162–165, and calculate a rate of change of the estimated vehicle running speed. This rate of change represents an actual acceleration value a of the vehicle. Step S21 is followed by step 522 to obtain an estimated acceleration value α' of the vehicle on the basis of information representative of a vehicle drive torque F received from the power unit control device 174. The estimated acceleration value α' is calculated according to the following equation:

$$\alpha' = (F - F')/M$$

In the above equation, "M" represents a weight of the vehicle, and "F'" represents a road load which increases with a vehicle running speed V, as indicated by a curve shown in FIG. 5. A predetermined relationship between the road load F' and the vehicle running speed V is represented by a data map stored in the ROM 154. The road load F' is determined on the basis of the estimated vehicle running speed V and according to the predetermined relationship. The value (F–F') represents an effective drive torque which is considered to decrease with an increase in the road load which increases with the vehicle running speed v.

If the actual vehicle acceleration α is equal to the estimated value α', the vehicle is considered to be running on a flat road surface. If the actual acceleration value α is smaller than the estimated value α', the vehicle is considered to be running on an uphill road surface. If the actual acceleration value α is larger than the estimated value α', the vehicle is considered to be running on a downhill road surface. Step S22 is followed by step S23 to determine whether the actual acceleration value α is larger than the estimated value α'. If an affirmative decision (YES) is obtained in step S23, the control flow goes to step S24 to determine that the vehicle is running downhill. When the vehicle is driven by both the engine and the electric motor, the drive torque F is obtained based on the operating states of the engine and electric motor. When the vehicle is driven by the engine or electric motor, the drive torque F is obtained based on the operating state of the engine or electric motor.

The arrangement to start the low-pressure pump motor 40 while the accelerator pedal is held released during downhill running of the vehicle permits the wheel brake cylinder pressures to be rapidly increased immediately after the brake pedal 10 is operated, as indicated in the graph of FIG. 8. This arrangement is effective to reduce a delayed increase in the wheel brake cylinder pressures.

Figure 9A:
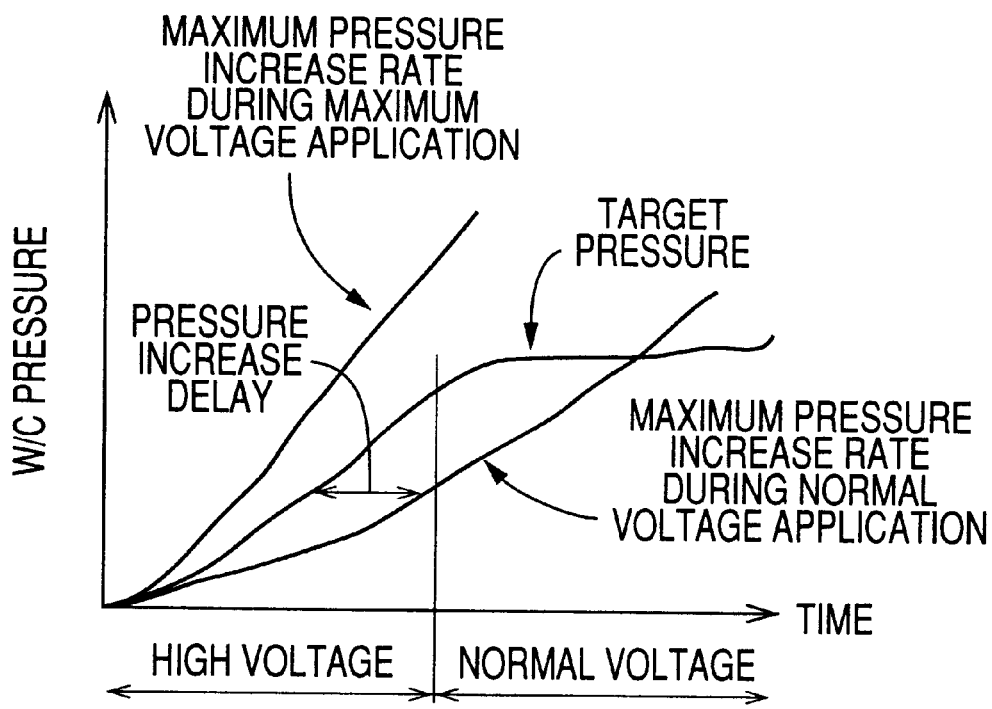
FIGS. 9A and 9B are graphs showing examples of control of the pump motor by the hydraulic pressure control apparatus.
Figure 9B:
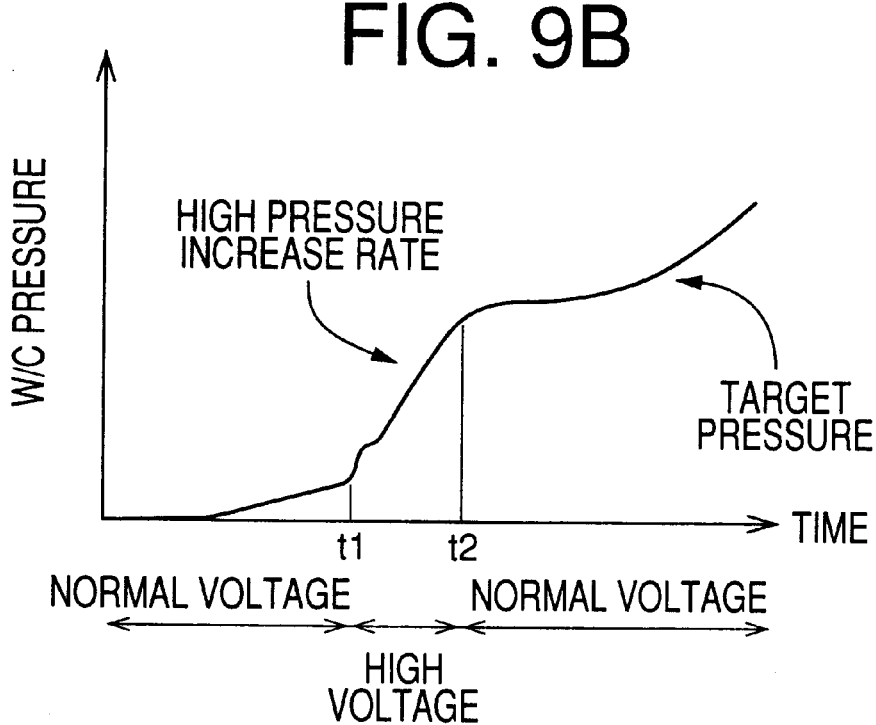

When the fluid pressure in any wheel brake cylinder is being controlled, that is, if an affirmative decision (YES) is obtained in step S1, the control flow goes to step S6 to determine whether the vehicle is stationary or in a standstill state. This determination is effected by determining whether the estimated vehicle running speed is lower than a predetermined threshold. In most cases, a negative decision (NO) is obtained immediately after initiation of control of the wheel brake cylinder pressure, and the control flow goes to step S7 to read the target wheel brake cylinder pressure Pref which has been determined according to a suitable pressure control program, and to obtain a change rate ΔPref of the target wheel brake cylinder pressure Pref. Then, the control flow goes to step S8 to determine whether the obtained change rate ΔPref is higher than a predetermined increase rate threshold. In most cases, the change rate ΔPref is higher than the predetermined increase rate threshold immediately after the brake pedal 10 has been depressed. If the change rate ΔPref is higher than the threshold, that is, if an affirmative decision (YES) is obtained in step 38, the control flow goes to step S9 in which the maximum voltage (higher than the nominal voltage of the battery) is applied to the high-pressure and low-pressure pump motors 38, 40, and the pressure reduction control valves 58, 62 are closed. With the maximum voltage being applied to the pump motors 38, 40, the output torques of the motors 38, 40 are increased to increase the delivery rate of the pump device 30, making it possible to rapidly increase the wheel brake cylinder pressure, as indicated in the graph of FIG. 9A. When an emergency brake is applied, or immediate after the brake pedal 10 has been operated, the change rate ΔPref of the target wheel brake cylinder pressure Pref is higher than the predetermined increase rate threshold, so that the pressure increasing delay can be reduced. In the present embodiment, the increase rate threshold is determined to be higher than the highest value that can be achieved in the zone 2 of FIG. 6. The maximum voltage is kept applied to the pump motors 38, 40 as long as the change rate ΔPref is higher than the threshold.

Since the delivery rate of the pump device 30 can be increased by applying the maximum voltage to the high-pressure and low-pressure pump motors 38, 40, the wheel brake cylinder pressure can be increased at a sufficiently high rate, without having to increase the capacities of the motors 38, 40. Although the delivery rate of the pump device

30 can be increased by increasing the capacities of the pump motors 38, 40, this results in an increased cost of manufacture of the pump device 30. In view of this, the present embodiment is adapted such that the delivery pressure and rate of the pump device 30 are maximized only when a relatively high rate of increase of the wheel brake cylinder pressure is required. While the delivery pressure and rate of the pump device 30 can be controlled when they are maximized, the rate of increase of the wheel brake cylinder pressure need not be controlled, as long as the wheel brake cylinder pressure can be increased at a sufficiently high rate. The present arrangement makes it possible to increase the wheel brake cylinder pressure at a rate higher than the predetermined increase rate threshold, without increasing the cost of manufacture of the pump device 30.

While steps S7–S9 are arranged to apply the maximum voltage to the pump motors 38, 40 while the rate of change $\Delta$Pref of the target wheel brake cylinder pressure Pref is higher than the threshold, the maximum voltage may be applied to the pump motors 38, 40 until the wheel brake cylinder pressure has been increased to a predetermined level.

Figure 10:
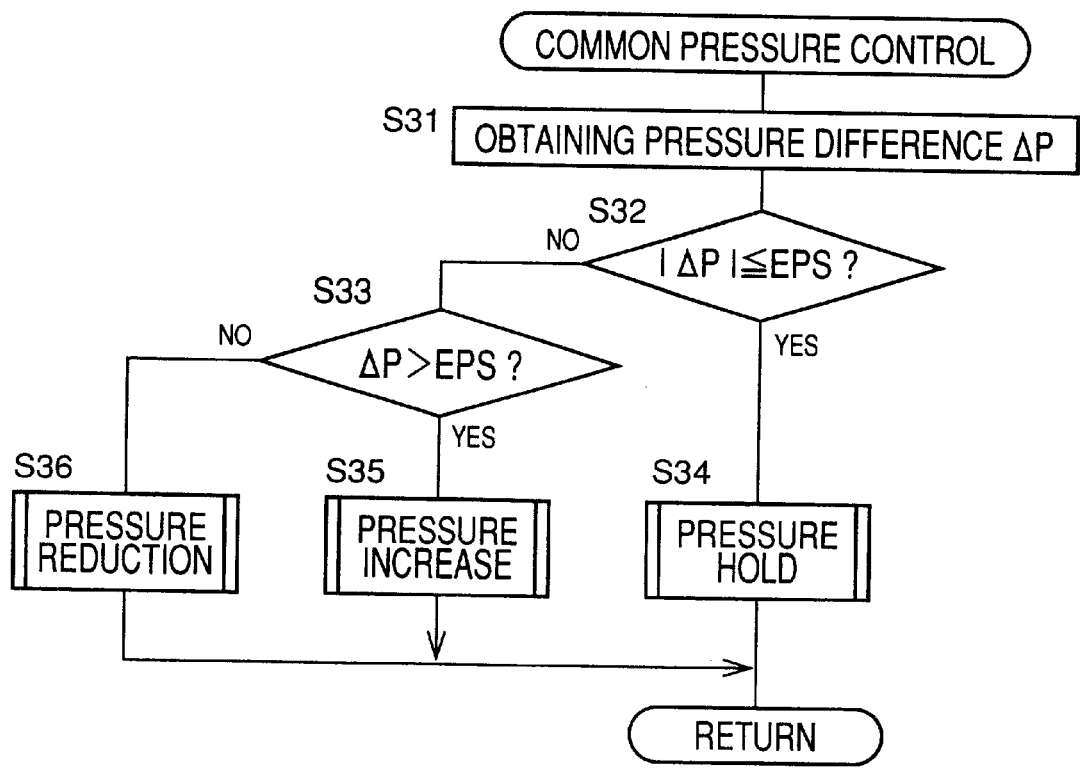
FIG. 10 is a flow chart illustrating a common pressure control routine executed in step S11 of the flow chart of FIG. 4.
Figure 11:
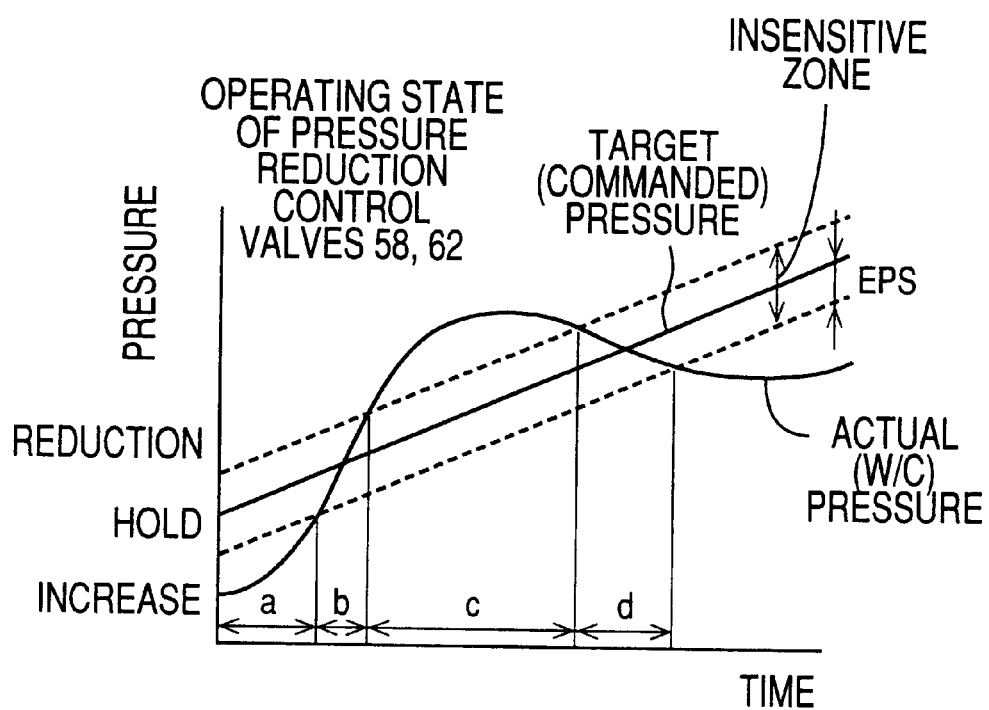
FIG. 11 is a graph showing an example of common pressure control of the pressure reduction control valve by the hydraulic pressure control apparatus.

When the change rate $\Delta$Pref of the target wheel brake cylinder pressure is lower than the predetermined increase rate threshold, a negative decision (NO) is obtained in step S8, and the control flow goes to step S10 to determine whether the fluid pressure in any wheel brake cylinder is controlled according to the anti-lock braking pressure control routine or vehicle stability control routine, in other words, whether the "independent pressure control" of the wheel brake cylinder pressures is effected. In the independent pressure control, the fluid pressures in the individual wheel brake cylinders 18, 24, 50, 52 are controlled independently of each other. If a negative decision (NO) is obtained in step S10, the "common pressure control" is effected. In the common pressure control, the fluid pressures in all of the wheel brake cylinders 18, 24, 50, 52 are controlled in the same manner.

Where the common pressure control is effected, that is, if a negative decision (NO) is obtained in step S10, the control flow goes to step S11 in which the common pressure control is effected for all wheel brake cylinders, according to a common pressure control routine illustrated in the flow chart of FIG. 10. The common pressure control routine of FIG. 10 is initiated with step S31 to obtain a pressure difference $\Delta$P between the target and actual wheel brake cylinder pressure values. Then, the control flow goes to steps S32 and S33 to select one of pressure increase, pressure hold and pressure reduction modes, depending upon the pressure difference $\Delta$P as compared with a predetermined threshold EPS, as indicated in the graph of FIG. 11. When the pressure difference $\Delta$P is in a range corresponding to the pressure hold mode, that is, when the absolute value of the pressure difference $\Delta$P is equal to or smaller than the threshold EPS, namely, is in an insensitive zone indicated in FIG. 11, the control flow goes to step S34 to select the pressure hold mode in which the wheel brake cylinder pressure is held at the present level. When the pressure difference $\Delta$P is in a range corresponding to the pressure increase mode, that is, is larger than the threshold EPS, the control flow goes to step S35 to select the pressure increase mode in which the wheel brake cylinder pressure is increased. When the pressure difference $\Delta$P is in a range corresponding to the pressure reduction mode, that is, is not larger than the threshold EPS, the control flow goes to step S26 to select the pressure reduction mode in which the wheel brake cylinder pressure is reduced. In the common pressure control, the pump cut-off valves 54 are held in the open state.

In the pressure increase mode, the delivery pressure of the pump device 30 is controlled to be the target wheel brake cylinder pressure Pref by controlling at least one of the high-pressure and low-pressure pump motors 38, 40, while the pressure reduction control valves 58, 62 are held in the closed state, as indicated in FIG. 12.

In the pressure hold mode, the pump motors 38, 40 are held off, and the pressure reduction control valves 58, 62 are held in the closed state, as indicated in FIG. 12. In this pressure hold mode, the pressurized fluid is not supplied to the wheel brake cylinders 19, 24, 50, 52, so that the pump cut-off valves 54 need not be closed to prevent an increase in the wheel brake cylinder pressure.

In the pressure reduction mode, the pump motors 38, 40 are held off, and the pressure reduction control valves 58, 62 are controlled so as to zero the pressure difference $\Delta$P, as indicated in FIG. 12.

In the common pressure control, the wheel brake cylinder pressure is increased in the pressure increase mode by controlling the delivery pressure and rate of the pump device 30, is held in the pressure hold mode with the pump device 30 held off and the pressure reduction control valves 58, 62 held in the closed state, and is reduced in the pressure reduction mode by controlling the pressure reduction control valves 58, 62 with the pump device 30 held off. Thus, the common pressure control is effected to control the wheel brake cylinder pressure by controlling the pump device 30 and the pressure reduction control valves 58, 62, without controlling pressure increase control valves as well as the pressure reduction control valves as required in the conventional hydraulic pressure control apparatus.

As indicated above, the pump cut-off valves 54 are held in the open state in the common pressure control. In other words, the common pressure control does not require the pump cut-off valves 54.

Figure 13:
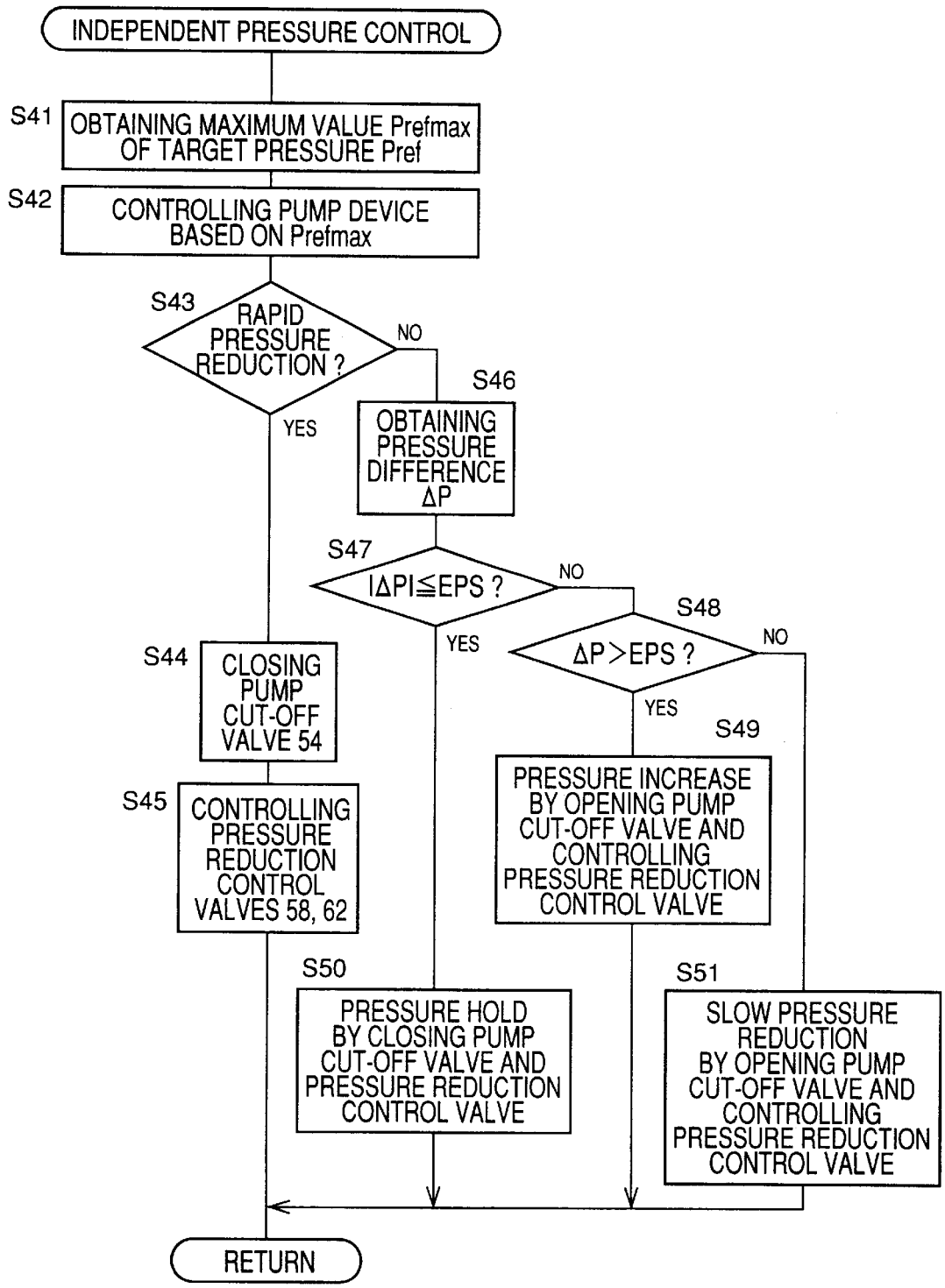
FIG. 13 is a flow chart illustrating an independent pressure control routine executed in step S12 of the flow chart of FIG. 4.

If the anti-lock braking pressure control or vehicle stability control is effected, an affirmative decision (YES) is obtained in step S10, and the control flow goes to step S12 in which the independent pressure control is effected according to a routine illustrated in the flow chart of FIG. 13. This routine is initiated with step S41 to obtain a highest value Prefmax of the target fluid pressures Pref of the wheel brake cylinders 18, 24, 50, 52. Then, step S42 is implemented to control at least one of the pump motors 38, 40 on the basis of the highest target fluid pressure Prefmax of the wheel brake cylinders 18, 24, 50, 52. In the independent pressure control, the pump device 30 is held in the operated state. Step S42 is followed by step S43 to determine whether the change rate $\Delta$Pref of the target pressure of any wheel brake cylinder is lower than a negative threshold value, that is, whether the fluid pressure in any wheel brake cylinder is required to be reduced at a rate higher than a predetermined threshold. When the fluid pressure in any wheel brake cylinder is required to be rapidly reduced, an affirmative decision (YES) is obtained in step S43, and the control flow goes to steps S44 and S45 to close the corresponding pump cut-off valve 54 and control the corresponding pressure reduction control valve 58, 62, so that the actual fluid pressure in the wheel brake cylinder in question is reduced to the target value. In the independent pressure control in which at least one of the pump motors 38, 40 is controlled depending upon the highest target fluid pressure Prefmax, the wheel brake cylinder whose fluid pressure is reduced is desirably disconnected from the pump device 30. Accordingly, the corresponding pump cut-off valve 54 is closed to permit rapid reduction of the fluid pressure in the wheel brake cylinder in question.

When a negative decision (YES) is obtained in step S43, that is, when the fluid pressure in any wheel brake cylinder is required to be rapidly reduced, the control flow goes to step S46 to obtain the pressure difference ΔP, and to steps S47 and S48 to select one of the pressure increase, hold and reduction modes, depending upon the obtained pressure difference ΔP. When the pressure difference ΔP is in a range corresponding to the pressure increase mode, the control flow goes step S49 to select the pressure increase mode in which the corresponding pump cut-off valve 54 is held in the open state, and the corresponding pressure reduction control valve 58, 62 is controlled as needed, so that the actual wheel brake cylinder is increased to the target value Pref, as indicated in FIG. 14. Since the pump device 30 delivers the pressurized fluid having the highest target pressure value Prefmax, the corresponding pressure control valve 58, 62 may be required to be controlled. However, the control valve 58, 62 may be held in the closed state.

When the pressure difference ΔP is in a range corresponding to the pressure hold mode, the control flow goes step S50 to select the pressure hold mode in which the corresponding pump cut-off valve 54 and pressure reduction control valve 58, 02 are both held in the closed state, as indicated in FIG. 14, to prevent flows of the fluid into the wheel brake cylinder in question for thereby holding the wheel brake cylinder pressure with high stability.

When the pressure difference ΔP is in a range corresponding to the slow pressure reduction mode, the control flow goes step S51 to select the slow pressure reduction mode in which the corresponding pump cut-off valve 54 is opened, and the corresponding pressure reduction control valve 58, 62 is controlled, as indicated in FIG. 14, so that the actual fluid pressure in the wheel brake cylinder in question is slowly reduced to the target value.

As described above, the independent pressure control is effected while the delivery pressure of the pump device 30 is held at the highest target wheel brake cylinder pressure Prefmax. Accordingly, the wheel brake cylinder whose pressure is rapidly reduced is disconnected from the pump device 30, so that the wheel brake cylinder pressure in question can be reduced at a high rate, without delayed pressure reduction. Further, the wheel brake cylinder whose pressure is held is disconnected from both the pump device 30 and the master reservoir 31, so that the wheel brake cylinder pressure in question can be held constant. It is also noted that the pump cut-off valves 54 which also function as flow restrictors permit a fluid pressure difference between the different wheel brake cylinders.

When the vehicle has been brought to a stop due to activation of the wheel brake cylinders 18, 24, 50, 52, an affirmative decision (YES) is obtained in step S6, and the control flow goes to step S13 in which a stationary vehicle braking control is effected according to a stationary vehicle braking control routine illustrated in the flow chart of FIG. 15. This routine is initiated with step S61 in which the threshold EPS for selecting one of the pressure increase, hold and reduction modes is changed to a larger value EPS', in order to increase the insensitive zone. Then, the control flow goes to step 562 to obtain the pressure difference ΔP, and to steps S63 and S64 to select one of the pressure increase, hold and reduction modes, depending upon the pressure difference ΔP. When the pressure difference ΔP is in a range corresponding to the pressure hold mode, the control flow goes to step S65 to select the pressure increase mode in which the wheel brake cylinder pressure is held at the present level. When the pressure difference ΔP is in a range corresponding to the pressure reduction mode, the control flow goes to step S66 in which the wheel brake cylinder pressure is reduced. When the pressure difference ΔP is in a range corresponding to the pressure increase mode, the control flow goes to step S67 to determine whether the wheel speed is lower than a threshold (which is almost zero). If the wheel speed is not lower than the threshold, the control flow goes to step S68 in which the wheel brake cylinder pressure is increased. If the wheel speed is lower than the threshold, the control flow goes to step S65 in which the wheel brake cylinder pressure is held at the present level.

Where a negative decision (NO) is obtained in step S67, it means that the wheel is rotated with the brake pedal being depressed, due to some reason such as collision of another automotive vehicle with the back of the stationary automotive vehicle in question during stopping at a traffic signal. In this case, the braking force (wheel brake cylinder pressure) is increased in step S68. When the vehicle is stationary with the wheel speed lower than the threshold, the wheel brake cylinder pressure is held constant, in order to reduce the required electric energy consumed by the pump device 30 while the vehicle is stationary with the brake pedal 10 being depressed.

It will be understood from the foregoing description of the present embodiment that the control device 160, the master cylinder pressure sensor 72, stroke sensor 71 and pump pressure sensor 74 cooperate with each other to constitute a major portion of a controller for controlling the pump device 30 and the pressure reduction control valves 58, 62 controlling the fluid pressures in the wheel brake cylinders 18, 24, 50, 52. Further, a portion of the control device 160 assigned to implement steps S8 and S9 constitutes a motor controller for controlling the pump motors 38, 40 of the pump device 30. It will also be understood that the brake switch 166, stroke sensor 71 and a portion of the control device 160 assigned to execute the normal braking pressure control routine and the emergency braking control routine cooperate to constitute a pressure increase commanding device. Further, a portion of the control device 160 assigned to implement steps S2–S4 constitutes motor pre-starting means for starting the pump motors 38, 40 before a condition for increasing the wheel brake cylinder pressure is satisfied. The motor pre-starting means is adapted to start the pump motors 38, 40 while the vehicle is running downhill. It is also noted that a portion of the control device 160 assigned to implement steps S44 and 350 constitutes pump cut-off valve control means for controlling the pump cut-off valves 54 so as to inhibit a flow of the fluid from the pump device 30 into the wheel brake cylinder 18, 24, 50, 52.

The stationary vehicle braking control routine of FIG. 15 is formulated to increase the threshold EPS of the pressure difference ΔP used for selecting one of the pressure increase, hold and reduction modes, and to select the pressure hold mode in step S65 when the wheel speed is lower than the predetermined threshold even when the pressure difference ΔP is larger than the increased threshold EPS'. However, steps S65 and S67 may be eliminated so that the pressure increase mode is selected as long as the pressure difference ΔP is larger than the increased threshold EPS'. An increase in the threshold EPS results in increasing the chance of selecting the pressure hold mode. Further, the common pressure control in step S11 of FIG. 4 may be adapted to select the pressure hold mode when the change rate ΔPref of the target wheel brake cylinder pressure Pref is lower than a predetermined lower limit. In this case, a common pressure control routine illustrated in the flow chart of FIG. 16 is executed in place of the common pressure control routine of FIG. 10, according to a second embodiment of this invention.

The common pressure control routine of FIG. 16 according to the second embodiment of this invention is initiated with step S81 to determine whether the change rate ΔPref of the target wheel brake cylinder pressure Pref is within a predetermined range between lower and upper limits RPFL(t) and RPFU(t). If the change rate ΔPref is within the predetermined range, the control flow goes to step S82 to select the pressure hold mode. If the change rate ΔPref is within the predetermined range between the lower and upper limits RPFL(t) and RPFL(t), it means that a change in the target wheel brake cylinder pressure Pref is caused by only a small amount of variation in the depression force of the brake pedal 10 which is not recognized by the vehicle operator. In this case, the wheel brake cylinder pressure is not changed according to a change in the target wheel brake cylinder pressure. In the pressure hold mode in step S82, the pump device 30 is held off, and the pump cut-off valves 54 are held in the open state while the pressure reduction control valves 58, 62 are held in the open state.

Then, the control flow goes to step S83 to determine whether a predetermined time Ts has passed after the reduction of the wheel brake cylinder pressure is initiated in step S82. If a negative decision (NO) is obtained in step S83, the control flow goes to step S84 in which the lower and upper limits RPFL(t) and RPFU(t) remain RPFL(1) and RPFU(1). If an affirmative decision (YES) is obtained in step S83, the control flow goes to step S85 in which the lower and upper limits RPFL(t) and RPFU(t) are changed from RPFL(1) and RPFU(1) to RPFL(2) and RPFU(2). The lower limit RPFL(2) is smaller than the lower limit RPFL(1), and the upper limit RPFU(2) is larger than the upper limit RPFU(1). Accordingly, the range between the lower and upper limits RPFL(t) and RPFU(t) is enlarged, and the pressure hold mode is more likely to be selected.

When the change rate ΔPref is not within the predetermined range between the lower and upper limits RPFL(t) and RPFU(t), a negative decision (NO) is obtained in step S81, and the control flow goes to step S86. To reset a timer, to set "t" to "1", and then goes to steps S88–S92 which are the same as teps S31–S36 of FIG. 10.

It will be understood that a portion of the control device 160 assigned to implement steps S81–S85 constitutes pressure hold control means, while a portion of the control device 160 assigned to implement steps S83–S85 constitutes pressure holding condition relaxing means.

Although the lower and upper limits RPFL(t) and RPFU(t) are reduced and increased, respectively, in step S85, only one of these lower and upper limits may be changed in step S85. In this case, too, the range within which the pressure hold mode is selected is enlarged.

While the above two embodiments are adapted to select one of the pressure increase mode, pressure hold mode and pressure reduction mode depending upon the pressure difference ΔP between the target wheel brake cylinder pressure Pref and the actual wheel brake cylinder pressure, the rate of change ΔPref of the target wheel brake cylinder as well as the pressure difference ΔP is taken into account to select one of the pressure increase, hold and reduction modes. An example of this arrangement according to a third embodiment of the present invention is shown in FIG. 17.

In the third embodiment of FIG. 17, the pressure hold mode rather than the pressure increase mode is selected when the change rate ΔPref is not higher than a predetermined threshold EPS even while the pressure difference ΔP is larger than the predetermined threshold EPS. Further, the pressure hold mode rather than the pressure reduction mode is selected when the change rate ΔPref is not lower than the threshold EPS even while the pressure difference ΔP is lower than a predetermined threshold −EPS. Thus, the present embodiment is comparatively likely to select the pressure hold mode, permitting reduction of the electric energy consumption. The change rate ΔPref may not be taken into account to select the pressure control mode, when the vehicle is stationary. It is possible to use different absolute values of the threshold of the change rate ΔPref for selecting the pressure increase mode and the pressure reduction mode.

While the brake control routine of FIG. 4 is adapted to start the low-pressure pump motor 40 when the accelerator pedal is released during downhill running of the vehicle, the pump motor 40 may be started when the gradient of the downhill road surface has become higher than a predetermined upper limit. The gradient of the road surface may be obtained based on a difference between the actual vehicle acceleration value and the estimated vehicle acceleration value. The pump motor 40 may be started when the accelerator pedal is released irrespective of the gradient of the road surface. Alternatively, the pump motor 40 may be started when a condition which is similar to and which is satisfied prior to the condition for initiating the vehicle stability control is satisfied. For instance, the pump motor 40 may be started when the amount of spinning or drift-out motion of the vehicle has exceeded a threshold SVs' or SVd' which is smaller than the threshold SVs or SVd which is used for initiating the vehicle stability control.

The pump motor 40 may be started when the selection of the pressure increase mode in the near future is expected during an operation in the pressure hold mode or pressure reduction mode according to the normal braking pressure control routine. In the pressure hold or reduction mode in the normal braking pressure control, the high-pressure and low-pressure pump motors 38, 40 are held off. If the low-pressure pump motor 40 is started upon detection of a sign indicating a near future change from the pressure hold or reduction mode to the pressure increase mode, a delay in the pressure increasing operation may be reduced. For instance, the selection of the pressure increase mode in the near future is expected when the pressure difference ΔP has exceeded a threshold EPS* which is smaller than the threshold EPS indicated above. In this case, a determination as to whether the pressure difference ΔP has exceeded the threshold EPS* is effected in step S34 of the flow chart of FIG. 10.

In the brake control routine of FIG. 4, the maximum voltage higher than the nominal voltage of the battery used in the braking system is applied to the high-pressure and low-pressure pump motors 38, 40 when the increase rate ΔPref of the target wheel brake cylinder pressure has become higher than the predetermined threshold. However, the maximum voltage may be applied to only the low-pressure pump motor 40 when this motor 40 is commanded to be turned on. The maximum voltage may be held applied to the motor 40 for a predetermined time, or until the increase rate ΔPref has been lowered to a predetermined value or until the wheel brake cylinder pressure has been increased to a predetermined level.

Figure 18:
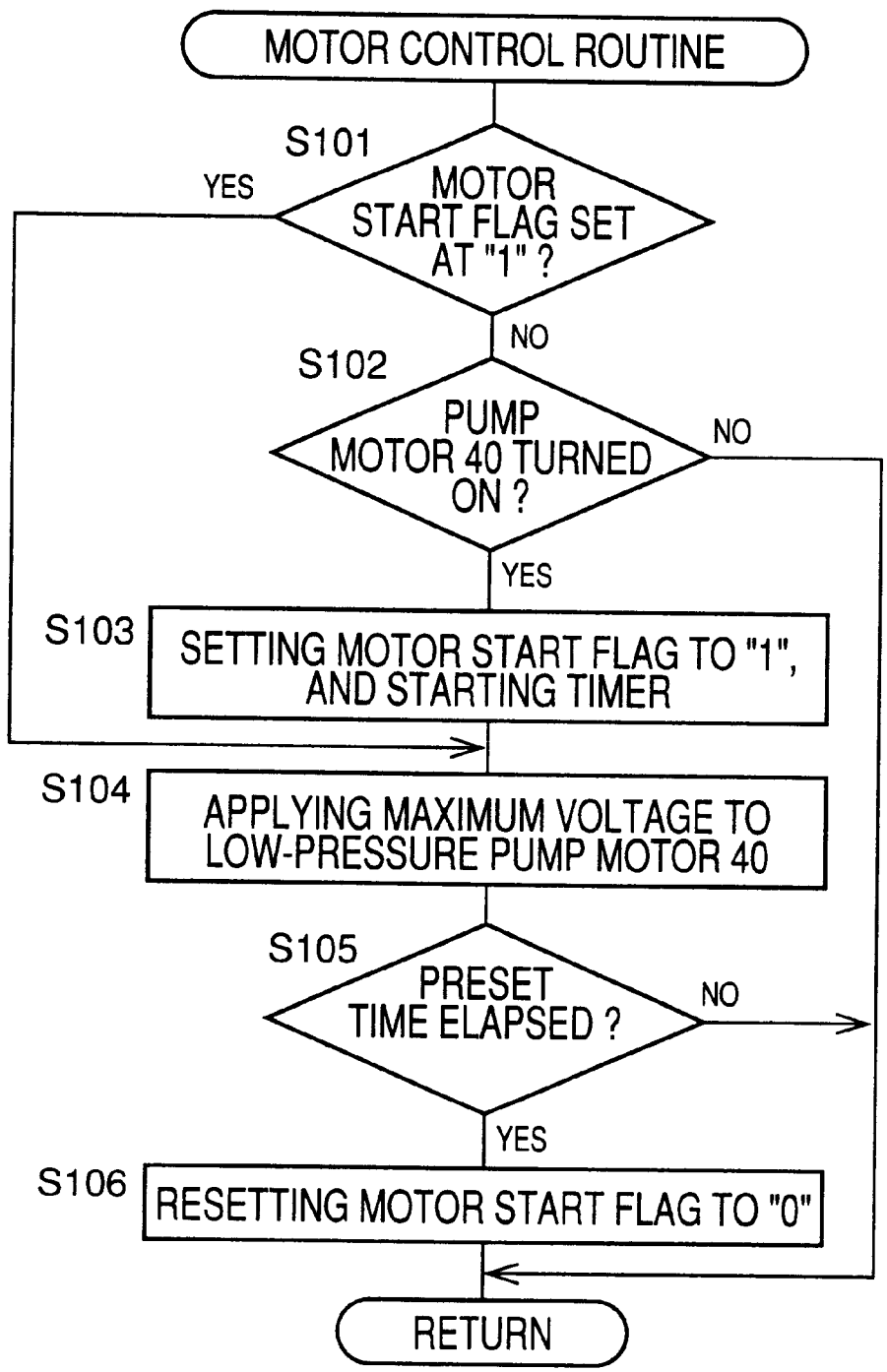
FIG. 18 is a flow chart illustrating a motor control routine executed according to a program stored En ROM of a hydraulic pressure control apparatus according to a yet further embodiment of this invention.

For instance, the control device 160 may be adapted to execute a motor control routine illustrated in the flow chart of FIG. 18 according to a fourth embodiment of this invention. This motor control routine is executed as an interruption routine at a predetermined time interval. The routine is initiated with step S101 to determine whether a MOTOR START flag is set at "1". If a negative decision (NO) is obtained in step S101, the control flow goes to step S102 to determine whether the low-pressure pump motor 40 has been commanded to be turned on (started). If an affirmative decision (YES) is obtained in step S102, the control flow goes to step S103 to set the MOTOR START flag to "1" and start a timer, and then to step S104 to apply the maximum voltage to the pump motor 40. Step S104 is followed by step S105 to determine whether a predetermined time has elapsed after starting of the timer, namely, after the maximum voltage has been applied to the pump motor 40. If a negative decision (NO) is obtained in step S105, the control flow returns to step S101. In this case, an affirmative decision (YES) is obtained in step S101, and the control flow goes to steps S104 and S105. Steps S101, S104 and S105 are repeatedly implemented until an affirmative decision (YES) is obtained in step S105, that is, until the maximum voltage is held applied to the pump motor 40 for the predetermined time. When the affirmative decision (YES) is obtained in step S105, the control flow goes to step S106 to reset the MOTOR START flag to "0". Then, the pump device 30 is controlled as described above by reference to FIGS. 12 and 14.

The pump motor 40 is commanded to be started in the common pressure control with the brake pedal 10 being depressed, when the pressure hold or reduction mode is changed to the pressure increase mode. At this time, the affirmative decision (YES) is obtained in step S102, and the maximum voltage is applied to the pump motor 40 in step S104, so that a delay in the operation of the low-pressure pump 34 is reduced.

Further, an arrangement described below is also possible. That is, the maximum voltage is applied to only the low-pressure pump motor 40 when only the pump motor 40 is turned on while the high-pressure pump motor 38 is held off while the increase rate $\Delta Pref$ of the target wheel brake cylinder pressure Pref is higher than the predetermined threshold. When the high-pressure pump motor 38 is also turned on, the maximum voltage is also applied to this pump motor 38. It is noted that the maximum voltage to be applied to the pump motor 38 and/or pump motor 40 need not be higher than the nominal voltage of the battery, but may be higher than the voltage normally applied to the motors 38, 40. In this case, the maximum voltage application circuit of each driver circuit 176, 178 is adapted such that a voltage higher than the voltage generated by the normal voltage control circuit and lower than the nominal battery voltage is applied to the pump motor 38 and/or the pump motor 40.

While the brake control routine of FIG. 4 includes steps S2–S4 for starting the pump motor 40 before the selection of the pressure increase mode and step S9 for applying the maximum voltage to the pump motors 38, 40, steps S2–S4 or step S9 may be eliminated. That is, either one of the motor pre-starting control (S2–S4) and the motor voltage increasing control (S9) may be provided, for the purpose of reducing a delay in the pressure increasing operation. Although the brake control routine of FIG. 4 includes the motor pre-starting control (S2–S4), the motor voltage increasing control (S9), the stationary vehicle braking control (S13), the common pressure control (S11) and the independent pressure control S12), at least one of these controls may be provided. If the independent pressure control is not provided, only one pressure reduction control valve may be provided commonly for all of the wheel brake cylinders 18, 24, 50, 52, and the pump cut-off valves 54 are not necessary.

In the independent pressure control of FIG. 13, the pump device 30 is controlled depending upon the highest value Prefmax of the target fluid pressures Pref of the four wheel brake cylinders 18, 24, 50, 52, the pump device 30 may be held off while the pressure hold or reduction mode is selected for all the wheel brake cylinders 18, 24, 50, 52.

Figure 19:
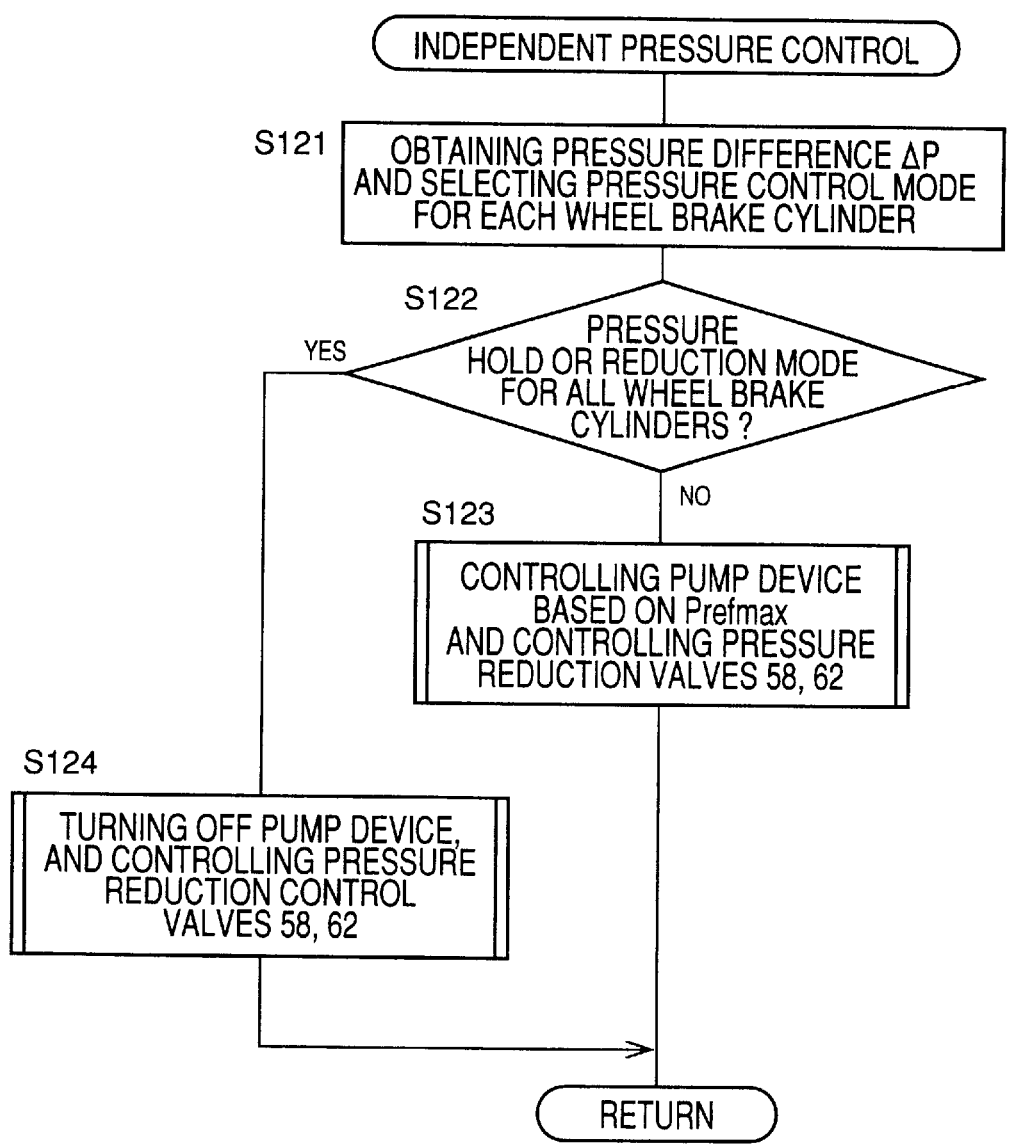
FIG. 19 is an independent pressure control routine executed in step S12 of the flow chart of FIG. 4, according to a program stored in ROM of a hydraulic pressure control apparatus according to a still further embodiment of this invention.

For instance, the independent pressure control routine may be formulated as illustrated in the flow chart of FIG. 19 according to a fifth embodiment of this invention. The routine is initiated with step S121 to obtain the pressure difference $\Delta P$ and select one of the pressure increase, hold and reduction modes for each of the wheel brake cylinders depending upon the pressure difference $\Delta P$ as compared with the threshold. Then, the control flow goes to step S122 to determine whether the pressure hold or reduction mode is selected for all the wheel brake cylinders. If the pressure control mode is selected for any of the wheel brake cylinders, a negative decision (NO) is obtained in step S122, and the control flow goes to step S123 in which the pump device 30 is controlled based on the highest value Prefmax of the target fluid pressures Pref of the four wheel brake cylinders, and the pressure reduction valves 58, 62 are controlled. If the pressure hold or reduction mode is selected for all of the four wheel brake cylinders, an affirmative decision (YES) is obtained in step S122, and the control flow goes to step S124 in which the pump motor 30 is turned off, and the pump cut-off valves 54 and the pressure reduction control valves 58, 62 are controlled to control the wheel brake cylinder pressures. As described above, the pump cut-off valves 54 and the pressure reduction control valves 58, 62 are held in the closed state, when the pressure hold mode is selected, and the pressure reduction control valves 58, 62 are controlled with the pump cut-off valves 54 held in the open state, when the pressure reduction mode is selected.

In the fifth embodiment of FIG. 19 wherein the pump device 30 is held off when the pressure hold or reduction mode is selected for all the wheel brake cylinders, the electric energy consumption can be reduced.

Other changes or modifications regarding the control of the braking system are possible. For instance, different threshold values may be used for selecting the pressure increase and reduction modes.

In the above embodiments, the pump device 30 includes both of the high-pressure pump 32 and the low-pressure pump 34. However, the pump device may use a single pump. Further, the control device 160 may be arranged to be capable of effecting a traction control for positively applying brakes to drive wheels of the vehicle in order to prevent slipping of the vehicle during starting and acceleration of the vehicle. The braking system may not be provided with the pump cut-off valves 54, or may be provided with pressure increase control valves in place of the pump cut-off valves 54. As described below with respect to other embodiments of this invention, the pressure increase control valves are controlled according to an electric energy applied thereto. The master cylinder 12 need not be of tandem type, provided it has two pressurizing chambers.

Referring next to FIGS. 20–30, there will be described a sixth embodiment of the present invention. In the present sixth embodiment, the braking system includes a solenoid-operated pressure increase control valve 179 in each of the four branch passages 44 which connects the pump device 30 to the respective wheel brake cylinders 18, 24, 50, 52. Each solenoid-operated pressure increase control valve 179, which is substituted for the pump cut-off valve 54 provided in the first embodiment of FIG. 1, is a normally closed valve, which is placed in the closed state when an electric current is not applied thereto.

Figure 20:
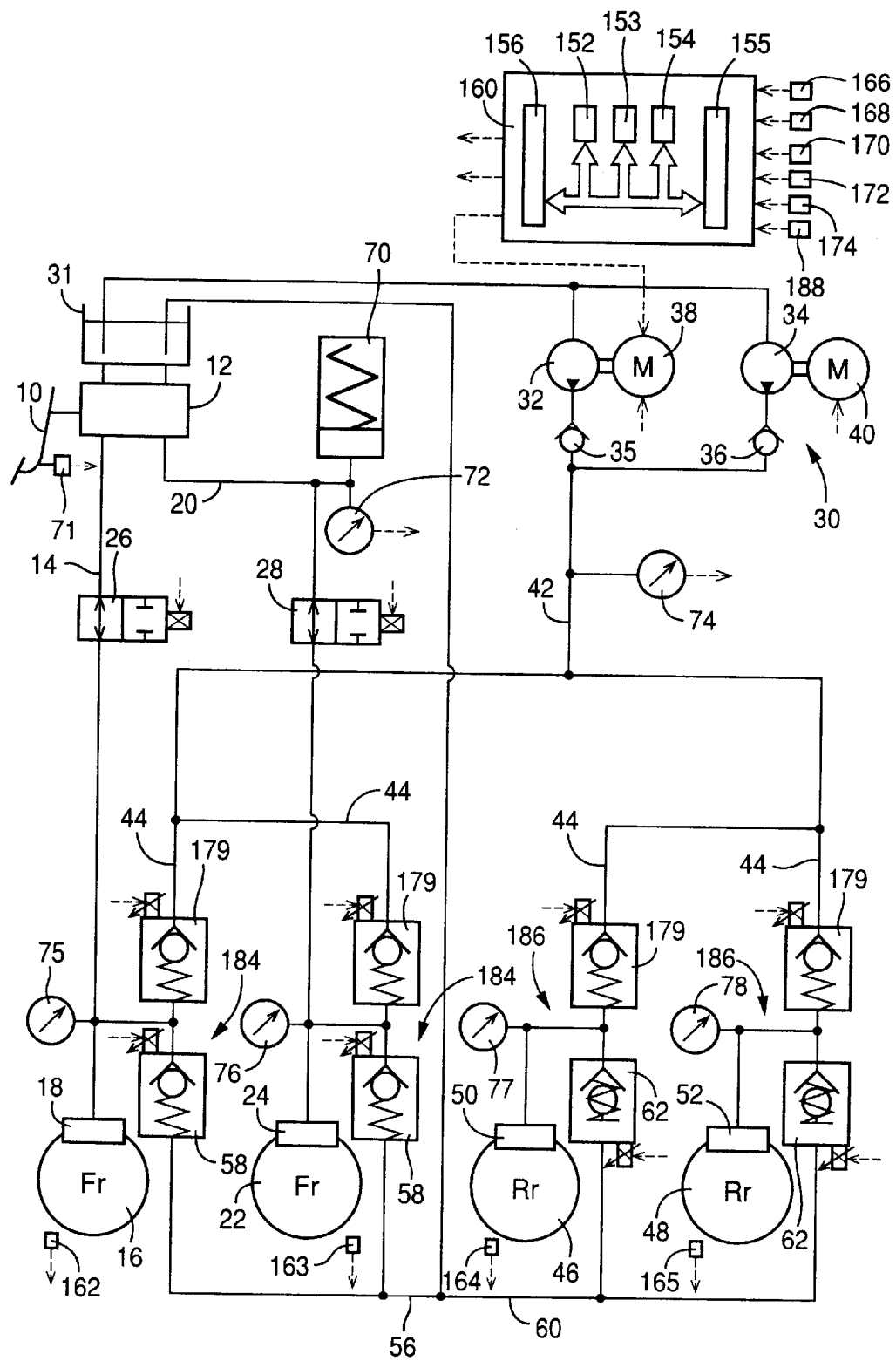
FIG. 20 is a schematic view illustrating a braking system including a hydraulic pressure control apparatus according to another embodiment of this invention.

The pressure increase control valves 179 and the pressure reduction control valves 58, 62 are linear solenoid valves. The pressure increase control valves 179 and the pressure reduction control valves 58 for the front wheel brake cylinders 18, 24 constitute a front wheel linear valve device 184, while the pressure increase control valves 179 and the pressure reduction control valves 62 for the rear wheel brake cylinders 50, 52 constitute a rear wheel linear valve device 186, as generally indicated in FIG. 20.

If the pressure reduction control valves 62 for the rear wheel brake cylinders 50, 52 were normally closed valves, these valves 62 would have to be held open with an electric current applied thereto at the end of braking actions of the rear wheel brake cylinders 50, 52, for a predetermined period of time necessary for the fluid to be discharged from the rear wheel brake cylinders. In this case, the pressure reduction control valves 62 are returned to the original closed state after the predetermined period of time has passed. However, this arrangement may cause some amount of the pressurized fluid left in the rear wheel brake cylinders 50, 52, causing a so-called "brake drag". In the present embodiment, the normally open pressure reduction control valves 62 are returned to their original open state with their coils being de-energized at the end of their braking actions, permitting the pressurized fluid to be completely discharged from the rear wheel brake cylinders 50, 52, thereby avoiding the otherwise possible brake drag.

The master cylinder cut-off valves 26, 28 are also normally open valves, so that the front wheel brake cylinders 18, 24 are held in communication with the master cylinder 12, for fail-safe purpose, while the coils of those cut-off valves 26, 28 are in the de-energized state (while the front wheel brake cylinders 26, 28 are not activated, or while the braking system has an electrical abnormality). The normally open master cylinder cut-off valves 26, 28 permit the pressurized fluid to be discharged from the front wheel brake cylinders 18, 24 and returned to the master cylinder 12, without flowing through the pressure reduction control valves 58. Therefore, the pressure reduction control valves 58 need not be normally open valves, to prevent the brake drag in connection with the front wheel brake cylinders 18, 24.

If an electrical abnormality of the braking system takes place during an operation of the braking system, the master cylinder c valves 26, 28 are returned to the original open state, while the pressure increase control valves 179 are returned to the closed state. As a result, the front wheel brake cylinders 18, 24 are disconnected from the pump device 30, and are connected to the master cylinder 12, so that the front wheel brake cylinders 18, 24 can be activated by the pressurized fluid delivered from the master cylinder 12. If the pressure reduction control valves 58 for the front wheel brake cylinders 18, 24 were normally open valves, these control valves 58 could not be returned to the original normally open state in the event of occurrence of an electrical abnormality, and the pressurized fluid would be discharged from the front wheel brake cylinders 18, 24 and returned to the master reservoir 31 through the open pressure reduction control valves 58. In the present embodiment, the normally closed pressure reduction control valves 58 permit activation of the front wheel brake cylinders 18, 24 even in the event of an electrical abnormality.

Thus, the normally closed pressure reduction control valves 58 for the front wheel brake cylinders 18, 24 and the normally open pressure reduction control valves 62 for the rear wheel brake cylinders 50, 52 permit activation of the wheel brake cylinders 18, 24, 50, 52 without any brake drag, even in the event of occurrence of an electrical abnormality in the braking system.

Figure 21:
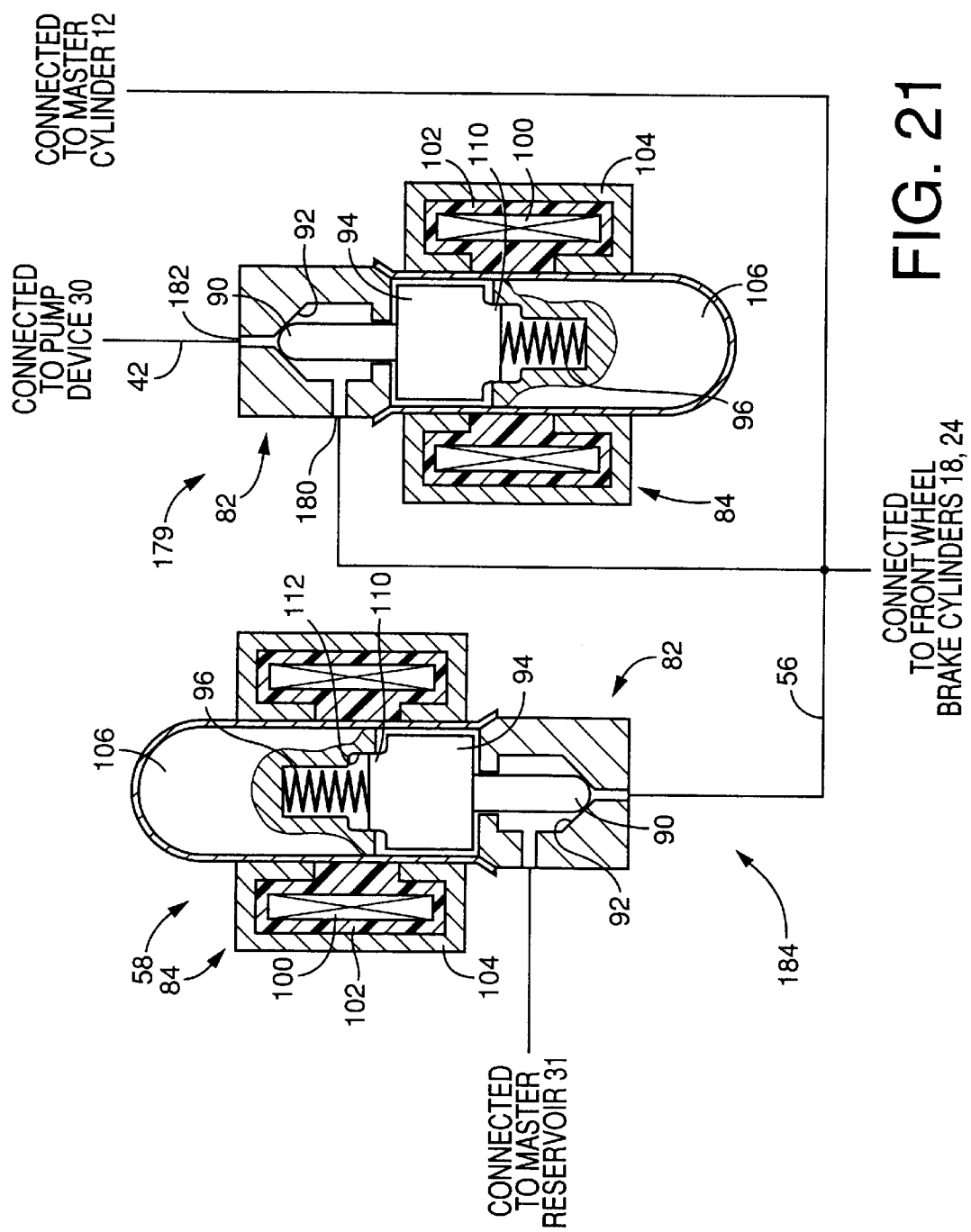
FIG. 21 is an elevational view in cross section of a front wheel linear valve device included in the braking system of FIG. 20.
Figure 22:
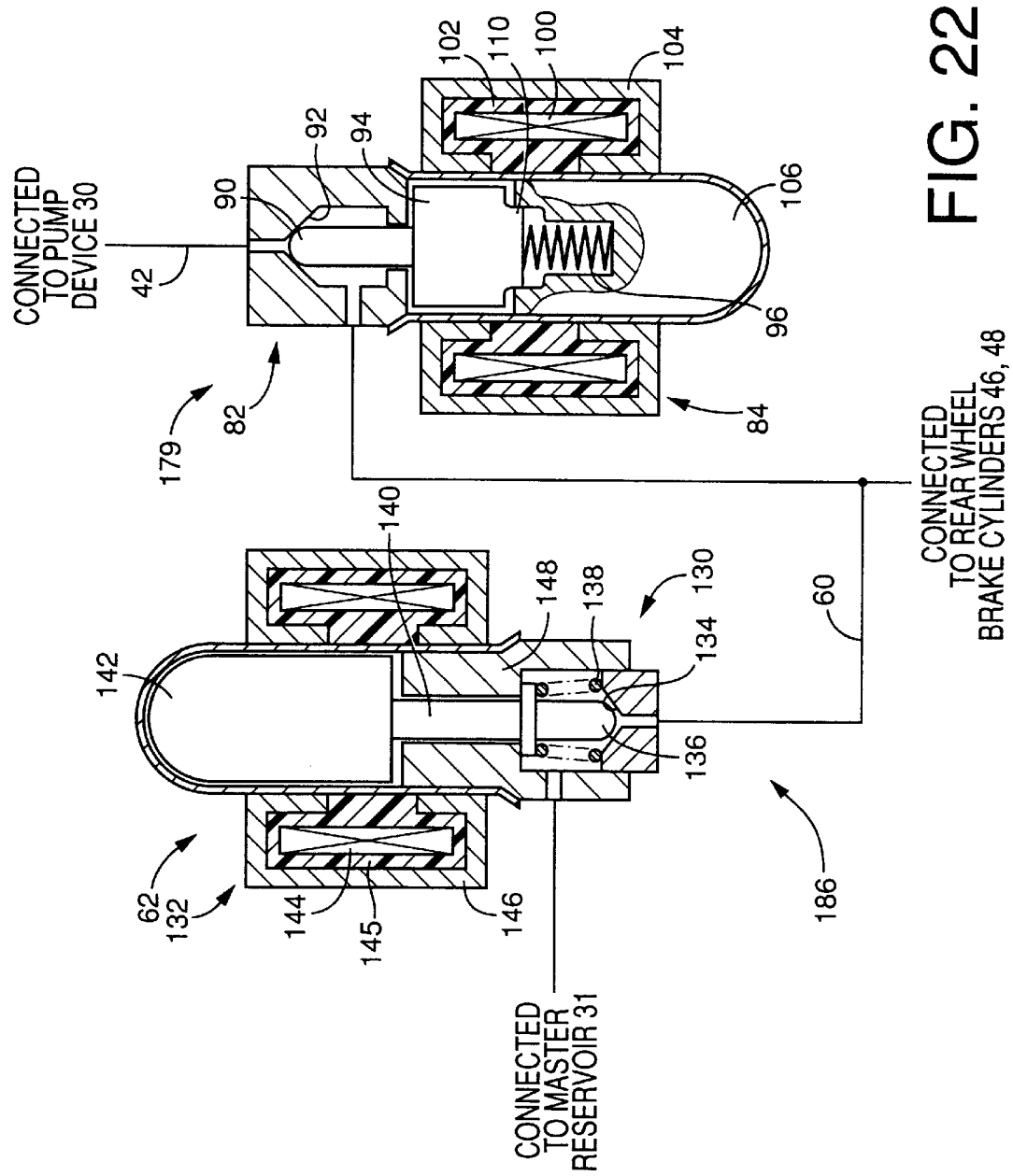
FIG. 22 is an elevational view in cross section of a rear wheel linear valve device included in the braking system of FIG. 20.

Referring FIGS. 21 and 22, there are schematically shown the front wheel linear valve device 184 and the rear wheel linear valve device 186.

In the front wheel linear valve device 184 of FIG. 21, the pressure reduction control valve 58 and the pressure increase control valve 179 have the same construction as described above by reference to FIG. 2. The the seating valve 82 of the pressure increase control valve 179 has a port 180 connected to the front wheel brake cylinders 18, 24 and the pressure reduction control valve 58, and a port 182 which is closed by seating of the valve member 90 on the valve seat 92. The port 182 is connected to the pump device 30.

In the rear wheel linear valve device 186 of FIG. 22, the pressure reduction control valve 62 has the same construction as described above by reference to FIG. 3. The pressure increase control valve 179 of the valve device 186 is identical in construction with the pressure increase control valve 179 of the front wheel valve device 184.

Figure 23A:
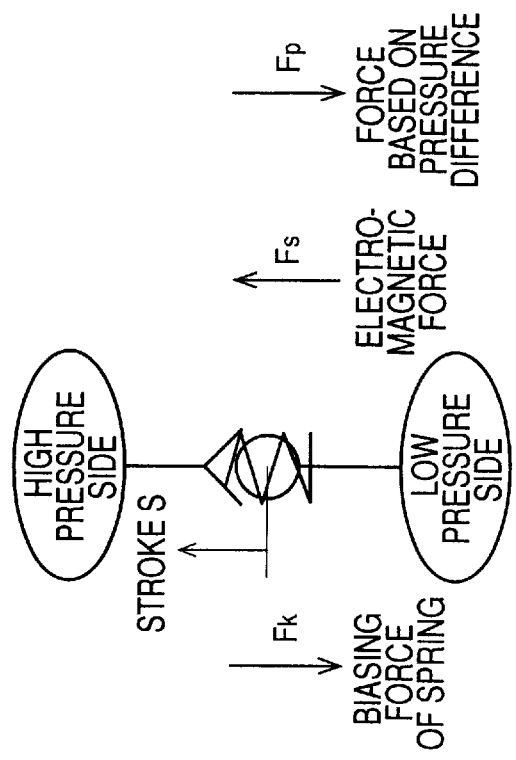
FIG. 23A is a view schematically illustrating forces acting on a pressure increase control valve and a pressure reduction control valve which are included in the front wheel linear valve device of FIG. 21.

As shown in FIG. 23A, the valve member 90 of the pressure increase control valve 179 receives a biasing force Fk of the spring 96, a pressure difference force Fp based on a pressure difference across the seating valve 82, and an electromagnetic drive force Fs. The pressure difference across the seating valve 82 is detected as a difference between the output or delivery pressure of the pump device 30 and the fluid pressure in the wheel brake cylinder 18, 24, 50, 52. When a sum of the pressure difference force Fp and the electromagnetic force Fs has become larger than the biasing force Fk of the spring 96, the valve member 90 is moved away from the valve seat 92. When the electromagnetic force Fs is zero, the valve member 90 is moved away from the valve seat 92 when the pressure difference force Pp has become larger than the biasing force Fk. The pressure difference across the seating valve 82 necessary to open the pressure increase control valve 178 when the electromagnetic force Fs is zero is larger than 18 MPa (about 184 kg/cm$^2$) which is the maximum delivery pressure of the pump 30. Therefore, the pressure increase control valve 178 will not be opened without energizing the solenoid coil 100.

In the pressure reduction control valve 58, too, the valve member 90 receives the biasing force Fk, pressure difference force Fp and electromagnetic drive force Fs, as also indicated FIG. 23A. The opening pressure difference of this pressure reduction control valve 58 is also set to be larger than 18 MPa, so that the valve 58 will not be opened when the electromagnetic drive force Fs is zero, even if the fluid pressure in the front wheel brake cylinder 18, 24 is increased to the maximum delivery pressure of the pump device 30. That is, the fluid will not be discharged from the front wheel brake cylinder 18, 24 to the master reservoir 31, without energizing the coil 100 of the pressure reduction control valve 58.

Figure 23B:
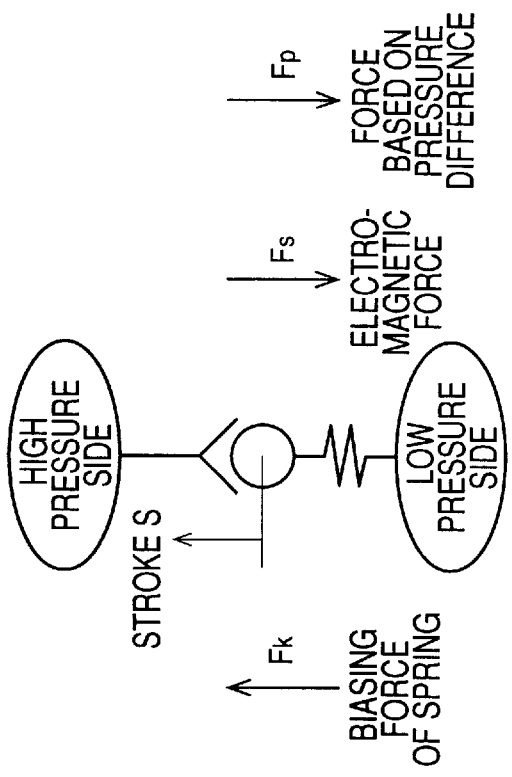
FIG. 23B is a view schematically illustrating forces acting on a pressure reduction control valve included in the rear wheel linear valve device of FIG. 22.

In the pressure reduction control valve 62 of the rear wheel linear valve device 186 of FIG. 22, the valve member 140 receives a biasing force Fk of the spring 138, a pressure difference force Fp based on the pressure difference across the seating valve 130, and an electromagnetic force Fs, as shown in FIG. 23B. However, the direction in which the biasing force Fk and the electromagnetic drive force Fs act on the valve member 130 are opposite to the directions in which the biasing force Fk and the electromagnetic drive force Fs act on the valve member 90 of the pressure reduction control valve 58 of the front wheel linear valve device 184 of FIG. 21. When the electromagnetic force Fs is smaller than a sum of the biasing force Fk and the pressure difference force Fp, the pressure reduction control valve 62 is held open. When the electromagnetic drive force Fs has become larger than the sum of the biasing force Fk and the pressure difference force Fp, the valve 62 is closed.

Since the biasing force Fk of the spring 138 is considerably small, it may be ignored. Since the pressure difference force Fp acts on the valve member 136 in the direction for moving the valve member 136 away from the valve seat 134, the valve member 136 is held in the open state when the electromagnetic drive force Fs is zero, even if the biasing force Fk is considerably small.

An operation of the present braking system will be described.

When the brake pedal 10 is operated, the control device 160 executes a normal braking pressure control routine, wherein the pump device 30 is operated, and the master cylinder cut-off valves 26, 28 are brought to the closed state, and the front and rear wheel linear valve devices 184, 186 are controlled so that the fluid pressure pressurized by the pump device 30 is controlled by the linear valve devices 184, 186 and applied to the wheel brake cylinders 18, 24, 50, 52. In the normal braking pressure control routine, a target value of the fluid pressure in the wheel brake cylinders 18, 24, 50, 52 is obtained depending upon a depression force acting on the brake pedal 10, and the actual value of the fluid pressure in the wheel brake cylinders is controlled so as to reduce a difference between the target and actual values. Namely, the fluid pressure in the wheel brake cylinders 19, 24, 50, 52 is controlled by the linear valve devices 184, 186 so that the braking effect provided by the wheel brake cylinders coincides with a target value as represented by the operating amount of the brake pedal 10.

The linear valve devices 184, 186 are controlled according to a linear valve device control routine which will be described. The linear valve device control routine is formulated to select the pressure increase mode when a difference ΔP between the target wheel brake cylinder pressure obtained in the normal braking pressure control routine and the actual wheel brake cylinder pressure is larger than a predetermined threshold EPS. That is, the pressure increase mode is selected when the target wheel brake cylinder pressure is higher than the actual wheel brake cylinder pressure by more than the threshold EPS. When the pressure difference ΔP is smaller than a predetermined negative threshold −EPS (when the pressure difference ΔP is larger than the absolute value of the threshold −EPS), the pressure reduction mode is selected. In the other case, the pressure hold mode is selected. When the pressure control mode is changed from the pressure reduction mode to the pressure hold mode, the valve member 136 of the seating valve 130 of the pressure reduction control valve 62 is slowly seated on the valve seat 134. When the pressure control mode is changed from the pressure increase mode to the pressure hold mode, the valve member 90 of the seating valve 82 of the pressure increase control valve 179 is slowly seated on the valve seat 92. The pressure control modes will be described in detail.

When the amount of slipping of at least one wheel of the vehicle has become excessive with respect to the friction coefficient of the road surface during brake application to the vehicle, that is, a predetermined anti-lock braking pressure control initiating condition is satisfied, an anti-lock braking pressure control is initiated. In the anti-lock braking pressure control, the master cylinder cut-off valves 26, 28 are switched to the closed state, and the front and rear wheel linear valve devices 184, 186 are controlled to control the fluid pressures in the wheel brake cylinders 18, 24, 50, 52 independently of each other, so that the amounts of slipping of the wheels are held within an optimum range. As in the normal braking pressure control, the target fluid pressure in each wheel brake cylinder is determined in the anti-lock braking pressure control.

When the amounts of slipping of the rear drive wheels 46, 48 have become excessive with respect to the road surface friction coefficient, that is, a predetermined traction control initiating condition is satisfied, a traction control of the rear drive wheels 46, 48 is initiated. Described more specifically, the traction control initiating condition is satisfied when the rotating speed of the rear drive wheels 46, 48 has become higher than a traction control initiating upper limit VTB, which is higher by a predetermined amount than the vehicle running speed which is estimated on the basis of the rotating speed of the front driven wheels 16, 22. In the traction control, the fluid pressure in the rear drive wheels 50, 52 is controlled in the same manner by the rear wheel linear valve devices 186. Since the traction control is effected to the rear wheel brake cylinders 50, 52, the master cylinder cut-off valves 26, 28 provided for the front wheel brake cylinders 18, 24 are held in the open state. Accordingly, when the brake pedal 10 is depressed during the traction control, the fluid pressurized by the master cylinder 12 is immediately supplied to the front wheel brake cylinders 18, 24, so that the front wheel brake cylinders are activated without a delay. In the traction control, the target fluid pressure in the rear wheel brake cylinders 50, 52 is obtained. While the present sixth embodiment is adapted such that the delivery pressure of the pump device 30 is kept at the same value irrespective of whether the braking system is activated or not, the delivery pressure when the braking system is not activated may be made lower than when the braking system is activated When the amount of spinning or drift-out motion of the vehicle during turning has exceeded a predetermined threshold SVs or SVd, the control device 160 initiates a spinning control routine or a drift-out control routine. The amount of spinning or drift-out motion of the vehicle is obtained on the basis of the output signals of the steering angle sensor 170 and the yaw rate sensor 172. The spinning control routine or drift-out control routine is formulated to control the front or rear wheel linear valve device 184, 186 so that the appropriate wheel or wheels is/are braked so as to give the turning vehicle a yaw moment which is effective to reduce the amount of spinning or drift-out motion. In the spinning or drift-out control routine, the target fluid pressure of the appropriate wheel brake cylinder or cylinders is determined to brake the appropriate wheel or wheels so as to give the desired yaw moment to the vehicle.

In the event of occurrence of an electrical abnormality, the master cylinder cut-off valves 26, 28 are returned to the open state, the pressure increase control valves 179 and the pressure reduction control valves 58 are returned to the closed state, while the pressure reduction control valves 62 are returned to the open states. As a result, the front wheel brake cylinders 18, 24 are disconnected from the pump device 30 and are connected to the master cylinder 12. With the pressure reduction control valves 58 placed in the closed state, the front wheel brake cylinders 18, 24 can be actuated by the pressurized fluid delivered from the master cylinder 12. On the other hand, the rear wheel brake cylinders 50, 52 are disconnected from both the pump device 30 and the front wheel brake cylinders 18, 24, and are connected to the master reservoir 31. Since the pressure increase control valves 179 provided between the front wheel brake cylinders 18, 24 and the rear wheel brake cylinders 50, 52 are placed in the closed state, the fluid in the front wheel brake cylinders 18, 24 is prevented from being discharged into the rear wheel brake cylinders 50, 52. The pressure increase control valves 179 will not be opened even when the fluid pressure at the portions 182 on the side of the pump device 30 is higher than the fluid pressure at the port 180 on the side of the wheel brake cylinders 18, 24, 50, 52.

When the pressure increase mode is selected, the electric current (one form of the electric energy) to be applied to the solenoid coil 100 of the pressure increase control valve 179 is controlled so as to zero the pressure difference ΔP, namely, so that the actual wheel brake cylinder pressure approaches the target value, as indicated in FIG. 24. As described below, the electric current to be applied to the coil 100 is controlled by both a feedback control so as to zero the pressure difference ΔP, and a feed-forward control while taking account of the temperature of the working fluid and other parameters.

In the pressure increase mode, the pressure reduction control valve 58 is held in the closed state with the solenoid coil 100 being in the de-energized state.

On the other hand, the electric current to be applied to the solenoid coil 144 of the pressure reduction control valve 62 is controlled such that the electromagnetic drive force Fs generated is larger than the pressure difference force Fp by a predetermined margin value Fr. Although the maximum electric current may be applied to the coil 144 as in the conventional braking system, this arrangement requires a comparatively large amount of consumption of the electric energy by the pressure reduction control valve 62. In the present embodiment, the amount of electric current to be applied to the coil 144 is determined by the pressure difference ΔP (pressure difference force Fp), that is, by the fluid pressure in the rear wheel brake cylinders 50, 52, so that the electric energy consumption is minimized. Further, the electric current is determined so that the electromagnetic drive force Fs is larger than the pressure difference force Fp by the predetermined margin value Fr, the valve member 90 is stably held seated on the valve seat 92. The electric current is controlled by both a feedback control and a feed-forward control, as in the control of the electric current to be applied to the coil 100 of the pressure increase control valve 179.

The margin value Fr indicated above is determined on the basis of a maximum pressure increasing velocity α of the pressure increase control valve 179 and a force Fa that should be applied to the valve member 136 to be seated on the valve seat 134. The maximum pressure increasing velocity α is a maximum amount of pressure increase by the pressure increase control vale 54 per unit time, which is determined by the specific constructional characteristics of the braking system, such as the maximum delivery pressure of the pump device 30, the resistance of fluid f low through the fluid passage 42, and the resistance of fluid flow through an orifice in the pressure increase control valve 179. The linear valve device control routine is executed with a predetermined cycle time ΔT. A fluid pressure Pn+1 controlled by the pressure increase control valve 179 in the next control cycle will not be higher than (Pn+ΔPi), wherein Pn is the fluid pressure in the present control cycle, and ΔPi is an amount of increase (α·ΔT) of the pressure from the present value Pn at the maximum pressure increasing velocity α. Therefore, the valve member 136 can be held seated on the valve seat 134 by controlling the electric current to be applied to the coil 144 so that the electromagnetic drive force Fs is equal to or larger than the pressure difference force Fp corresponding to the fluid pressure (Pn+α·ΔT).

Figure 25:
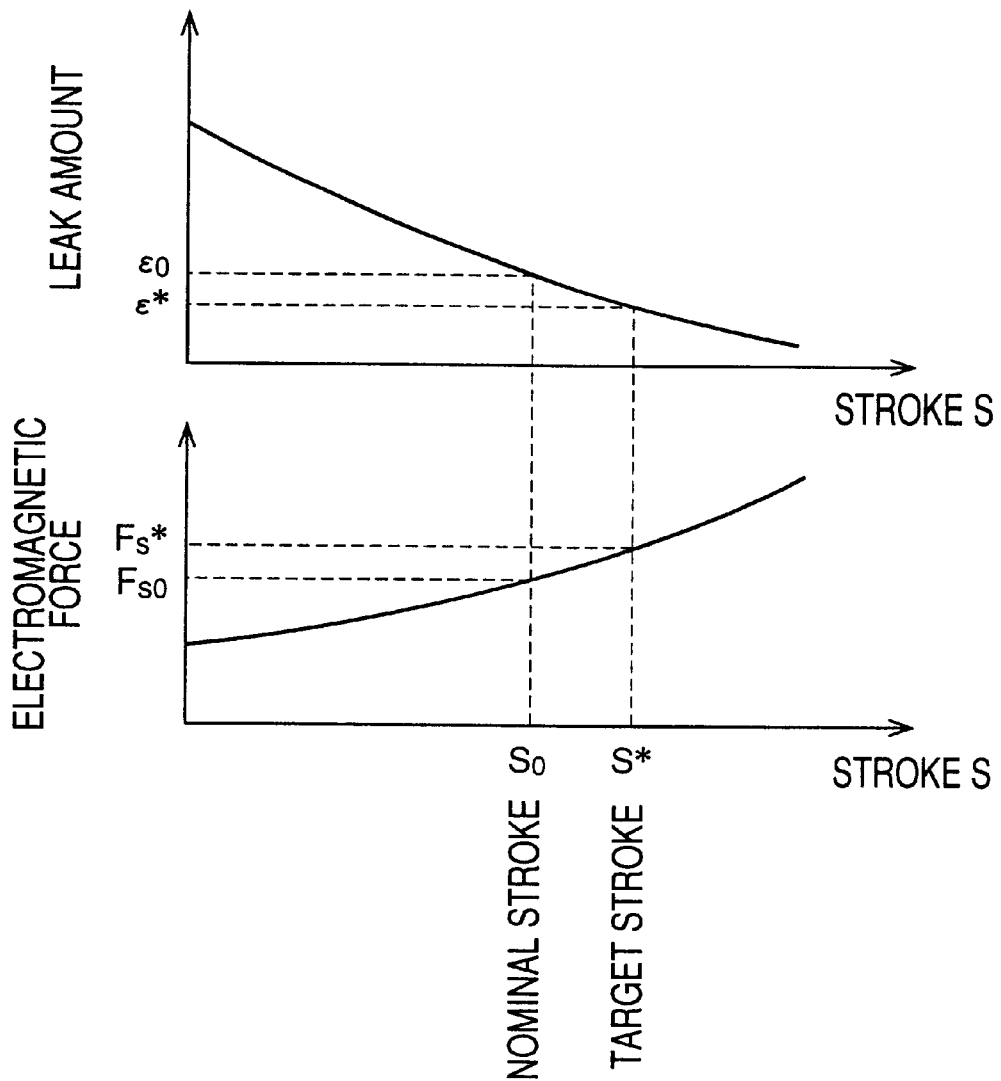
FIG. 25 is a graph indicating relationships between operating stroke and fluid leak amount and electromagnetic force of the control valve of the linear valve device.

The amount of leak of the fluid is determined by the operating stroke S of the valve member 136, as schematically indicated in FIG. 25. The operating stroke S is determined by the force by which the valve member 136 is forced against the valve seat 134.

When the operating stroke S is equal to a nominal stroke S0 at which the valve member 136 is just seated on the valve seat 134, the fluid discharge from the rear wheel brake cylinder 50, 52 to the master cylinder 31 is theoretically inhibited. However, there may exist a certain gap between the valve member 136 and the valve seat 134 due to an error in the manufacture of the seating valve 82, and the fluid may leak through this gap by an amount amount ϵ0. The amount of the gap is reduced by further forcing the valve member 136 against the valve seat 134 for elastic deformation thereof, whereby the fluid leak amount is reduced. To reduce the fluid leak amount to a tolerable value ϵ*, the operating stroke S should be increased from the nominal value S0 to S*, to increase the electromagnetic drive force Fs from Fs0 to Fs*. That is, the margin value Fr is equal to a difference (Fs*−Fs0) between the electromagnetic force Fs* corresponding to the increased operating stroke S* and the electromagnetic force Fs0 corresponding to the nominal operating stroke S0. Accordingly, the electric current to be applied to the solenoid coil 144 is controlled to produce the electromagnetic force Fs which is equal to a sum of the pressure difference force Fp and the margin value Fr=Fs*−Fs. With the fluid leak amount reduced to the tolerable value ϵ*, the accuracy of control of the fluid pressure in the pressure reduction control valve 62 can be improved. The required amount of consumption of the electric energy according to this arrangement is smaller than in the case where the fluid leak amount is zeroed.

When the pressure reduction mode is selected, the pressure increase control valve 179 is held in the closed state with its coil 200 being in the de-energized state, while the electric currents to be applied to the pressure reduction control valves 58, 62 are controlled so as to zero the pressure difference ΔP, as indicated in FIG. 24.

When the pressure hold mode is selected, the pressure increase control valve 179 and the pressure reduction control valve 58 are held in the closed state with their coils 100 being in the de-energized state. However, the electric current to be applied to the coil 144 of the pressure reduction control valve 62 is controlled as in the pressure increase mode, that is, so that the electromagnetic force Fs generated is equal to the pressure difference force Fp and the margin value Fr. The pressure difference force Fp corresponds to the fluid pressure in the rear wheel brake cylinders 50, 52 when the pressure hold mode is selected. When the pressure control mode is changed from the pressure reduction mode to the pressure hold mode, the electromagnetic drive force Fs generated by the pressure reduction control valve 62 is increased by an amount Fss which is necessary for seating of the valve member 136 on the valve seat 134. At the end of the pressure reduction mode, the valve member 136 is presumed to be spaced apart from the valve seat 134. Therefore, the electromagnetic drove force Fs must be increased by the amount Fss which is necessary to holding the valve member 136 seated on the valve seat 134.

When the pressure increase mode is terminated, the valve member 90 of the seating valve 82 of the pressure increase valve 179 is slowly seated on the valve seat 92, for soft seating of the valve member 90 on the valve seat 92. That is, the pressure increase mode is slowly changed to the pressure hold mode, at a relatively low speed of seating of the valve member 90 on the valve seat 92. To this end, the electric current to be applied to the solenoid coil 10 is slowly reduced to zero, as indicated in FIG. 24, according to an equation $i=i_0\beta^n$, wherein "$i_0$" represents an electric current applied upon termination of the pressure increase mode, and "β" represents a value smaller than "1", while "n"represents the number of control cycles to slowly reducing the electric current i.

Thus, the speed at which the valve member 90 is seated on the valve seat 92 is reduced, making it possible to reduce the seating noise and the impact of the valve member 90 onto the valve seat 92, so that the durability of the pressure increase control valve 179 is increased.

When the pressure reduction mode is terminated, the valve member 136 of the pressure reduction control valve 62 is slowly seated on the valve seat 134, for soft seating of the valve member 136 on the valve seat 134. That is, the pressure reduction mode is slowly changed to the pressure hold mode, at a relatively low speed of seating of the valve member 136 on the valve seat 134. To this end, the electric current to be applied to the solenoid coil 144 is slowly increased, as indicated in FIG. 24.

The pressure reduction control valve 62 is adapted such that the pressure difference force Fp acts on the valve member 136 in the direction for moving the valve member 136 away from the valve seat 146, as indicated in FIG. 23B. Accordingly, the electromagnetic drive force Fs generated must be larger than the pressure difference force Fp, so that the valve member 136 is seated onto the valve seat 134. If the electromagnetic drive force Fs is abruptly increased, the speed of seating of the valve member 136 onto the valve seat 134 is excessively large, causing an increased seating noise and an increased impact of the valve member 136 onto the valve seat 134, resulting in reduced durability of the seating valve 130. In the present embodiment, however, the electromagnetic drive force Fs is slowly increased so as to avoid an excessive speed of seating of the valve member 136 onto the valve seat 134, for thereby reducing the seating noise and improving the durability of the seating valve 130.

Figure 26:
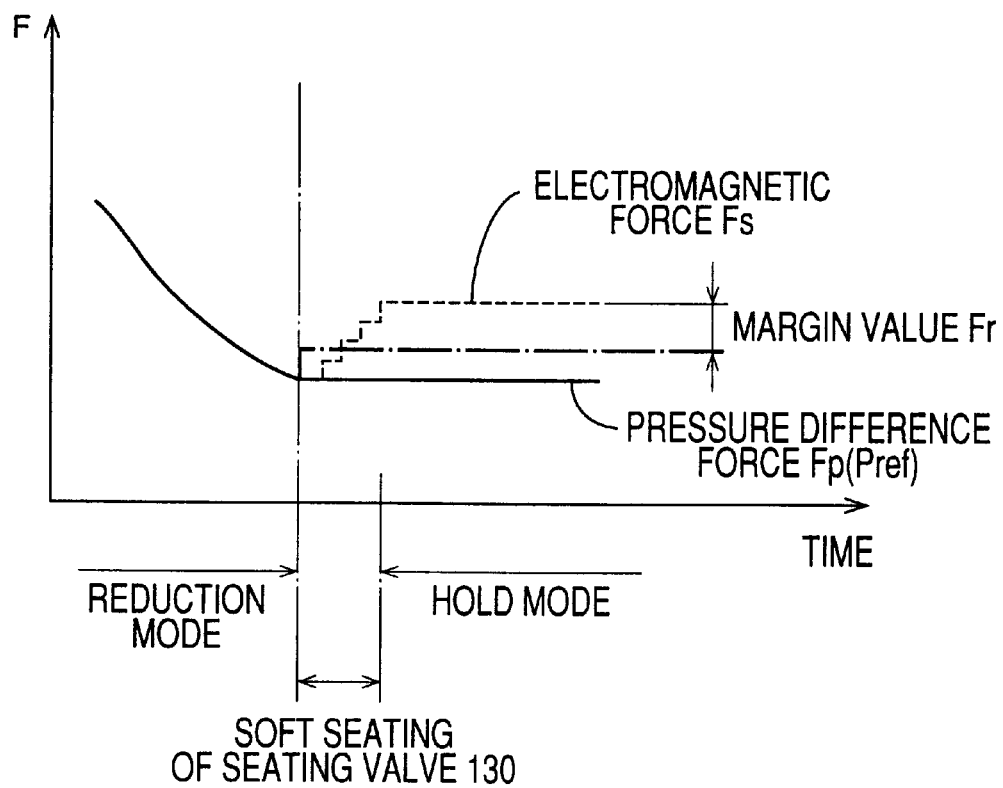
FIG. 26 is a graph showing an example of control of electric current applied to the pressure reduction control valve, for slow seating of a valve member onto a valve seat, immediately after termination of a pressure reducing operation in the hydraulic pressure control apparatus of FIG. 20.

In the present sixth embodiment, the electric current is controlled so that the electromagnetic drive force Fs is slowly increased at a rate represented by (Fr+Fss)/n, as indicated in FIG. 26. "n"represents the number of control cycles which are repeated with the cycle time ΔT.

For instance "n"is equal to "4". After the pressure reduction mode has been terminated, the pressure hold mode is established in most cases. Where the pressure reduction mode is changed to the pressure hold mode, the wheel brake cylinder pressure is held constant. To this end, the electric current to be applied to the solenoid coil 144 is controlled so that the electromagnetic drive force Fs is held equal to a sum of the force Fss necessary for seating of the valve seat 136 on the valve seat 134 and the margin value Fr. With this electromagnetic drive force Fs, the valve member 136 is held seated on the valve seat 134, since the wheel brake cylinder pressure is not increased. Thus, the electric current applied to the coil 144 is not abruptly increased, but is slowly increased, so that the valve seat 136 is slowly seated onto the valve seat 134 with a reduced impact therebetween.

Figure 27:
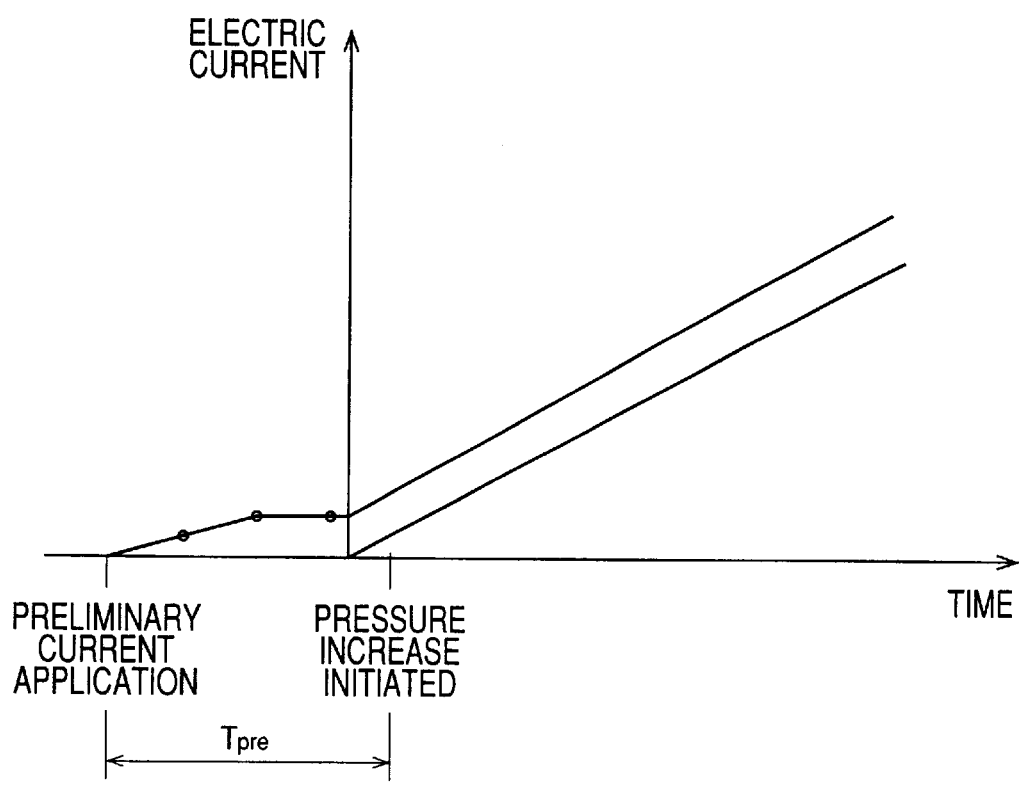
FIG. 27 is a graph showing an example of preliminary current application to the pressure reduction control valve by the hydraulic pressure control apparatus.

When a predetermined condition for initiating preliminary current application to the solenoid coil 144 of the pressure reduction control valve 62 is satisfied when the braking system is not in operation, the electric current is applied to the solenoid coil 144 before initiation of a fluid pressure increase in the rear wheel brake cylinder 50, 52, as indicated in FIG. 27, so that the valve member 136 is seated on the valve seat 134. The condition for initiating the preliminary current application is satisfied when there is a high possibility that the pressure increase mode will be selected in he near future. For instance, the condition for initiating the preliminary current application is satisfied when releasing of the accelerator pedal is detected by the throttle opening sensor 168, when the rotating speed of the rear drive wheels 46, 48 has exceeded a threshold VTB' which is lower than the threshold VTB for initiating the traction control described above, or when the amount of spinning or drift-out motion of the vehicle has exceeded a threshold SVs' or SVd' which is lower than the threshold SVs or SVd for initiating the spinning or drift-out control routine. In such a case, the electric current applied to the solenoid coil 144 is slowly increased at a predetermined low rate. Since the pressure difference force Fp is zero while the braking system is not in operation, the valve seat 136 can be seated on the valve seat 134 with a relatively small value of the electromagnetic drive force Fs. This preliminary current application is effective to reduce a delay in the operation to increase the wheel brake cylinder pressure.

In the present sixth embodiment, the preliminary current application is effected for a predetermined time Tpre. If the pressure increase operation is not initiated within this time Tpre, the electric current applied to the coil 144 is zeroed to unseat the valve seat 136 from the valve seat 134. Since the wheel brake cylinder pressure is equal to the atmospheric pressure, the valve member 136 need not be seated on the valve seat 134. This arrangement is effective to prevent unnecessary consumption of the electric energy. In the preliminary current application, the electric current is increased in steps for "n" times (four times in this embodiment), so that the time Tpre is equal to the cycle time ΔT×n.

The increase in the electric current in the preliminary current application is illustrated in FIG. 27. In the first control cycle, the electric current is increased to a predetermined value larger than zero. In the fourth and the following control cycles, the electric current is held constant at a predetermined level. The valve seat 136 can be seated on the valve seat 134 in a relatively short time by increasing the electric current to a relatively high value in the first control cycle. This arrangement reduces a delay in the increase in the wheel brake cylinder pressure even if the pressure increase mode is established immediately after the preliminary current application is initiated. Since the electric current is not abruptly increased, the speed of seating of the valve member 136 onto the valve seat 134 can be low enough reduce the seating impact.

The preliminary current application may be effected to increase the electric current at a constant rate. In this case, the electric current may be controlled in the same manner when the pressure reduction mode is terminated.

The operations to control the electric currents to be applied to the solenoid coils of the linear valve devices 184, 186 will be further explained. As described above, the electric currents are controlled by combination of the feedback and feed-forward controls. The feedback control of the electric currents is effected in a well known PID control fashion (proportional, integral and differential control), so as to zero the pressure difference ΔP between the target and actual values of the wheel brake cylinder pressure. The PID control may be replaced by a P control, an I control, a D control, a PI control or a PD control.

The feed-forward control of the electric currents is effected by taking into account the temperature of the working fluid.

As shown in FIGS. 23A and 23B, the valve member 90, 136 of the pressure increase control valves 179 and pressure reduction control valves 58, 62 receive the biasing force Fk of the spring, electromagnetic drive force Fs and pressure difference force Fp. Where "x0", "x", "i" and "Δp" respectively represent a displacement of the valve member relative to the valve seat in a steady state of the control valve 179, 58, 62, a displacement of the valve member from the steady state, an electric current applied to the solenoid coil 100, 144, and a pressure difference across the seating valve 82, 130, the biasing force Fk, electromagnetic drive force Fs and pressure difference force Fp are represented by the following equations, respectively:

$$Fk = k0(x0+x)$$

$$Fs = ks1 \cdot i - ks2 \cdot x + \alpha 1$$

$$Fp = kp1 \cdot \Delta p - kp2 \cdot x + \alpha 2$$

wherein, k0, ks1, ks2, kp1, kp2, α1 and α2 are constants determined by the modulus of elasticity of the spring 96, 138 and other factors of the control valves 179, 58, 62. In the above equations, the terms $(-ks2 \cdot x + \alpha 1)$ and $(-kp2 \cdot x + \alpha 2)$ are necessary only when the control of the valves is non-linear, and may be zero when the control may be considered linear.

In the pressure increase control valves 179 and the pressure reduction control valves 58 shown in FIG. 23A, the following equation (1) is satisfied for equilibrium of the forces Fk, Fs, Fp:

$$Fk = Fs + Fp \qquad (1)$$

In the pressure reduction control valves 62, the following equation (2) is satisfied for equilibrium of the forces Fk, Fs and Fp:

$$Fk + Fp = Fs \qquad (2)$$

Further, the orifice provided in each of those control valves 179, 58, 62 satisfies the following equation (3):

$$Q = C \cdot A \cdot \sqrt{(\Delta p / \rho)} \qquad (3)$$

A change in the fluid pressure and a rate of change in the fluid volume have a relationship represented by the following equation (4):

$$dV/V = \beta \cdot dp \qquad (4)$$

In the above equation (3), "Q", "C", and "ρ" respectively represent a flow rate of the working fluid, a coefficient of flow of the fluid, a cross sectional area of flow of the fluid through the control valve, and a density of the fluid. The cross sectional area A of flow of the fluid is proportional to the operating stroke x of the valve member 90, 136, and is represented by an equation $A = ka \cdot x$. In the above equation (4), "β" represents a compression coefficient of the fluid, which is a reciprocal of the modulus of elasticity of volume, and "V" represents an initial value of the volume of the fluid, which is determined by the volume of the control valve. "dV" is a positive value when the volume is reduced.

The above equation (4) may be converted into $(1/V\beta) \cdot dV/dt = dp/dt$. Since "dv/dt" in this equation is equal to the flow rate Q of the fluid, the equation can be converted into the following equation (5):

$$(1/V\beta) \cdot Q = dp/dt \qquad (5)$$

From the above equations (3) and (5), the following equation (6) may be obtained:

$$(1/V\beta) \cdot C \cdot ka \cdot x \cdot \sqrt{(\Delta p / \rho)} = dp/dt \qquad (6)$$

According to the above equations (1) and (2), the operating stroke x of the valve member 90, 136 can be expressed by the following equation (7) which includes the pressure difference Δp across the seating valve 82, 130, the electric current i and coefficients a1, a2 and a3:

$$x = a1 \cdot \Delta p + a2 \cdot i + a3 \qquad (7)$$

For the pressure increase control valves 179 and the pressure reduction control valves 58, the coefficients a1, a2 and a3 are represented by the following equations:

$$a1 = kp1 / (k0 + ks2 + kp2)$$

$$a2 = ks1 / (k0 - ks2 + kp2)$$

$$a3 = -(k0 \cdot x0 + \alpha 1 + \alpha 2) / (k0 + ks2 + kp2)$$

For the pressure reduction control valves 62, the coefficients a1, a2 and a3 are represented by the following equations:

$$a1 = kp1 / (kp2 - k0 - ks2)$$

$$a2 = ks1 / (kp2 - k0 - ks2)$$

$$a3 = (k0 \cdot x0 + \alpha 2 - \alpha 1) / (kp2 - k0 - ks2)$$

From the above equations (6) and (7), the electric current i is represented by the following equation (8):

$$i = \{1/(C \cdot V\beta \cdot ka)(dP/dt)\sqrt{(\rho/\Delta p)} - a1 \cdot p - a3\}a2 \qquad (8)$$

By inserting into the above equation (8) a target rate of change dP/dt of the target wheel brake cylinder pressure and a pressure difference Δp across the seating valve 82, 130 when the target wheel brake cylinder pressure P is expected to be established, the electric current i can be obtained. The density ρ and the compression coefficient β (volume change ratio) of the fluid vary with the temperature of the fluid. The electric current i obtained according to the above equation (8) wherein "ρ" and "β" are determined depending upon the fluid temperature is an optimum electric current reflecting the fluid temperature. In other words, the electric current i according to the above equation (8) permits optimum control of the control valves 179, 58, 62 without an adverse influence of the fluid temperature. The fluid temperature can be detected by a temperature sensor The linear valve devices 184, 186 are controlled according to the linear valve device control routine illustrated in the flow chart of FIG. 28.

The linear valve device control routine is initiated with step S131 to determine whether the target wheel brake cylinder pressure Pref is higher than the atmospheric pressure. Normally, a negative decision (NO) is obtained in step S131, and the control flow goes to step S132 to determine whether a PRELIMINARY CURRENT APPLICATION flag is set at "1". The target wheel brake cylinder pressure Pref is higher than the atmospheric pressure when any one of the normal braking pressure control routine, anti-lock braking pressure control routine, traction control routine and vehicle stability brake control routine is executed. The PRELIMINARY CURRENT APPLICATION flag is set to "1" when the predetermined condition for initiating the preliminary current application is satisfied, and is reset to "0" when one of the above-indicated routines is initiated or when the predetermined time Tpre indicated above has passed.

If a negative decision (NO) is obtained in step S132, the control flow goes to step S133 to determine whether the condition for initiating the preliminary current application is satisfied or not. As indicated above, this condition is satisfied when any sign indicating a high possibility that the pressure increase mode will be selected in the near future is detected.

When an affirmative decision (YES) is obtained in is step 3133, the control flow goes to step S134 to set the PRELIMINARY CURRENT APPLICATION flat to "1", and then to step S135 to determine whether a content npre of a counter for counting the number of control cycles during the preliminary current application is larger than a predetermined value Nspre. If a negative decision (NO) is obtained, the control flow goes to step S136 in which the predetermined electric current is applied to the solenoid coil 144 of the pressure reduction control valves 62, and the content npre is incremented. The predetermined value Nspre corresponds to the predetermined time Tpre described above by reference to FIG. 27. Then, the control flow goes back to step S131. When step S132 is implemented again, an affirmative decision (YES) is obtained in step S132, and the control flow goes to step S135 skipping steps S133 and S134. Steps S132, S135 and S136 are repeatedly implemented until an affirmative decision (YES) is obtained in step S135. Thus, the electric current is applied to the coil 144 for the time Tpre.

If the preliminary current application initiating condition is not satisfied, a negative decision (NO) is obtained in step S133, and the control flow goes to step S137 to reset the various counters and place the solenoid-operated valves 26, 26, 58, 62, 179 in the initial states, since the fluid pressures in any wheel brake cylinders 18, 24, 50, 52 are controlled, and the preliminary current application is not effected. A step similar to step S137 is implemented when the operation to control the wheel brake cylinder pressure is terminated.

When the content npre of the counter has exceeded the predetermined value Nspre, an affirmative decision (YES) is obtained in step S134, and the control flow goes to step S138 in which the electric current applied to the coil 144 is zeroed, and the PRELIMINARY CURRENT APPLICATION flat is reset to "0". That is, the preliminary current application to the coal 144 is terminated since an operation to control the wheel brake cylinder pressure has not not initiated within the predetermined time Tpre.

Figure 29:
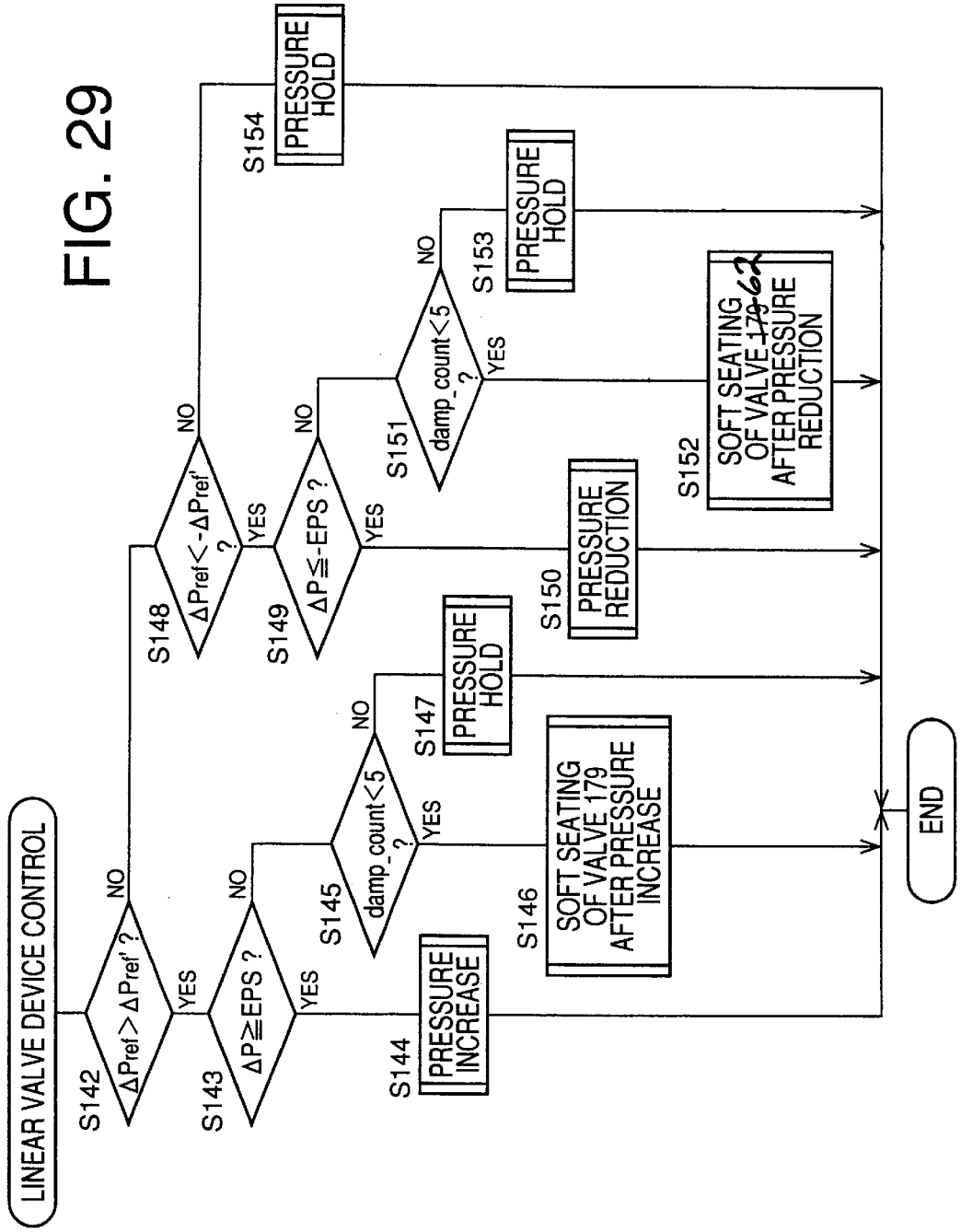
FIG. 29 is a flow chart illustrating a linear valve device control in step S140 of the flow chart of FIG. 28.

When the target wheel brake cylinder pressure Pref is higher than the atmospheric pressure, an affirmative decision (YES) is obtained in step S131, and the control flow goes to step S139 to reset the PRELIMINARY CURRENT APPLICATION flat to "0", and then to step S140 in which the linear valve devices 184, 186 are controlled as illustrated in the flow chart of FIG. 29. Initially, step 542 is implemented to determine whether a rate of change $\Delta$Pref of the target wheel brake cylinder pressure Pref is higher than a predetermined value $\Delta$Pref'. If an affirmative decision (YES) is obtained in step S142, it means that the pressure increase mode is required. In this case, the control flow goes to step S143 to determine whether the pressure difference $\Delta$P between the target value Pref and the actual value P is equal to or larger than the predetermined threshold EPS. If an affirmative decision (YES) is obtained in step S143, the control flow goes to step S144 in which the pressure increase mode is established to increase the fluid pressure in the wheel brake cylinder. When the pressure difference $\Delta$P has been reduced to a value smaller than the threshold EPS, namely, when the pressure increase mode is terminated, a negative decision (NO) is obtained in step S143, and the control flow goes to step S145 to determine whether a content damp_count of a counter for slow seating of the valve member 90 of each pressure increase control valve 179 on the valve seat 92 is smaller than a predetermined value. If an affirmative decision (YES) is obtained in step S145, the control flow goes to step S146 in which the electric current applied to the coil 100 is reduced, and the content damp_count of the counter is incremented. Steps S145 and S146 are repeatedly implemented until the content damp_count has reached the predetermined value, that is, until a negative decision (NO) is obtained in step s145. Thus, the electric current applied to the coil 100 of the seating valve 82 of the pressure increase control valve 179 is slowly reduced for slow or soft seating of the valve member 90 on the valve seat 92.

When the negative decision (NO) is obtained in step S145, the control flow goes to step S147 to establish the pressure hold mode and reset the content damp_count of the counter for the soft seating of the valve member 90.

If a negative decision (NO) is obtained in step S142, it means that the pressure increase mode is not required. In this case, the control flow goes to step S148 to determine whether the rate of change $\Delta$Pref of the target wheel brake cylinder pressure Pref is smaller than a threshold −$\Delta$Pref'. If an affirmative decision (YES) is obtained in step S148, the control flow goes to step S149 to determine whether the pressure difference $\Delta$P is equal to or smaller than a predetermined threshold −EPS, that is, whether the absolute value of the pressure difference $\Delta$P is equal to or larger than the value EPS. If an affirmative decision (YES) is obtained in step S149, it means that the pressure reduction mode is required. In this case, the control flow goes to step S150 to establish the pressure reduction mode in which the pressure increase control valves 179 are held in the closed state with the coils 100 being in the de-energized state, and the electric currents to be applied to the coils 100, 144 or the pressure reduction control valves 58, 62 are controlled so as to reduce the pressure difference $\Delta$P, by the feedback and feed-forward controls indicated above. If a negative decision (NO) is obtained in step S149, the control flow goes to step S151 to determine whether the content damp_count of a counter for slow seating of the valve member 136 of each pressure reduction control valve 62 on the valve seat 134 is smaller than a predetermined value. If an affirmative decision (YES) is obtained in step S151, the control flow goes to step S152 in which the electric current applied to the coil 144 is increased, and the content damp_count is incremented. Steps S151 and S152 are repeatedly implemented until a negative decision (NO) is obtained in step S151. Thus, the electric current applied to the coil 144 of the seating valve 130 of the pressure reduction control valve 62 is slowly increased until the electromagnetic drive force Fs is increased to a sum, of the required seating force Fss and the margin value Fr (described above by reference to FIG. 26), for slow or soft seating of the valve member 136 on the valve seat 134. When the negative decision (NO) is obtained in step S151, the control flow goes to step S153 to establish the pressure hold mode.

When a negative decision (NO) is obtained in step S148, that is, when the rate of change $\Delta$Pref of the target wheel brake cylinder pressure Pref is in a predetermined range between $\Delta$Pref' and −$\Delta$Pref', the control flow goes to step S154 to establish the pressure hold mode.

Thus, one of the pressure increase mode, pressure hold mode and pressure reduction mode is selected during an operation of the brake pedal 10, in not only the normal braking pressure control but also the anti-lock braking pressure control.

Figure 30:
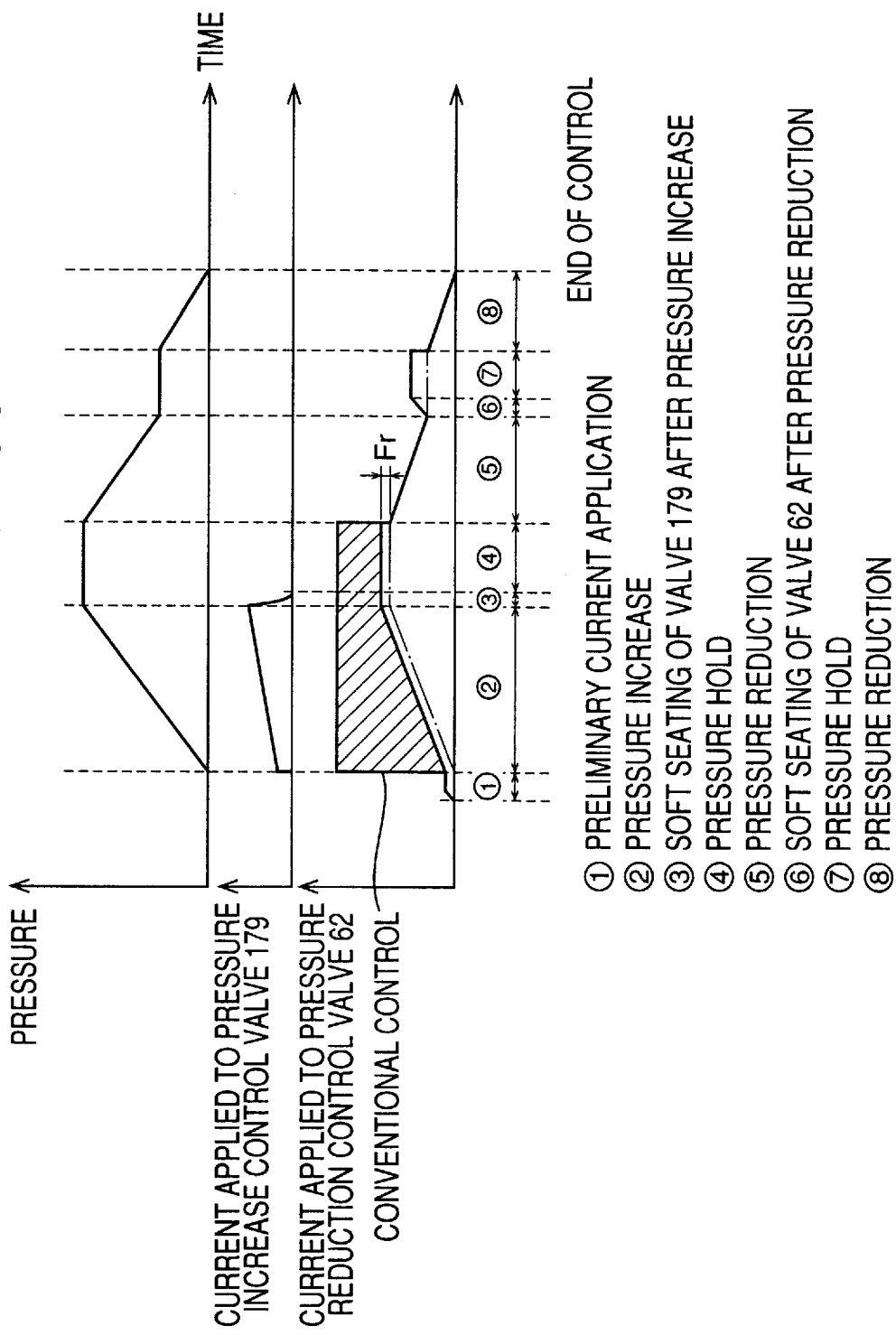
FIG. 30 is a view showing an example of control of the linear valve device by the hydraulic pressure control apparatus of FIG. 20.

By controlling the pressure increase control valves 179 and the pressure reduction control valves 62 as illustrated in the flow chart of FIG. 29, the electric currents applied to the coils 100 and 144 of these control valves 179, 62 are controlled as schematically indicated in the graph of FIG. 30. As shown in this graph, the amount of electric current applied to the coils 144 of the pressure reduction control valves 62 is made smaller than in the conventional control, thereby reducing the required amount of consumption of the electric energy by the control valves 62. Further, the electric current applied to the coils 144 is controlled so that the electromagnetic drive force Fs is larger than the pressure difference force Fp by the predetermined margin value Fr, whereby the valve member 136 can be held seated on the valve seat 134 with high stability. Further, the electric current applied to the coils 144 are slowly increased upon termination of the pressure reduction mode, so that the valve member 136 is slowly seated on the valve seat 134, for reduced impact of seating of the valve member 136 onto the valve seat 134, and accordingly increased durability of the pressure reduction control valves 62. In addition, the preliminary current application to the coils 144 of the control valves 62 before initiation of an operation in the pressure increase mode is effective to reduce a delay in the increase in the wheel brake cylinder pressures 50, 52 in the pressure increase mode. Further, the electric current applied to the coils 100 of the pressure increase control valves 179 is slowly reduced upon termination of the pressure increase mode, for soft or slow seating of the valve member 90 on the valve seat 92, for reducing impact of seating of the valve member 90 onto the valve seat 92 and accordingly increased durability of the pressure increase control valves 179.

It will be understood from the foregoing description of the sixth embodiment of this invention that a controller for controlling an electric energy to be supplied to the solenoid-operated pressure control valve 62 is constituted by the stroke sensor 71, pressure sensors 72, 74–78, control device 160, brake switch 166, throttle opening sensor '68, steering angle sensor 170 and yaw rate sensor 172. It will also be understood that the controller includes electric energy control means for controlling the electric energy to be supplied to the pressure control valve 62 depending upon the fluid pressure in the brake cylinder 50, 52. The electric energy control means is constituted by a portion of the control device 160 assigned to implement steps S144, S147, S153 and S154 of the flow chart of FIG. 29. It will further be understood that a portion of the control device 160 assigned to implement steps S134–S136 and S152 of the flow charts of FIGS. 28 and 29 constitutes slowly energy increasing means for slowly increasing the electric energy to be supplied to the pressure control valve 62, for slow seating of the valve member 136 on the valve seat 134. It will also be understood that the slowly energy increasing means includes preliminary energy applying means for initiating application of the electric energy to the pressure control valve 62 before the condition for increasing the fluid pressure in the brake cylinder 50, 52 is satisfied. The preliminary energy applying means is constituted by a portion of the control device 160 assigned to implement steps S134–S136. It will further be understood that the pump device 30, pressure increase control valves 179 and a portion of the control device 160 assigned to implement steps S144 constitute pressure increasing means for increasing the fluid pressure in the brake cylinder 50, 52.

Figure 28:
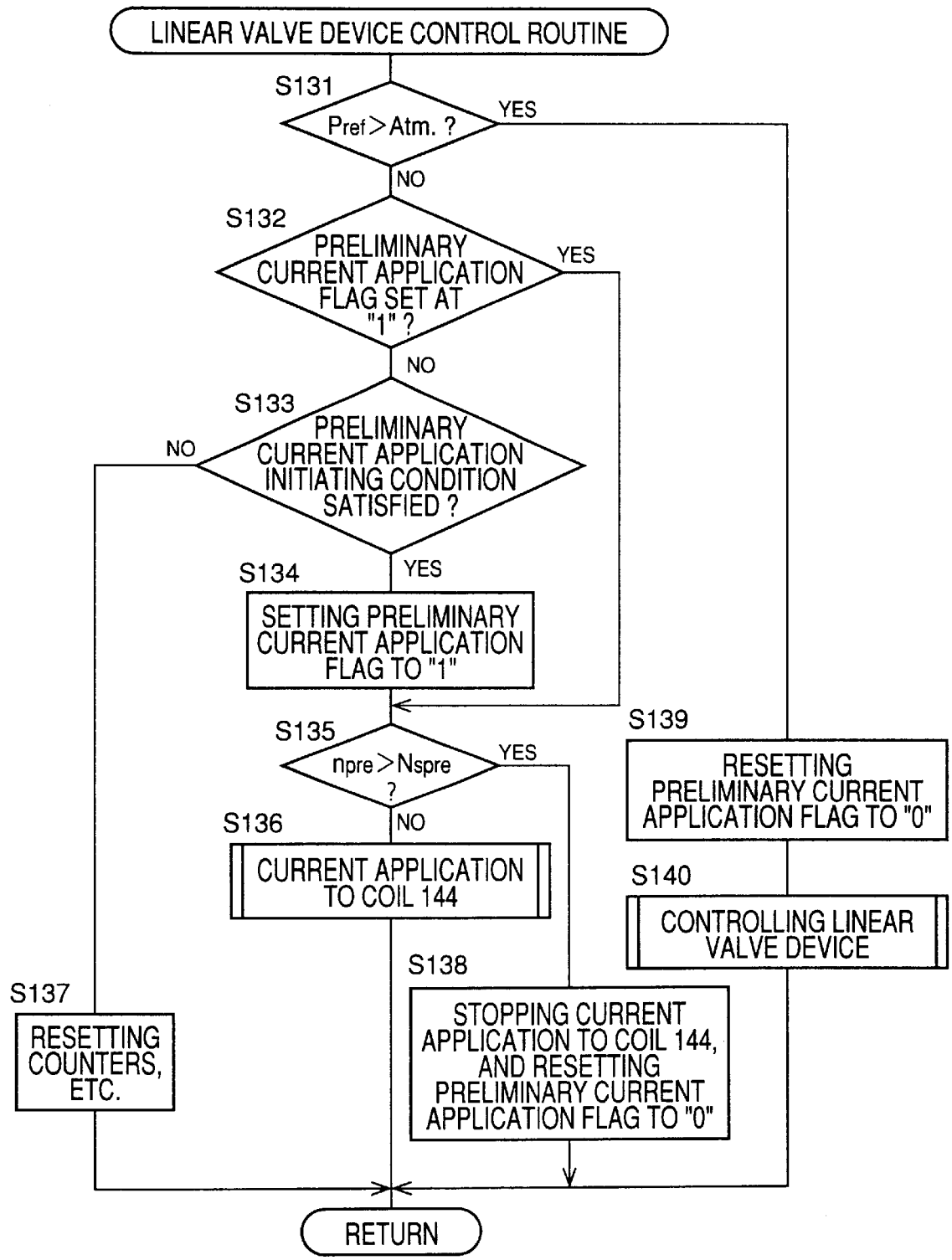
FIG. 28 is a flow chart illustrating a linear valve device control routine executed according to a program stored in ROM of the hydraulic pressure control apparatus.

In the sixth embodiment of FIGS. 28 and 29, the electric current to be applied to the pressure reduction control valves 62 is increased in different patterns in the preliminary current application control in steps S134–S136 and in the soft or slow seating current application control in step S152 after the pressure reduction mode. However, the electric current is increased in the same pattern in these preliminary current application control and soft seating current application control. The preliminary current application control is not essential, and may be replaced by a slow seating current application control effected immediately after the initiation of the pressure increase control in the pressure increase mode, so that the electric current applied to the coil 144 is slowly increased for a predetermined time after the initiation of the pressure increase control, as in a linear valve device control routine illustrated in the flow chart of FIG. 31 according to a seventh embodiment of the present invention.

Figure 31:
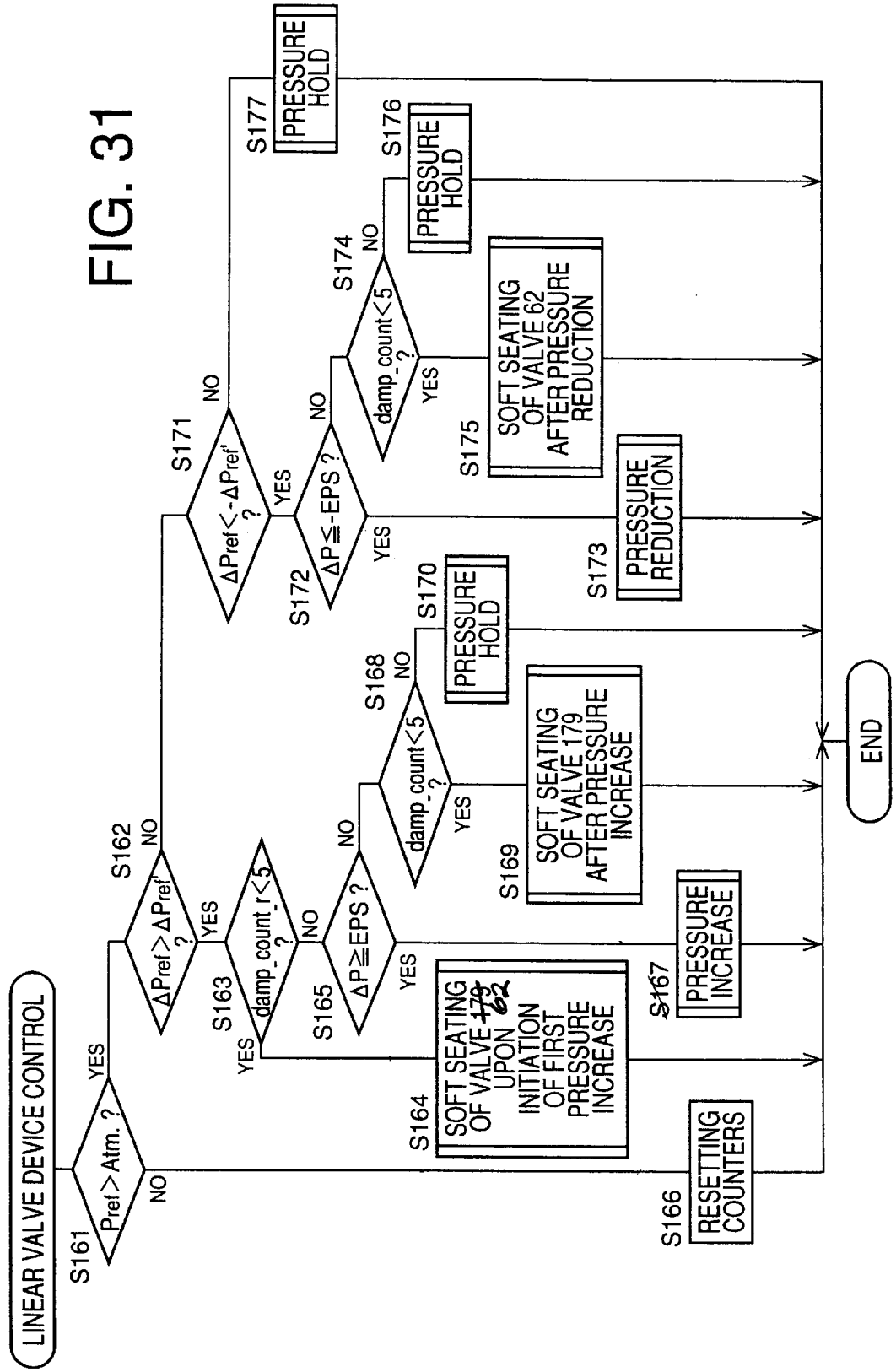
FIG. 31 is a flow chart illustrating a linear valve device control routine executed according to a program stored in ROM of a hydraulic pressure control apparatus according to another embodiment of this invention.

The linear valve device control routine of FIG. 31 is initiated with step 'S16 to determine whether the target wheel brake cylinder pressure Pref is higher than the atmospheric pressure. If an affirmative decision (YES) is obtained in step S161, it means that the wheel brake cylinder pressure is being controlled. In this case, the control flow goes to step S162 to determine whether the rate of change ΔPref is higher than the predetermined threshold ΔPref'. If a negative decision (NO) is obtained in step S161, it means that the wheel brake cylinder pressure is not being controlled. In this case, the control flow goes to step S166 in which the braking system is initialized, with various counters being reset and the solenoid-operated valves 26, 28, 58, 62, 179 being placed in the initial states. If an affirmative decision (YES) is obtained in step S162, the control flow goes to step S163 to determine whether the content damp_count of a counter for soft or slow seating immediately after initiation of the pressure increase control in the pressure increase mode is smaller than a predetermined threshold. If an affirmative decision (YES) is obtained in step S163, the control flow goes to step S164 to effect the slow seating current application control in which the electric current to be applied to the coil 144 of the pressure reduction control valves 62 is slowly increased. Steps S163 and S164 are repeatedly implemented until a negative decision (NO) is obtained in step S163. That is, the electric current applied to the coil S144 is slowly increased until a predetermined time has passed after the pressure increase mode is required, that is, after the affirmative decision is obtained in step S162. When the negative decision is obtained in step S163, the control flow goes to step S165 and subsequent steps S167–S170 which are identical with steps S145–S150 of FIG. 29. Steps S171–S77 of FIG. 31 are identical with steps S148–S154 of FIG. 29.

Figure 32:
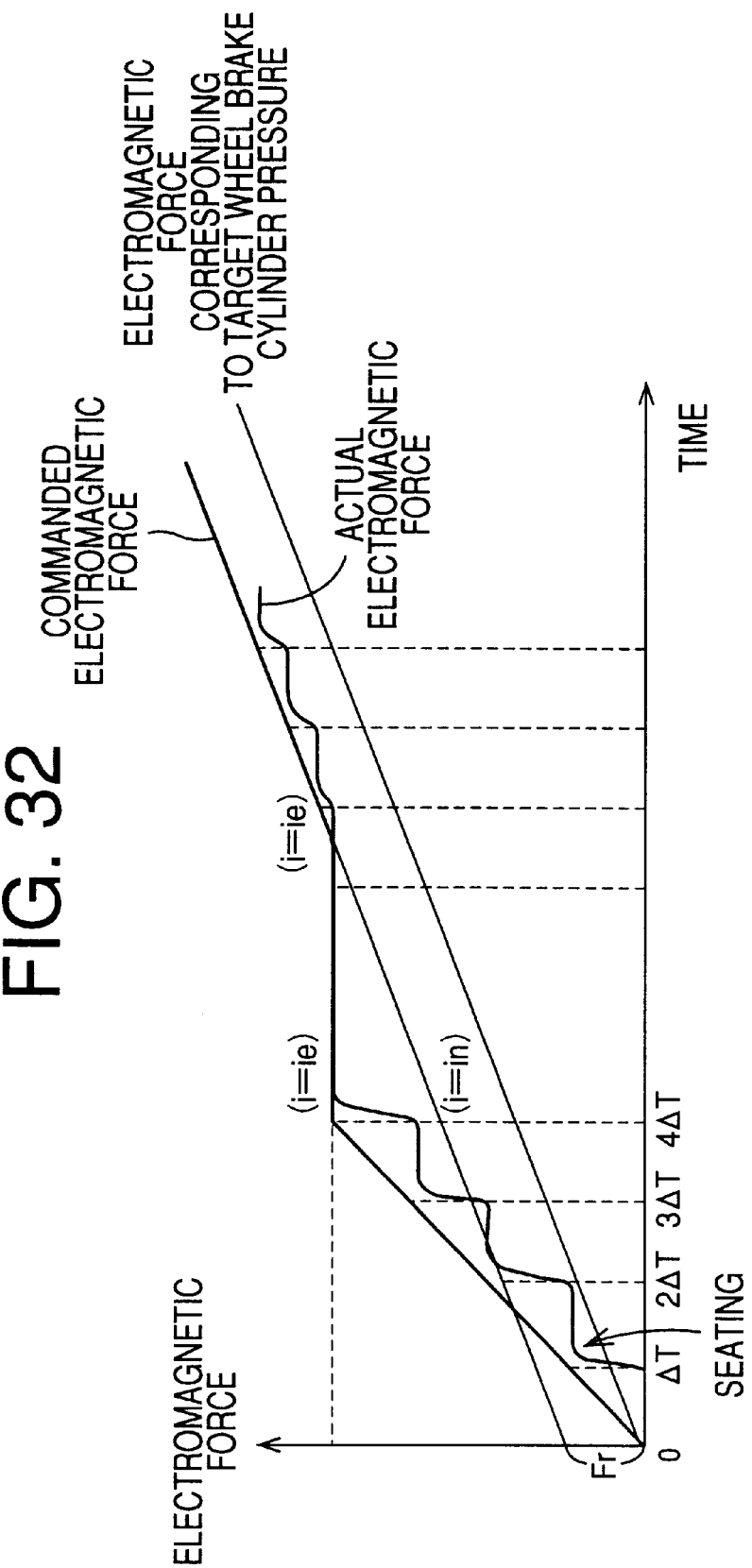
FIG. 32 is a graph showing an example of control of the electric current applied to the pressure reduction control valve immediately after initiation of a pressure increasing operation in the hydraulic pressure control apparatus FIG. 20.

While the electric current to be applied to the coil 144 may be slowly Increased in step S164 in the same pattern as described above with respect to the sixth embodiment by reference to the graph of FIG. 27, the control of the electric current in step S164 is effected in the present seventh embodiment such that the electromagnetic drive force Fs changes as indicated by solid line in the graph of FIG. 32. In this case, the margin value Fr is equal to the pressure difference force Fp based on the pressure difference ΔP, which is equal to α·ΔT, as described above, wherein "α" represents the maximum pressure increasing velocity, while the ΔT is the cycle time. Accordingly, the electromagnetic drive force Fs increases at a rate corresponding to the margin value Fr=Fp corresponding to the pressure difference ΔP. Namely, ΔFs (Δi)=Fp (ΔP)·n, wherein "n"represents the number of control cycles in which the electric current i is slowly increased up to a value $i_e$. If the current value $i_e$ in the last control cycle is higher than a normal value $i_n$ according the normal current control in the pressure increase mode, the current i is not immediately reduced to the value $i_n$, but is held at the value $i_e$ until the normal value $i_n$ has increased to the value $i_e$. Then, the current i is controlled according to the normal current control in the pressure increase mode.

In the first control cycle, the electromagnetic drive force Fs is smaller than a sum of the pressure difference force Fp and the margin value Fr. In the second and subsequent control cycles, the electromagnetic force Fs is equal to or larger than the sum, as in the normal current control in the pressure increase mode, as indicated in FIG. 32. This arrangement assures stable seating of the valve member 136 on the valve seat 134, while avoiding an excessive amount of the electromagnetic drive force Fs upon seating of the valve member 136 onto the valve seat 134. In this case, the target wheel brake cylinder pressure Pref may be considered to be increased at the maximum pressure increasing velocity α.

Figure 33:
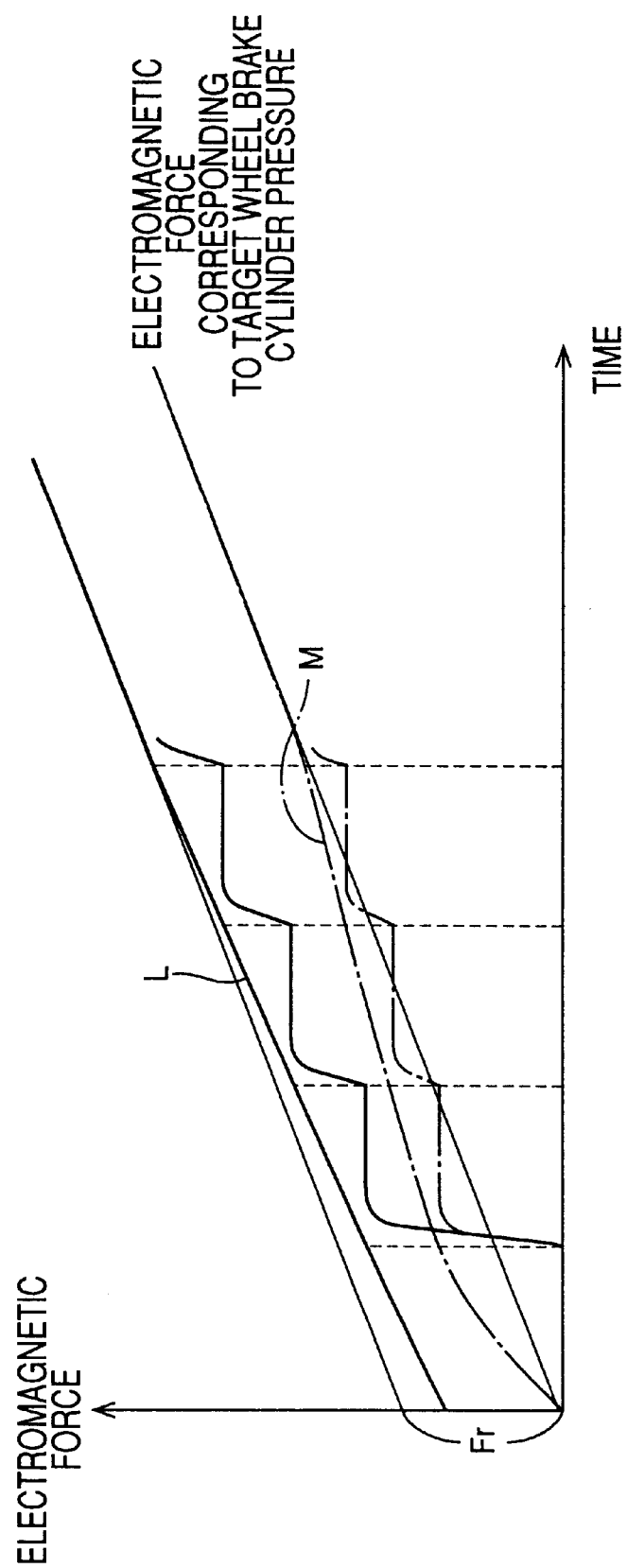
FIG. 33 is a graph showing examples of control of the electric current immediately after initiation of the pressure increasing operation in still further embodiments of the invention.

The control of the electric current in step S164 may be such that the electromagnetic drive force Fs increases according to the following equation (9), as indicated by solid line L in the graph of FIG. 33, according to an eighth embodiment of this invention.

$$Fs(i)=Fp(Pref)/\gamma+Fr\times\gamma \qquad (9)$$

In the above equation, "γ" represents a deceleration coefficient represented by $1-\frac{1}{2}^t$. The deceleration coefficient γ approaches "1" as the time passes. The electric current controlled according to the above equation (9) is comparatively large immediately after the initiation of the pressure increase control, so that the valve member 136 is moved toward the valve seat 134 at a relatively high velocity and is seated on the valve seat 134. Subsequently, the electric current is controlled according to the normal current control in the pressure increase mode. The deceleration coefficient γ may be replaced by any other suitable coefficient.

The electric current may be controlled according to the following equation (10):

$$Fs(i)=Fp(Pref)/\gamma \qquad (10)$$

The electric current applied to the coil 144 may be controlled according to another equation similar to the above equations (9) and (10), provided the electric current is comparatively large in the first control cycle and approaches the normal value as the time passes, as in the above cases according to the above equations (9) and (10). Further, the electric current may be controlled according to a stored data map representative of a predetermined relationship between the electric current values and the control cycles.

Further, the electric current may be controlled such that the electromagnetic drive force Fs increases according to the following equation (11), as indicated by one-dot chain line M in FIG. 33:

$$Fs(i)=Fp(Pref)\times\gamma \qquad (11)$$

In this case, too, the valve member 136 may be slowly seated on the valve seat 134, for reduced seating noise of the valve member 136 and increased durability of the pressure reduction control valves 62.

Figure 34:
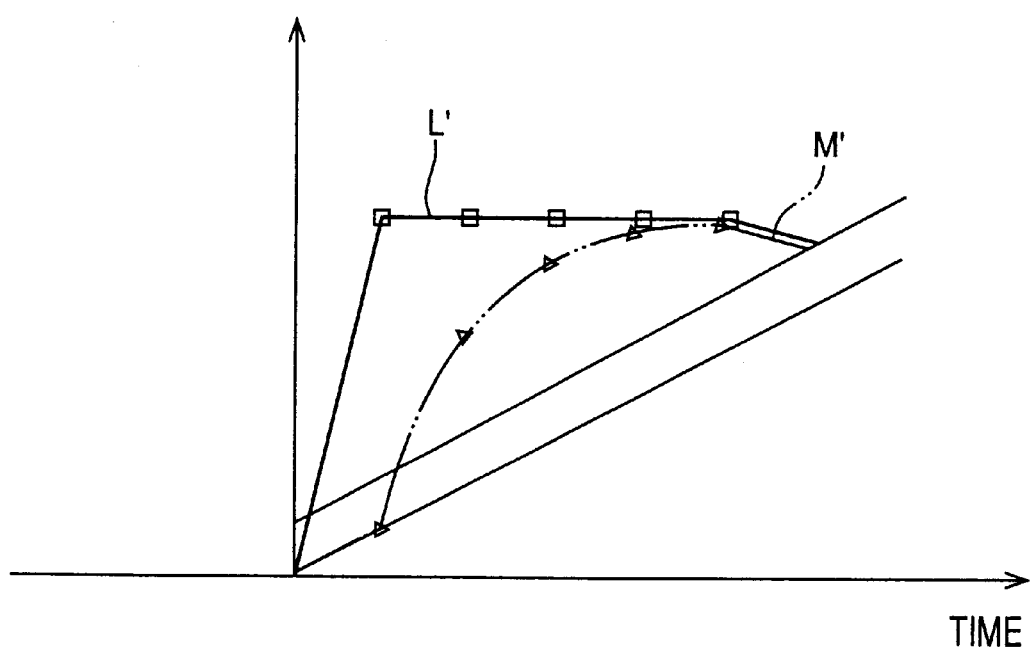
FIG. 34 is a view showing other examples of control the electric current according to still further embodiments of the invention.

The electric current applied to the coil 144 may be controlled as indicated by solid line L' in FIG. 34, so as to generate a relatively large electromagnetic drive force Fs in the first control cycle and subsequently hold the drive force Fs constant before the normal current control in the pressure control mode. Alternatively, the electric current may be controlled as indicated by two-dot chain line M' in FIG. 34, such that the electric current in the first control cycle is comparatively small, and such that the electric current in the second and subsequent control cycles are comparatively large. In the latter case, the pressure increase may be delayed, but the valve member 136 can be seated on the valve seat 134 at a sufficiently low velocity, and can be held seated with high stability.

The tolerable amount of fluid leak used in determining the margin value Fr of the electromagnetic drive force Fs need not be a predetermined constant value ε*, but may be a variable which changes with the target wheel brake cylinder pressure Pref. It is also noted that the margin value Fr need not be determined on the basis of both the maximum pressure increasing velocity α and the force for forcing the valve member 135 onto the valve seat 134, but may be determined on the basis of one of those values. The maximum pressure increasing velocity α may also be a variable which varies with the delivery pressure of the pump device 30, for instance. Further, the electromagnetic drive force Fs need not be larger than the pressure difference force Fp by the margin value Fr, and may be equal to the pressure difference force Fp where the valve member 136 is seated on the valve seat 134 in a good condition. In this case, the electric energy consumption by the pressure reduction control valves 62 can be minimized.

In view of a tendency that the amount of fluid leak through a gap between the valve member 136 and the valve seat 134 changes with the time, it is possible to automatically update the relationship between the operating stroke S of the valve member 136 and the fluid leak amount, as indicated in the graph of FIG. 25.

The embodiments of FIGS. 20–34 are adapted to control the electric currents applied to the coils 100, 144 of the control valves 58, 62, 179, while taking account of the temperature of the working fluid with which the density ρ and volume change ratio (compression coefficient) β. However, the electric currents may be adjusted by a compensation coefficient which is determined on the basis of the electric current i and the wheel brake cylinder pressure P, and according to a predetermined relationship among the compensation coefficient, electric current i and wheel brake cylinder pressure P, as shown in FIG. 35 by way of example. The predetermined relationship is represented by a data map stored in the ROM 154. In this case, the temperature sensor 174 is not necessary.

For instance, the above-indicated relationship may be obtained as follows:

The actual fluid pressure in the wheel brake cylinders when the electric current applied to the coil 100, 144 is determined according to the above-indicated equation (8) including the target wheel brake cylinder pressure P, etc. is detected. If the density ρ and compression coefficient β of the working fluid accurately correspond to the actual fluid temperature, the detected actual value and the target value of the wheel brake cylinder pressure are equal to each other. In other words, if the detected actual wheel brake cylinder pressure when the electric current corresponding to the target wheel brake cylinder pressure is applied to the coil 100, 144 is the same as the target wheel brake cylinder pressure, the electric current is not required to be compensated. In this case, the compensation coefficient is set at "1". If the actual and target wheel brake cylinder pressures are different from each other, the compensation coefficient is determined based on the difference. Thus, the predetermined relationship is obtained, and a data map representative of this relationship is stored in the ROM 154, so that the compensation coefficient is determined according to the data map, and on the basis of the wheel brake cylinder pressure and the electric current calculated according to the above equation (8). The electric current calculated according to the above equation (8) is adjusted by multiplying the calculated electric current by the determined compensation coefficient. The thus adjusted electric current reflects the changes in the density and compression coefficient of the working fluid with its temperature.

In the embodiment of FIG. 35, it is not required to take into account the chronological change in the amount of the fluid leak from the closed control valves 58, 62, 179 when the electric current applied to the coil 100, 144 is determined. Accordingly, it is not required to update the relationship between the fluid leak amount and the operating stroke of the valve member 90, 136.

The pressure increase control valves 179 need not be controlled, provided that the delivery pressure of the pump device 30 is controlled depending upon the amount of operation of the brake pedal 10, for example. The pressure increase control valves 179 are controlled only when the delivery pressure of the pump device 30 is excessively high, so that actual wheel brake cylinder pressure is close to the target value. In this case, the high-pressure and low-pressure pump motors 38, 40 are controlled so that the delivery pressure detected by the pump pressure sensor 74 corresponds to the depression force acting on the brake pedal 10. The pressure increase control valves 179 may be eliminated depending upon the application of the braking system.

Further, the spring 138 of the pressure reduction control valves 62 is not essential. Where the spring 138 is eliminated, the pressure reduction control valves 62 may be placed in the closed state when the braking system is not in operation. However, this closed state is not positively maintained.

Figure 36:
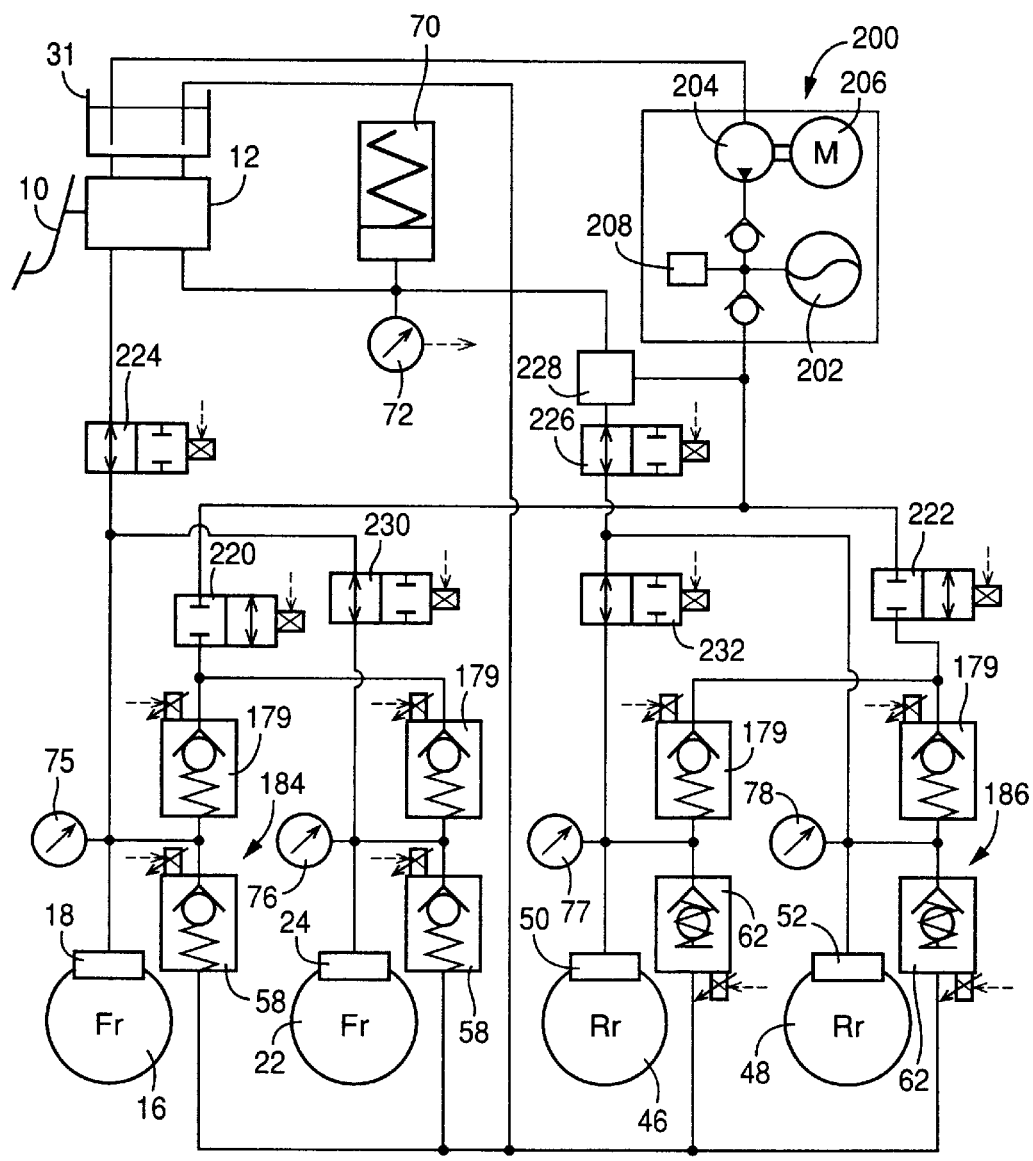
FIG. 36 is a schematic view illustrating a braking system including a hydraulic pressure control apparatus, according to a yet further embodiment of the invention.

The hydraulic circuit in the braking system is not limited to the details shown in FIG. 36. For instance, the braking system may use a pump device 200 including an accumulator 202 and a single pump 204, as shown in FIG. 36. The pump device 200 further includes a pump motor 206 for operating the pump 204 to deliver a pressurized fluid stored in the accumulator 202. The pump motor 206 is controlled so that the fluid pressure in the accumulator 202 is held within a predetermined optimum range. A pressure switch 208 is provided to detect a rise and a drop of the fluid pressure in the accumulator 202 above and below upper and lower limits of the optimum range.

In the braking system of FIG. 36, each of the wheel brake cylinders 18, 24, 50, 52 is connected to both of the master cylinder 12 and the pump device 200. In a fluid passage connecting the pump device 200 and the front wheel brake cylinders 18, 22, there is provided a solenoid-operated shut-off valve 220. In a fluid passage connecting the pump device 200 and the rear wheel brake cylinders 50, 52, there is provided a solenoid-operated shut-off valve 222. These shut-off valves 220, 222 are normally closed valves. In a fluid passage connecting the master cylinder 12 and the front wheel brake cylinders 18, 22, there is provided a solenoid-operated shut-off valve 224. In a fluid passage connecting the master cylinder 12 and the rear wheel brake cylinders 50, 52, there is provided a solenoid-operated shut-off valve 226. These shut-off valves 224, 226 are normally open valves. In this braking system, all wheel brake cylinders 18, 22, 50, 52 are disconnected from the pump device 200 and are connected to the master cylinder 12, in the event of occurrence of an electrical abnormality of the braking system. In the fluid passage connecting the master cylinder 12 and the rear wheel brake cylinders 50, 52, there is also provided a pressure increasing valve 228 so that the fluid pressure generated by the master cylinder 12 is further increased by the pressure increasing valve 228, so that the thus increased fluid pressure is applied to the rear wheel brake cylinders 50, 52.

In a fluid passage connecting the front wheel brake cylinders 18, 22, there is provided a solenoid-operated shut-off valve 23. In a fluid passage connecting the rear wheel brake cylinders 50, 52, there is provided a solenoid-operated shut-off valve 232. These shut-off valves 230, 232 are controlled to effect selective connection and disconnection of the two front wheel brake cylinders 18, 22 or two rear wheel brake cylinders 50, 52 to and from each other. When the fluid pressures in the two wheel brake cylinders 18, 22 (50, 52) are controlled independently of each other, the shut-off valve 230, 232 is placed in the closed state. When the fluid pressures in the two wheel brake cylinders are controlled to the same level, the shut-off valve 230, 232 is placed in the open state. In this latter case, only one of the linear valve devices 184, 186 is controlled to control the fluid pressures in the two wheel brake cylinders.

In the present embodiment of FIG. 36, a leakage of the fluid from the shut-off valve 222 and/or pressure increase control valve 179 may cause the pressurized fluid to be supplied from the accumulator 202 to the rear wheel brake cylinder 50, 52, resulting in a so-called "brake drag", even while the brake pedal 10 is in the non-operated position. However, the pressure reduction control valves 62 are normally open valves, to permit the fluid to be discharged from the rear wheel brake cylinders 50, 52 to the master reservoir 31, for thereby preventing the "brake drag"which would otherwise take place due to the fluid leakage. In this respect, it is desirable that the pressure reduction control valves 58 for the front wheel brake cylinders 18, 22 are normally open valves.

In the braking system of FIG. 36, the pump device 200 which is independent of the master cylinder 12 may be replaced by any other device such as a pressure booster or pressure increasing device. In this case, too, the fluid pressures in the rear wheel brake cylinders 50, 52 are controlled by controlling the pressure reduction control valves 62. It is also noted that the traction control and vehicle stability brake control are not essential.

It will be understood that the pressure reduction control valves 62 in the braking system of FIG. 1 may be controlled in the same manners as described above with respect to the embodiments of FIGS. 20–35. In other words, the braking system of FIG. 1 may be modified such that the electric current applied to the coils 144 of the pressure reduction control valves 62 in the pressure increase mode and pressure hold mode are controlled depending upon the fluid pressure in the rear wheel brake cylinders 50, 52, for saving the required electric energy, and such that the preliminary current application control for the pressure reduction control valves 62 are effected as in steps S134–S136. Further, the braking system of FIG. 1 may be modified so as to further effect the slow increase of the electric current applied to the coils 144 for slow seating of the valve member 136 onto the valve seat 134, as in steps S144, S147, S153, S154 and S164 immediately after termination of the pressure reduction in the pressure reduction mode or immediately after initiation of the pressure increase in the pressure increase mode.

It will also be understood that the pressure increase control valves 179 in the braking system of FIG. 20 may be replaced by the pump cut-off valves 54 described above with respect to the first embodiment of FIG. 1, so that the fluid pressure in the wheel brake cylinders 18, 22, 50, 52 is controlled in the pressure increase mode, by controlling the pump device 30 as in the first embodiment of FIGS. 1–15, rather than controlling the pressure increase control valves 179, and by holding the pump cut-off valves 54 in the open state and controlling the pressure reduction control valves 58, 62 in the manners as described above with respect to the sixth embodiment of FIGS. 20–29.

It is to be understood that the prevent invention may be embodied with various other changes, modifications and improvements, which may occur to those skilled in the art, in the light of the foregoing teachings.

What is claimed is:

1. A hydraulic pressure control apparatus for controlling a pressure of a working fluid in a brake cylinder, said apparatus comprising:
   a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling an amount of electric energy to be applied to said electric motor while said pump is held in communication with said brake cylinder, such that said amount of electric energy to be applied to said electric motor corresponds to an operating state of a manually operable brake operating member, and pressure reduction control means for reducing the pressure of the fluid in said brake cylinder by controlling the amount of said electric energy applied to said solenoid-operated pressure control valve, such that the pressure of the fluid in said brake cylinder is reduced with a change in the amount of electric energy applied to said solenoid-operated pressure control valve.

2. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a soleooid-operated pressure control valve disposed between said low-pressure aource and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling an amount of electric energy to be applied to said electric motor while said pump is held in communication with said brake cylinder, such that said amount of electric energy to be applied to said electric motor corresponds to an operating state of a manually operable brake operating member, and pressure reduction control means for reducing the pressure of the fluid in said brake cylinder by controlling the amount of said electric energy applied to said solenoid-operated pressure control valve;

wherein said controller activates one of said pressure increase control means and said pressure reduction control means, depending on at least one of a pressure difference between an actual value and a target value of the fluid pressure in said brake cylinder and a rate of change of said target value.

3. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling an amount of electric energy to be applied to said electric motor while said pump is held in communication with said brake cylinder, such that said amount of electric energy to be applied to said electric motor corresponds to an operating state of a manually operable brake operating member, and pressure reduction control means for reducing the pressure of the fluid in said brake cylinder by controlling the amount of said electric energy applied to said solenoid-operated pressure control valve, wherein said controller includes a motor start control device for applying a higher voltage to said electric motor when said electric motor is turned on, and holding said higher voltage applied to said electric motor while a predetermined condition is satisfied, said higher voltage being higher than a voltage to be applied to said electric motor after said predetermined condition is satisfied.

4. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling an amount of electric energy to be applied to said electric motor while said pump is held in communication with said brake cylinder, such that said amount of electric energy to be applied to said electric motor corresponds to an operating state of a manually operable brake operating member, and pressure reduction control means for reducing the pressure of the fluid in said brake cylinder by controlling the amount of said electric energy applied to said solenoid-operated pressure control valve, wherein said controller includes pressure increase commanding means for commanding an increase in the fluid pressure in said brake cylinder when a predetermined pressure increase condition is satisfied, and motor pre-starting means for turning on said electronic motor when said predetermined pressure increase condition is expected to be satisfied in the near future.

5. A hydraulic pressure control apparatus according to claim 4, wherein said controller includes motor stopping means for turning off said electric motor when a predetermined time has passed, without satisfaction of said predetermined pressure increase condition, after said electric motor us turned on by said motor pre-starting means.

6. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling an amount of electric energy to be applied to said electric motor while said pump is held in communication with said brake cylinder, such that said amount of electric energy to be applied to said electric motor corresponds to an operating state of a manually operable brake operating member, and pressure reduction control means for reducing the pressure of the fluid in said brake cylinder by controlling the amount of said electric energy applied to said solenoid-operated pressure control valve, wherein a plurality of brake cylinders are connected through respective branch passages to said pump device such that said plurality of brake cylinders are parallel with each other, and said solenoid-operate pressure control valve is provided in each of a plurality of pressure reducing passages respectively connecting said branch passages to said low-pressure source, said apparatus further comprising a flow resistor device provided in a portion of each of said branch passages which is located between said pump device and a point of connection thereof to a corresponding one of said pressure reducing passages.

7. A hydraulic pressure control apparatus according to claim 6, wherein said controller includes a motor control device for controlling said electric motor on the basis of a highest one of target values of the fluid pressures in said plurality of brake cylinders.

8. A hydraulic pressure control apparatus according to claim 1, wherein said solenoid-operated pressure control valve includes a solenoid-operated seating valve having a valve seat, a valve member movable to be seated on and unseated from said valve seat, and an electromagnetic force generating device for generating an electromagnetic drive force corresponding to the electric energy applied thereto, such that the electromagnetic drive force acts on said valve member in a first direction for moving said valve member to be seated on said valve seat, said seating valve being constructed such that a pressure difference force based on a difference between the fluid pressures in said low-pressure source and said brake cylinder acts on said valve member in a second direction opposite to said first direction, and wherein said controller further includes electric energy control means for controlling the electric energy to be applied to said electromagnetic force generating device, depending upon the fluid pressure in said brake cylinder, when said valve member of said seating valve is held seated on said valve seat.

9. A hydraulic pressure control apparatus according to claim 8, wherein said controller further includes slowly energy increasing means for slowly increasing the electric energy to be applied to said electromagnetic force generating device, when the said valve member of said seating valve is seated on said valve seat.

10. A hydraulic pressure control apparatus according to claim 1, wherein said pump device does not include an accumulator connected to said pump.

11. A hydraulic pressure control apparatus according to claim 1, wherein said hydraulic pressure control apparatus further comprises a normally open solenoid-operated pump cut-off valve which is disposed between said pump and said brake cylinder and which is held in an open state for fluid communication between said pump and said brake cylinder when said electric motor is controlled by said pressure increase control means.

12. A hydraulic pressure control apparatus according to claim 11, wherein said pressure reduction control valve is a normally open solenoid-operated linear valve.

13. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said pressure reduction control means includes means for turning off said electric motor when the pressure of the fluid in said brake cylinder is reduced.

14. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said controller includes a motor control device for controlling said electric motor to produce a larger output torque when a rate of increase of a target value of the fluid pressure in said brake cylinder is higher than a predetermined threshold, than when said rate of increase is not higher than said predetermined threshold.

15. A hydraulic pressure control apparatus according to claim 14, further comprising a battery for supplying power to said electric motor, and wherein said motor control device includes a voltage increasing device for applying to said electric motor a voltage higher than a nominal voltage of said battery when said rate of increase of said target value of the fluid pressure in said brake cylinder is higher than said predetermined threshold.

16. A hydraulic pressure control apparatus for controlling a pressure of a working fluid in a brake cylinder, said apparatus comprising:
- a pump device connected to said brake cylinder and including at least one set of a pump for pressurizing the fluid and delivering the pressurized fluid to said brake cylinder and an electric motor for operating said pump;
- a low-pressure source for storing the fluid discharged from said brake cylinder;
- a solenoid-operated pressure control valve disposed between said low-pressure source and said brake cylinder and operated with an electric energy applied thereto, for controlling a pressure of the fluid in said brake cylinder depending upon an amount of said electric energy; and
- a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said controller includes pressure hold control means for turning off said electric motor and placing said solenoid-operated pressure control valve in a state for inhibiting a discharge flow of the fluid from said brake cylinder, when a rate of change of a target value of the fluid pressure in said brake cylinder is held within a predetermined range.

17. A hydraulic pressure control apparatus according to claim 16, wherein said controller includes pressure holding condition relaxing means for changing said predetermined range such that the predetermined range is wider when said pressure hold control means is in operation for a relatively long time than when said pressure hold control means is in operation for relatively short time.

18. A hydraulic pressure control apparatus for controlling a pressure of a working fluid in a brake cylinder, said apparatus comprising:
- a pump device connected to said brake cylinder and including at least one set of a pump for pressurizing the fluid and delivering the pressurized fluid to said brake cylinder and an electric motor for operating said pump;
- a low-pressure source for storing the fluid discharged from said brake cylinder;
- a solenoid-operated pressure control valve disposed between said low-pressure source and said brake cylinder and operated with an electric energy applied thereto, for controlling a pressure of the fluid in said brake cylinder depending upon an amount of said electric energy; and
- a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said controller includes pressure hold control means for turning off said electric motor and placing said solenoid-operated pressure control valve in a state for inhibiting a discharge flow of the fluid from said brake cylinder, when a predetermined condition is satisfied, and pressure holding condition relaxing means for changing said predetermined condition such that the predetermined condition is more relaxed when said pressure hold control means is in operation for a relatively long time than when said pressure hold control means is in operation for a relatively short time.

19. A hydraulic pressure control apparatus for controlling a pressure of a working fluid in a brake cylinder, said apparatus comprising:
- a pump device connected to said brake cylinder and including at least one set of a pump for pressurizing the fluid and delivering the pressurized fluid to said brake cylinder and an electric motor for operating said pump;
- a low-pressure source for storing the fluid discharged from said brake cylinder;
- a solenoid-operated pressure control valve disposed between said low-pressure source and said brake cylinder and operated with an electric energy applied thereto, for controlling a pressure of the fluid in said brake cylinder depending upon an amount of said electric energy; and
- a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said brake cylinder is activated to brake a wheel of an automotive vehicle, and said controller includes pressure hold control means for turning off said electric motor and placing said solenoid-operated pressure control valve in a state for inhibiting a discharge flow of the fluid from said brake cylinder, when a predetermined condition is satisfied, and pressure holding condition relaxing means for changing said predetermined condition such that the predetermined condition is more relaxed when said automotive vehicle is stationary than when said automotive vehicle is running.

20. A hydraulic pressure control apparatus for controlling a pressure of a working fluid in a brake cylinder, said apparatus comprising:
- a pump device connected to said brake cylinder and including at least one set of a pump for pressurizing the fluid and delivering the pressurized fluid to said brake cylinder and an electric motor for operating said pump;
- a low-pressure source for storing the fluid discharged from said brake cylinder;
- a solenoid-operated pressure control valve disposed between said low-pressure source and said brake cylinder and operated with an electric energy applied thereto, for controlling a pressure of the fluid in said brake cylinder depending upon an amount of said electric energy; and
- a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said brake cylinder is activated to brake a wheel of an automotive vehicle, and said controller includes:

pressure increasing means for increasing the fluid pressure in said brake cylinder by controlling said electric motor of said pump device while a predetermined pressure increasing condition is satisfied;

compulsory pressure holding means for holding the fluid pressure in said brake cylinder by holding said electric motor off and placing said solenoid-operated pressure control valve in a state for inhibiting a discharge flow of the fluid from the brake cylinder, after a rotating speed of said wheel has been once substantially zeroed, even while said predetermined pressure increasing condition is satisfied; and disabling means for disabling said compulsory pressure holding means to operate, when the rotating speed of the wheel has exceeded a predetermined threshold and when an amount of operation of a brake operating member has been increased while said compulsory pressure holding means is operating.

21. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said controller includes pressure increase commanding means for commanding an increase in the fluid pressure in said brake cylinder when a predetermined pressure increase condition is satisfied, motor pre-starting means for turning on said electric motor when said predetermined pressure increase condition is expected to be satisfied in the near future, and wherein said brake cylinder is activated to brake a wheel of an automotive vehicle, said apparatus further comprising a downhill running detector for detecting that the automotive vehicle is running downhill, if an actual acceleration value of the vehicle is higher than an estimated acceleration value of the vehicle which is obtained on the basis of a vehicle drive torque produced by a drive power source for driving the vehicle, and wherein said motor pre-starting means including means for turning on said electric motor when at least one sign indicating a high possibility that said predetermined pressure increase condition will be satisfied in the near future is detected, said at least one sign including detection by said downhill running detector that the automotive vehicle is running downhill.

22. A hydraulic pressure control apparatus according to claim 21, wherein said at least one sign further including at leas one of (a) detection of releasing of an accelerator member provided for accelerating the automotive vehicle, and (b) detection that a gradient of a downhill road surface on which the vehicle is running is higher than a predetermined threshold.

23. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein a plurality of brake cylinders are connected through respective branch passages to said pump device such that said plurality of brake cylinders are parallel with each other, and said solenoid-operated pressure control valve is provided in each of a plurality of pressure reducing passages respectively connecting said branch passages to said low-pressure source, said apparatus further comprising a pump cut-off valve provided in a portion of each of said branch passages which is located between said pump device and a point of connection thereof to a corresponding one of said pressure reducing passages, said pump cut-off valve having a flow permitting stage for permitting a flow of the pressurized fluid delivered from said pump into a corresponding one of said brake cylinders, and a flow inhibiting state for inhibiting the flow of the pressurized fluid into said corresponding one of said brake cylinders, said controller including pump cut-off valve control means for placing said pump cut-off valve in said flow inhibiting state when a rate of reduction of a target value of the fluid pressure in each of at least one of said plurality of brake cylinders is higher than a predetermined pressure reduction threshold while a rate of change of said target value of the fluid pressure in each of the other of said brake cylinders is on the side of increasing the fluid pressure as compared with said predetermined pressure reduction threshold.

24. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling said electric motor, and pressure reduction control means for reducing the pressure of the fluid in said brake cylinder by controlling the amount of said electric energy applied to said solenoid-operated pressure control valve, wherein said pump device includes a low-pressure pump and a high-pressure pump having a higher delivery pressure and a lower delivery flow rate than said low-pressure pump.

25. A hydraulic pressure control apparatus for controlling a pressure of a working fluid in a brake cylinder, said apparatus comprising:

a pump device connected to said brake cylinder and including at least one set of a pump for pressurizing the fluid and delivering the pressurized fluid to said brake cylinder and an electric motor for operating said pump;

a low-pressure source for storing the fluid discharged from said brake cylinder;

a solenoid-operated pressure control valve disposed between said low-pressure source and said brake cylinder and operated with an electric energy applied thereto, for controlling a pressure of the fluid in said brake cylinder depending upon an amount of said electric energy; and a controller including pressure increase control means for increasing the pressure of the fluid in said brake cylinder by controlling an amount of electric energy to be applied to said electric motor while said pump is held in communication with said brake cylinder, such that the pressure of the fluid in said brake cylinder substantially corresponds to the amount of electric energy to be applied to said electric motor, and pressure reduction means for reducing the pressure of the fluid in said brake cylinder by controlling the amount of said electric energy applied to said solenoid-operated pressure control valve.

26. A hydraulic pressure control apparatus for controlling a pressure of a working fluid in a brake cylinder, said apparatus comprising:

a low-pressure source for storing the fluid discharged from said brake cylinder;

a solenoid-operated pressure control valve disposed between said brake cylinder and said low-pressure source, and including a solenoid-operated seating valve having a valve seat, a valve member movable to be seated on and unseated from said valve seat, and an electromagnetic force generating device for generating an electromagnetic drive force corresponding to an amount of electric energy applied thereto, such that the electromagnetic drive force acts on said valve member in a first direction for moving said valve member to be seated on said valve seat, said seating valve being constructed such that a pressure difference force based on a difference between the fluid pressures in said low-pressure source and said brake cylinder acts on said valve member in a second direction opposite to said first direction; and a controller including electric energy control means for controlling the amount of electric energy to be applied to said electromagnetic force generating device, depending upon the fluid pressure in said brake cylinder, when said valve member of said seating valve is held seated on said valve seat, and wherein said electric energy control means control the amount of electric energy to be applied to said electromagnetic force generating device such that said electromagnetic drive force is larger that said pressure difference force by at least a predetermined margin value which is determined by at least a maximum velocity of increase in the fluid pressure at said solenoid-operated pressure control valve.

27. A hydraulic pressure control apparatus according to claim 26, wherein said margin value is determined by a force required for forcing said valve member onto said valve seat, as well as said maximum velocity of increase in the fluid pressure at said solenoid-operated pressure control valve.

28. A hydraulic pressure control apparatus according to claim 26, wherein said margin value is determined by an amount of leak of the working fluid through a gap between contact surfaces of said valve member and said valve seat, as well as said maximum velocity of increase in the fluid pressure at said solenoid-operated pressure control valve.

29. A hydraulic pressure control apparatus according to claim 26, wherein said electric energy control controls the electric energy to be applied to said electromagnetic force generating device, further depending upon a temperature of the working fluid flowing through said solenoid-operated seating valve.

30. A hydraulic pressure control apparatus for controlling a pressure of a working fluid in a brake cylinder, said apparatus comprising:

a low-pressure source for storing the fluid discharged from said brake cylinder;

a solenoid-operated pressure control valve disposed between said brake cylinder and said low-pressure source, and including a solenoid-operated seating valve having a valve seat, a valve member movable to be seated on and unseated from said valve seat, and an electromagnetic force generating device for generating an electromagnetic drive force corresponding to an amount of electric energy applied thereto, such that the electromagnetic drive force acts on said valve member in a first direction for moving said valve member to be seated on said valve seat, said seating valve being constructed such that a pressure difference force based on a difference between the fluid pressures in said low-pressure source and said brake cylinder acts on said valve member in a second direction opposite to said first direction; and a controller including slowly energy increasing means for slowly increasing, at a controlled rate, the amount of electric energy to be applied to said electromagnetic force generating device, when said valve member of said seating valve is seated on said valve seat.

31. A hydraulic pressure control apparatus according to claim 30, further comprising pressure increasing means for increasing the fluid pressure in said brake cylinder when a predetermined condition for effecting an increase in the fluid pressure in said brake cylinder is satisfied, and wherein said slowly energy increasing means includes preliminary energy applying means for applying the electric energy to said electromagnetic force generating device before said condition is satisfied, upon detection of a sigh indicative of a high possibility that said condition will be satisfied.

32. A hydraulic pressure control apparatus according to claim 31, wherein said electric energy control means includes energy application terminating means for termination the application of the electric energy to said electromagnetic force generating device by said preliminary energy applying means when a predetermined time has passed after initiation of said application without satisfaction of said predetermined condition.

33. A hydraulic pressure control apparatus according to claim 31, wherein said pressure increasing means includes a hydraulic pressure source, and a solenoid-operated pressure increase control valve disposed between said hydraulic pressure source and said brake cylinder, and wherein said controller further includes means for controlling an electric energy to be applied to said solenoid-operated pressure increase control valve, to increase the fluid pressure in said brake cylinder.

34. A hydraulic pressure control apparatus according to claim 30, wherein said slowly energy increasing means includes means for initiating the application of the electric energy to said electromagnetic force generating device when a predetermined condition for terminating an operation to reduce the fluid pressure in said brake cylinder occurs.

35. A hydraulic pressure control apparatus according to claim 32, wherein said slowly energy increasing means increases the electric energy to be applied to said electromagnetic force generating device, at a rate corresponding to a maximum velocity of increase in the fluid pressure in said brake cylinder.

36. A hydraulic pressure control apparatus according to claim 30, wherein said slowly energy increasing means increases the electric energy to be applied to said electromagnetic force generating device, on the basis of the fluid pressure in said brake cylinder and a deceleration coefficient.

37. A hydraulic pressure control apparatus according to claim 26, wherein said solenoid-operated pressure control valve is placed in an open state with said valve member spaced apart from said valve seat when no electric energy is applied to said electromagnetic force generating device, said controller controlling the amount of electric energy to be applied to said electromagnetic force generating device to control the pressure of the fluid in said brake cylinder when said pressure of the fluid in said brake cylinder is reduced.

38. A hydraulic pressure control apparatus according to claim 30, wherein said solenoid-operated pressure control valve is placed in an open state with said valve member spaced apart from said valve seat when no electric energy is applied to said electromagnetic force generating device, said controller controlling the amount of electric energy to be applied to said electromagnetic force generating device to control the pressure of the fluid in said brake cylinder when said pressure of the fluid in said brake cylinder is reduced.

39. A hydraulic pressure control apparatus according to claim 1, wherein said pressure reduction control the amount of said electric energy applied to said solenoid-operated pressure control valve while said electric motor is held off.

40. A hydraulic pressure control apparatus according to claim 25, wherein said pressure reduction control means controls the amount of said electric energy applied to said solenoid-operated pressure control valve while said electric motor is held off.

* * * * *